(12) United States Patent
Liu et al.

(10) Patent No.: US 11,283,912 B2
(45) Date of Patent: Mar. 22, 2022

(54) DISPLAY METHOD AND DEVICE

(71) Applicant: HUAWEI TECHNOLOGIES CO., LTD., Guangdong (CN)

(72) Inventors: Weijie Liu, Beijing (CN); Junting Jiao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 30 days.

(21) Appl. No.: 16/622,879

(22) PCT Filed: Oct. 9, 2017

(86) PCT No.: PCT/CN2017/105394
§ 371 (c)(1),
(2) Date: Dec. 13, 2019

(87) PCT Pub. No.: WO2018/227824
PCT Pub. Date: Dec. 20, 2018

(65) Prior Publication Data
US 2020/0213438 A1    Jul. 2, 2020

(30) Foreign Application Priority Data

Jun. 16, 2017   (WO) ................ PCT/CN2017/088839

(51) Int. Cl.
*H04M 1/72409*    (2021.01)
*G06F 3/0354*     (2013.01)
(Continued)

(52) U.S. Cl.
CPC ........ *H04M 1/72409* (2021.01); *G06F 3/038* (2013.01); *G06F 3/03543* (2013.01); *G06F 3/04842* (2013.01); *G06F 3/1423* (2013.01)

(58) Field of Classification Search
CPC .......................... H04M 1/72409; G06F 3/038; G06F 3/04842; G06F 3/1423
See application file for complete search history.

(56) References Cited

U.S. PATENT DOCUMENTS

2002/0002707 A1*  1/2002  Ekel ................... H04N 21/4622
                                                    725/87
2003/0025678 A1*  2/2003  Lee .......................... G09G 5/08
                                                    345/173
(Continued)

FOREIGN PATENT DOCUMENTS

CN       102857628 A      1/2013
CN       103577140 A      2/2014
(Continued)

*Primary Examiner* — Ariel A Balaoing
(74) *Attorney, Agent, or Firm* — Womble Bond Dickinson (US) LLP

(57) ABSTRACT

This application provides a display method and a device and relates to the field of communications technologies, so as to display different content on a terminal and an external display apparatus. A specific solution includes: displaying, by the terminal, a first screen, and instructing the external display apparatus to display a first desktop including a first application but not including a second application, where the first screen is different from the first desktop; and displaying, by the terminal in response to a first input of a user on the first screen, a second screen including the first application and the second application on the terminal, and instructing the external display apparatus to display a second desktop including the first application and the second application.

19 Claims, 56 Drawing Sheets

(51) Int. Cl.
    *G06F 3/038*     (2013.01)
    *G06F 3/0484*     (2013.01)
    *G06F 3/14*     (2006.01)
    *G06F 3/04842*     (2022.01)

(56) References Cited

U.S. PATENT DOCUMENTS

| | | | |
|---|---|---|---|
| 2004/0227692 A1* | 11/2004 | Yoon | G06F 3/1438 345/3.1 |
| 2005/0146507 A1* | 7/2005 | Viredaz | G06F 9/451 345/169 |
| 2006/0071942 A1* | 4/2006 | Ubillos | G06T 11/00 345/619 |
| 2006/0075348 A1* | 4/2006 | Xu | G06Q 10/10 715/730 |
| 2006/0109240 A1* | 5/2006 | Fu | G09G 5/003 345/156 |
| 2007/0188482 A1 | 8/2007 | Fujimori | |
| 2009/0309886 A1* | 12/2009 | Sneed | G06F 3/14 345/520 |
| 2010/0138780 A1* | 6/2010 | Marano | G06F 3/147 715/804 |
| 2012/0050183 A1* | 3/2012 | Lee | G06F 3/1423 345/173 |
| 2013/0027314 A1* | 1/2013 | Masaki | H04N 21/43615 345/168 |
| 2013/0219303 A1* | 8/2013 | Eriksson | H04M 1/72412 715/759 |
| 2014/0028719 A1 | 1/2014 | Hirotani | |
| 2017/0351531 A1 | 12/2017 | Li et al. | |
| 2018/0246634 A1* | 8/2018 | Suh | G06F 3/0481 |
| 2019/0163337 A1* | 5/2019 | Gill | G06F 9/451 |
| 2020/0042274 A1* | 2/2020 | Park | G06F 3/1431 |

FOREIGN PATENT DOCUMENTS

| | | |
|---|---|---|
| CN | 104020937 A | 9/2014 |
| CN | 104317547 A | 1/2015 |
| CN | 104679467 A | 6/2015 |
| CN | 105426178 A | 3/2016 |
| CN | 106095273 A | 11/2016 |
| CN | 106201385 A | 12/2016 |
| CN | 106293713 A | 1/2017 |
| CN | 106657651 A | 5/2017 |
| JP | 2007218944 A | 8/2007 |
| JP | 2011081591 A | 4/2011 |
| JP | 2017073124 A | 4/2017 |

* cited by examiner

DISPLAY METHOD AND DEVICE

CROSS-REFERENCE TO RELATED APPLICATIONS

This application is a national stage of International Application No. PCT/CN2017/105394, filed on Oct. 9, 2017, which claims priority to International Application No. PCT/CN2017/088839, filed on Jun. 16, 2017. Both of the aforementioned applications are hereby incorporated by reference in their entireties.

TECHNICAL FIELD

This application relates to the field of communications technologies, and in particular, to a display method and a device.

BACKGROUND

With the development of electronic technologies, functions of intelligent terminals (such as mobile phones) are increasing, and users are increasingly relying on the mobile phones. For example, a mobile phone not only can be used as a communication or entertainment tool, but also can be used as a mobile office tool. For example, a user can use the mobile phone to send and receive work emails and process work files. However, a limitation of a screen of the mobile phone makes a mobile office far less convenient than a Personal Computer (PC) office.

To facilitate the use of mobile phone resources for a remote office, a mobile phone may be connected to an external display apparatus, so that the mobile phone can project display content on the external display apparatus. A user can use the mobile phone as a touchpad for a large-screen display, to control content displayed on the external display apparatus. Alternatively, a user can use a keyboard and/or a mouse that are/is connected to the external display apparatus, to control content displayed on the external display apparatus.

However, in the process in which the mobile phone projects the display content on the external display apparatus, the mobile phone may be used only as a control end (such as a control panel) or a supply source of the display content, and the mobile phone and the external display apparatus cannot display different content.

SUMMARY

This application provides a display method and a device, to display different content on a terminal and an external display apparatus, and control, on the terminal, permission to display an application on a desktop of the external display apparatus.

To achieve the foregoing objectives, this application uses the following technical solutions:

According to a first aspect, this application provides a display method. The method may be applied to a terminal, and the terminal is connected to an external display apparatus. The display method includes: displaying, by the terminal, a first screen, and instructing the external display apparatus to display a first desktop including a first application but not including a second application, where the first screen is different from the first desktop; and displaying, by the terminal in response to a first input of a user on the first screen, a second screen including the first application and the second application on the terminal, and instructing the external display apparatus to display a second desktop including the first application and the second application.

According to the display method provided in this application, the terminal may display, in response to the first input of the user on the first screen, the second screen including the first application and the second application on the terminal, and instruct to switch a displayed screen of the external display apparatus from the "first desktop including the first application but not including the second application" to the "second desktop including the first application and the second application". In other words, in this application, the terminal can display a displayed screen (the first screen) related to content of a desktop (the first desktop) displayed by the external display apparatus, and the terminal can correspondingly switch, in response to an input on the related displayed screen (the first screen), the content displayed on the desktop of the external display apparatus. For example, an application in the terminal is added to the desktop of the external display apparatus, so that the added application can also be used by using the external display apparatus.

With reference to the first aspect, in a first implementation, after the terminal receives the first input on the first screen, the applications included in the second screen displayed by the terminal are the same as or different from the applications included in the second desktop.

With reference to the first aspect or the first implementation, the "displaying, by the terminal, a first screen" includes: displaying, by the terminal, the first screen including the first application but not including the second application; or displaying, by the terminal, the first screen including the first application in a selected state and the second application in a non-selected state, where the first application and the second application on the second screen are in the selected state. In other words, the terminal may not display the second application on the first screen, or may display the second application in the non-selected state on the first screen.

With reference to any one of the first aspect or the foregoing implementations, in a third implementation, before the "displaying, by the terminal, a first screen", the method in this application may further include: determining, by the terminal, that the terminal is connected to an external device. In other words, the terminal can perform the method according to any one of the first aspect or the foregoing implementations of the first aspect after determining that the terminal is connected to the external device.

With reference to the third implementation of the first aspect, in a fourth implementation, the external device may include at least one of a keyboard, a mouse, or a handwriting tablet.

With reference to any one of the first aspect or the foregoing implementations, in a fifth implementation, the "instructing, by the terminal, the external display apparatus to display a first desktop including a first application but not including a second application" may include: instructing, by the terminal, the external display apparatus to display the first desktop in a first display mode, where the first display mode is a preset default display mode. In other words, the terminal may display the first desktop in the preset default display mode (the first display mode). The first display mode is a display mode adapted to a display screen of the terminal, or the first display mode is a display mode adapted to the external display apparatus.

With reference to the fifth implementation of the first aspect, in a sixth implementation, after the "instructing, by the terminal, the external display apparatus to display a first desktop including a first application but not including a second application", the method in this application may further include: instructing, by the terminal in response to a second input of the external device for a mode switching option on the first desktop, the external display apparatus to display the first desktop in a second display mode; or instructing, by the terminal in response to a third input of the user on the terminal, the external display apparatus to display the first desktop in a second display mode. In other words, in this application, the terminal can receive the input of the external device for the mode switching option on the display desktop of the external display apparatus, to switch a display mode of the external display apparatus; and the terminal can also switch the display mode of the external display apparatus in response to the third input on the terminal.

In this application, when the first display mode is a display mode adapted to the display screen of the terminal, the second display mode is a display mode adapted to the external display apparatus; or when the first display mode is a display mode adapted to the external display apparatus, the second display mode is a display mode adapted to the display screen of the terminal.

With reference to any one of the first aspect or the foregoing implementations, in a seventh implementation, the external display apparatus may include at least a display, a television set, a tablet computer, or a projector.

With reference to any one of the first aspect or the foregoing implementations, in an eighth implementation, the method further includes: instructing, by the terminal, the external display apparatus to display a multi-window screen including a first application window and a second application window, where the first application window is a currently focused application window; determining, by the terminal in response to an operation of moving a cursor by the user to a first position on the multi-window screen, that an application window within which the first position falls is the second application window; and instructing, by the terminal, the external display apparatus to switch the currently focused application window from the first application window to the second application window. In other words, in a multi-application window application scenario, the terminal can be used to control the external display apparatus to switch the focused application window.

With reference to the eighth implementation of the first aspect, in a ninth implementation, after the instructing, by the terminal, the external display apparatus to switch the currently focused application window from the first application window to the second application window, the method further includes: receiving, by the terminal, a mouse operation or a keyboard operation triggered by the user in the second application window.

With reference to any one of the third to the seventh implementations of the first aspect, in a tenth implementation, the method further includes: displaying, by the terminal, a third application window on the display screen of the terminal; instructing, by the terminal, the external display apparatus to display a multi-window screen including a first application window and a second application window, where the first application window is a currently focused application window; determining, by the terminal in response to an operation of moving a cursor by the user to the third application window, that the first position falls within the third application window; and switching, by the terminal, the currently focused application window from the first application window to the third application window.

With reference to any one of the first aspect or the foregoing implementations, in an eleventh implementation, the method further includes: instructing, by the terminal, the external display apparatus to display a toolbar window, where the toolbar window includes an icon of a target application; and instructing, by the terminal in response to a specific operation performed by the user on the icon of the target application, the external display apparatus to display at least one display mode supported by the target application, where the at least one display mode includes at least one of a full-screen display mode, a landscape display mode, and a portrait display mode.

With reference to the eleventh implementation of the first aspect, in a twelfth implementation, after the instructing, by the terminal, the external display apparatus to display at least one display mode supported by the target application, the method further includes: instructing, by the terminal in response to an operation of triggering the full-screen display mode by the user, the external display apparatus to load a full-screen display resource of the target application onto the display screen; instructing, by the terminal in response to an operation of triggering the landscape display mode by the user, the external display apparatus to load a landscape display resource of the target application onto the display screen; or instructing, by the terminal in response to an operation of triggering the portrait display mode by the user, the external display apparatus to load a portrait display resource of the target application onto the display screen.

With reference to the twelfth implementation of the first aspect, in a thirteenth implementation, after the instructing, by the terminal, the external display apparatus to load a full-screen display resource onto the display screen, the method further includes: instructing, by the terminal, the external display apparatus to suspend at least one running application.

With reference to the eleventh implementation, in a fourteenth implementation, the at least one display mode further includes a minimized display mode, and the method further includes: instructing, by the terminal in response to an operation of triggering the minimized display mode by the user, the external display apparatus to suspend the running target application.

According to a second aspect, this application provides a display method. The method may be applied to a terminal, the terminal is connected to an external display apparatus, and the display method includes: displaying, by the terminal, a first screen including a first application and a second application, and instructing, by the terminal, the external display apparatus to display a first desktop including the first application and the second application, where the first screen is different from the first desktop; and instructing, by the terminal in response to a first input of a user on the first screen, the external display apparatus to display a second desktop including the first application but not including the second application.

According to the display method provided in this application, in response to the first input of the user on the first screen, the terminal can instruct to switch a displayed screen of the external display apparatus from the "first desktop including the first application and the second application" to the "second desktop including the first application but not including the second application". In other words, in this application, the terminal can display a displayed screen (the first screen) related to content of a desktop (the first desktop) displayed by the external display apparatus, and the terminal can correspondingly switch, in response to an input on the related displayed screen (the first screen), the content displayed on the desktop of the external display apparatus. For example, an application on the desktop of the external display apparatus is deleted, to control permission of the external display apparatus to use data in the terminal.

With reference to the second aspect, in a first implementation, the method in this application may further include: displaying, by the terminal in response to the first input of the user on the first screen, a second screen including the first application but not including the second application; or displaying, by the terminal in response to the first input of the user on the first screen, a second screen including the first application in a selected state and the second application in a non-selected state, where both the first application and the second application in the first screen are in the selected state. In other words, the terminal may not display the second application on the second screen, or may display the second application in the non-selected state on the second screen.

With reference to the first implementation, in a second implementation, after the terminal receives the first input on the first screen, the applications included in the second screen displayed by the terminal are the same as or different from the applications included in the second desktop.

With reference to any one of the second aspect or the foregoing implementations, in a third implementation, before the "displaying, by the terminal, a first screen including a first application and a second application", the method in this application may further include: determining, by the terminal, that the terminal is connected to an external device.

It should be noted that in the display method provided in the second aspect of this application, the terminal may also instruct the external display apparatus to display the first desktop in a first display mode (a preset default display mode). Correspondingly, the terminal may also instruct, in response to an input of the external device or an input of the terminal, the external display apparatus to switch a display mode of the external display apparatus, that is, to display the first desktop in a second display mode. For the method for instructing, by the terminal, the external display apparatus to "display the desktop in the first display mode" or "switch the desktop display mode", refer to the detailed descriptions in the fifth implementation and the sixth implementation of the first aspect of this application. Details are not repeated in this application.

According to a third aspect, this application provides a display method. The method may be applied to a terminal, the terminal is connected to an external display apparatus, and the terminal is connected to an external device. The display method includes: displaying, by the terminal, a first screen, where at least a first application and a second application are displayed on the first screen; instructing, by the terminal in response to a first input of the external device, the external display apparatus to display a second screen; and displaying, by the terminal in response to a second input for the first application, a third screen corresponding to the first application, where the terminal remains connected to the external display apparatus and the external device.

According to the display method provided in this application, when the terminal is connected to the external display apparatus, and the terminal is connected to the external device, the terminal may instruct, in response to the first input of the external device, the external display apparatus to display the second screen; and display, in response to the second input for the first application on the first screen displayed by the terminal, the third screen corresponding to the first application. In other words, the external device controls the external display apparatus to display the second screen, and the terminal may be independent of the external display apparatus, and display the third screen in response to an input on a display screen of the terminal. In other words, the terminal and the external display apparatus may be independent of each other and display different content.

With reference to the third aspect, in a first implementation, the first screen or the third screen includes a touch drop-down notification bar or a touch suspend button. In this implementation, even if the terminal is connected to the external device, a user may use the touch drop-down notification bar or the touch suspend button to control the terminal to serve as a touchpad of the external display apparatus. The display method further includes: displaying, by the terminal, a touchpad screen on the terminal in response to a third input on the first screen or the third screen; and instructing, by the terminal in response to a fourth input on the touchpad screen, the external display apparatus to display a fourth screen. In other words, in this implementation, content displayed by the external display apparatus may be controlled by the external device (namely, a mouse and/or a keyboard), or may be controlled by the display screen, as the touchpad, of the terminal.

With reference to the third aspect or the first implementation, in a second implementation, when the terminal is not connected to the external device, the terminal may be used as the touchpad of the external display apparatus, to control content displayed by the external display apparatus. The method in this application may further include: when the terminal is not connected to the external device, displaying, by the terminal, the touchpad screen on the display screen of the terminal, and in response to the fourth input on the touchpad screen, instructing the external display apparatus to display the fourth screen. When the terminal is not connected to the external device, the display screen of the terminal is used as the touchpad of the external display apparatus.

With reference to any one of the third aspect or the foregoing implementations, in a third implementation, the terminal is connected to the external display apparatus by using an adapter cable or a dock device; or the terminal is connected to the external display apparatus in a wireless connection manner.

According to a fourth aspect, this application provides a display method. The method may be applied to a terminal connected to an external display apparatus, and the display method includes: displaying, by the terminal, a first screen on the external display apparatus; and displaying, by the terminal, an operable function item on the terminal, where the operable function item is related to display content of the first screen, and the operable function item is used to control the display content of the first screen.

According to the display method provided in this application, the terminal and the external display apparatus can be independent of each other and display different content, and a display screen of the terminal can also display the operable function item related to the content displayed by the external display apparatus, so that a user can control, by using the operable function item, the content currently displayed by the external display apparatus.

Even if the terminal and the external display apparatus display different content, and the display screen of the terminal is not used as a touchpad of the external display apparatus, the display screen of the terminal can provide, in a manner of "displaying the operable function item related to the content displayed by the external display apparatus", the user with an interface (namely, the operable function item) for controlling the display content of the external display apparatus, so that the user can control, by using the operable function item, the content currently displayed by the external display apparatus.

With reference to the fourth aspect, in a first implementation, the method in this application further includes: displaying, by the terminal, a second screen on the display screen of the terminal, where the second screen includes a function item drop-down notification bar or a function item suspend window and first display content displayed by the terminal in response to a first input on the display screen of the terminal. The "displaying, by the terminal, an operable function item on the terminal" includes: displaying, by the terminal, the operable function item on the display screen of the terminal in response to a second input for the function item drop-down notification bar or the function item suspend window on the display screen of the terminal.

The terminal may display, on a drop-down notification bar (namely, the function item notification bar) on the display screen of the terminal, the operable function item related to the content displayed by the external display apparatus. This can prevent the operable function item from covering the second screen displayed on the display screen of the terminal. In addition, the terminal may receive a trigger operation performed by the user on the function item notification bar, and display the operable function item related to the content displayed by the external display apparatus, so that the user can control, by using the operable function item, the content currently displayed by the external display apparatus.

With reference to the fourth aspect or the first implementation, in a second implementation, before the "displaying, by the terminal, an operable function item on the terminal", the method in this application may further include: determining, by the terminal, that the terminal is connected to an external device. In other words, the terminal can perform the method according to the fourth aspect or the first implementation of the fourth aspect after determining that the external display apparatus is connected to the external device.

With reference to the fourth aspect or the first implementation, in a third implementation, before the "displaying, by the terminal, an operable function item on the terminal", the method in this application may further include: determining, by the terminal, that the external display apparatus is not connected to an external device. In other words, the terminal can perform the method according to the fourth aspect or the first implementation of the fourth aspect after determining that the external display apparatus is not connected to the external device.

With reference to the third implementation, in a fourth implementation, the "displaying, by the terminal, a first screen on the external display apparatus" may include: displaying, by the terminal, the first screen on the external display apparatus in a first display mode, where the first display mode is a preset default display mode. Correspondingly, after the "displaying, by the terminal, a first screen on the external display apparatus", the method in this application may further include: displaying, by the terminal in response to a third input of the external device for a mode switching option on the first screen, the first screen on the external display apparatus in a second display mode; or displaying, by the terminal in response to a fourth input of the user on the terminal, the first screen on the external display apparatus in a second display mode. The first display mode is a display mode adapted to the display screen of the terminal, and the second display mode is a display mode adapted to the external display apparatus; or the first display mode is a display mode adapted to the external display apparatus, and the second display mode is a display mode adapted to the display screen of the terminal.

With reference to any one of the fourth aspect or the foregoing implementations, in a fifth implementation, to help the user understand a control/operation manner of the terminal or the external display apparatus when the terminal is connected to the external display apparatus and projects display content on the external display apparatus, the terminal may display a projection help screen when the terminal is connected to the external display apparatus. The method in this application may further include: displaying, by the terminal, the projection help screen when the terminal is connected to the external display apparatus, where the projection help screen includes projection help information, and the projection help information is used to indicate a control manner in which the terminal displays related content on the external display apparatus.

With reference to any one of the fourth aspect or the foregoing implementations, in a sixth implementation, the terminal is connected to the external display apparatus by using an adapter cable or a dock device; or the terminal is connected to the external display apparatus in a wireless connection manner.

According to a fifth aspect, this application provides a terminal. The terminal includes a connection module, a display module, an instruction module, and a receiving module. The connection module is configured to connect to an external display apparatus; the display module is configured to display a first screen; the instruction module is configured to: when the display module displays the first screen, instruct the external display apparatus to display a first desktop including a first application but not including a second application, where the first screen is different from the first desktop; and the receiving module is configured to receive a first input of the user on the first screen. The display module is further configured to: in response to the first input received by the receiving module, display a second screen including the first application and the second application; and the instruction module is further configured to: when the display module displays the second screen, instruct the external display apparatus to display a second desktop including the first application and the second application.

With reference to the fifth aspect, in a first implementation, the applications included in the second screen displayed by the display module in response to the first input are the same as or different from the applications included in the second desktop.

With reference to the fifth aspect or the first implementation, in a second implementation, that "the display module is configured to display a first screen" includes: the display module is configured to display the first screen including the first application but not including the second application; or display the first screen including the first application in a selected state and the second application in a non-selected state, where the first application and the second application on the second screen are in the selected state.

With reference to any one of the fifth aspect or the implementations, in a third implementation, the terminal further includes a determining module. The determining module is configured to: before the display module displays the first screen, determine that the terminal is connected to an external device.

With reference to any one of the fifth aspect or the implementations, in a fourth implementation, that "the instruction module is configured to instruct the external display apparatus to display a first desktop including a first application but not including a second application" includes: the instruction module is configured to instruct the external display apparatus to display the first desktop in a first display mode, where the first display mode is a preset default display mode.

With reference to the fourth implementation, in a fifth implementation, the receiving module is further configured to: after the instruction module instructs the external display apparatus to display the first desktop including the first application but not including the second application, receive a second input of the external device for a mode switching option on the first desktop; and the instruction module is further configured to: in response to the second input received by the receiving module, instruct the external display apparatus to display the first desktop in a second display mode. Alternatively, the receiving module is further configured to receive a third input of the user on the terminal after the instruction module instructs the external display apparatus to display the first desktop including the first application but not including the second application; and the instruction module is further configured to: in response to the third input, instruct the external display apparatus to display the first desktop in a second display mode. For detailed descriptions of the first display mode and the second display mode, refer to the descriptions in the first aspect and the implementations of the first aspect. Details are not repeated in this application.

With reference to any one of the fifth aspect or the implementations, in a sixth implementation, the instruction module is further configured to instruct the external display apparatus to display a multi-window screen including a first application window and a second application window, where the first application window is a currently focused application window; the receiving module is further configured to receive an operation of moving a cursor by the user to a first position on the multi-window screen; and the instruction module is further configured to instruct the external display apparatus to switch the currently focused application window from the first application window to the second application window.

With reference to the sixth implementation of the fifth aspect, in a seventh implementation, the receiving module is further configured to receive a mouse operation or a keyboard operation triggered by the user in the second application window.

With reference to any one of the fifth aspect or the implementations, in an eighth implementation, the display module is further configured to display a third application window on the display screen of the terminal; the instruction module is further configured to instruct the external display apparatus to display a multi-window screen including a first application window and a second application window, where the first application window is a currently focused application window; the receiving module is further configured to receive an operation of moving a cursor by the user to the third application window; the determining module is further configured to determine that the first position falls within the third application window; and the display module is further configured to switch the currently focused application window from the first application window to the third application window.

With reference to any one of the fifth aspect or the foregoing implementations, in a ninth implementation, the instruction module is further configured to instruct the external display apparatus to display a toolbar window, where the toolbar window includes an icon of a target application; the receiving module is further configured to receive a specific operation performed by the user on the icon of the target application; and the instruction module is further configured to instruct the external display apparatus to display at least one display mode supported by the target application, where the at least one display mode includes at least one of a full-screen display mode, a landscape display mode, and a portrait display mode.

With reference to the ninth implementation of the fifth aspect, in a tenth implementation, in response to an operation of triggering the full-screen display mode by the user, the instruction module is further configured to instruct the external display apparatus to load a full-screen display resource of the target application onto the display screen; in response to an operation of triggering the landscape display mode by the user, the instruction module is further configured to instruct the external display apparatus to load a landscape display resource of the target application onto the display screen; or in response to an operation of triggering the portrait display mode by the user, the instruction module is further configured to instruct the external display apparatus to load a portrait display resource of the target application onto the display screen.

With reference to the tenth implementation of the fifth aspect, in an eleventh implementation, the instruction module is further configured to instruct the external display apparatus to suspend at least one running application.

With reference to the ninth implementation of the fifth aspect, in a twelfth implementation, in response to an operation of triggering a minimized display mode by the user, the instruction module is further configured to instruct the external display apparatus to suspend the running target application.

According to a sixth aspect, this application provides a terminal. The terminal includes a connection module, a display module, an instruction module, and a receiving module. The connection module is configured to connect to an external display apparatus; the display module is configured to display a first screen including a first application and a second application; the instruction module is configured to: when the display module displays the first screen, instruct the external display apparatus to display a first desktop including the first application and the second application, where the first screen is different from the first desktop; and the receiving module is configured to receive a first input of a user on the first screen. The instruction module is further configured to: in response to the first input received by the receiving module, instruct the external display apparatus to display a second desktop including the first application but not including the second application.

With reference to the sixth aspect, in a first implementation, the display module is further configured to: in response to the first input, display a second screen including the first application but not including the second application, or display a second screen including the first application in a selected state and the second application in a non-selected state, where both the first application and the second application on the first screen are in the selected state.

With reference to the first implementation, in a second implementation, the applications included in the second screen displayed by the display module in response to the first input are the same as or different from the applications included in the second desktop.

With reference to any one of the sixth aspect or the foregoing implementations, in a third implementation, the terminal may further include a determining module. The determining module is configured to: before the display module displays the first screen, determine that the terminal is connected to an external device.

With reference to any one of the sixth aspect or the foregoing implementations, in a third implementation, that "the instruction module is configured to instruct the external display apparatus to display a first desktop including the first application and the second application" includes: the instruction module is configured to instruct the external display apparatus to display the first desktop in a first display mode.

With reference to the second implementation, in a fourth implementation, the receiving module is further configured to: after the instruction module instructs the external display apparatus to display the first desktop in the first display mode, receive a second input of the external device for a mode switching option on the first desktop; and the instruction module is further configured to: in response to the second input, instruct the external display apparatus to display the first desktop in a second display mode. Alternatively, the receiving module is further configured to receive a third input of the user on the terminal after the instruction module instructs the external display apparatus to display the first desktop in the first display mode; and the instruction module is further configured to: in response to the third input, instruct the external display apparatus to display the first desktop in a second display mode. For detailed descriptions of the first display mode and the second display mode, refer to the descriptions in the first aspect and the implementations of the first aspect. Details are not repeated in this application.

For the external device and the external display apparatus according to the fifth aspect, the sixth aspect, and the implementations of the fifth aspect and the sixth aspect in this application, refer to the descriptions in the first aspect and the implementations of the first aspect. Details are not repeated in this application.

According to a seventh aspect, this application provides a terminal. The terminal includes: a connection module, configured to connect to an external display apparatus and an external device; a display module, configured to display a first screen, where at least a first application and a second application are displayed on the first screen; a first receiving module, configured to receive a first input of the external device; an instruction module, configured to: in response to the first input received by the first receiving module, instruct the external display apparatus to display a second screen; and a second receiving module, configured to receive a second input for the first application displayed by the display module. The display module is configured to: in response to the second input received by the second receiving module, display a third screen corresponding to the first application, where the terminal remains connected to the external display apparatus and the external device.

With reference to the seventh aspect, in a first implementation, the first screen or the third screen includes a touch drop-down notification bar or a touch suspend button.

The second receiving module is further configured to receive a third input on the first screen or the third screen; the display module is further configured to display a touchpad screen on the terminal in response to the third input received by the second receiving module; the second receiving module is further configured to receive a fourth input on the touchpad screen; and the instruction module is further configured to: in response to the fourth input received by the second receiving module, instruct the external display apparatus to display a fourth screen.

With reference to the seventh aspect or the first implementation, in a second implementation, the display module is further configured to display the touchpad screen when the terminal is not connected to the external device; the second receiving module is further configured to receive the fourth input on the touchpad screen; and the instruction module is further configured to: in response to the fourth input received by the second receiving module, instruct the external display apparatus to display the fourth screen.

With reference to any one of the seventh aspect or the foregoing implementations, in a third implementation, the terminal is connected to the external display apparatus by using an adapter cable or a dock device; or the terminal is connected to the external display apparatus in a wireless connection manner.

According to an eighth aspect, this application provides a terminal. The terminal includes a connection module, an instruction module, and a display module. The connection module is configured to connect to an external display apparatus; the instruction module is configured to instruct the external display apparatus to display a first screen; and the display module is configured to display an operable function item, where the operable function item is related to display content of the first screen, and the operable function item is used to control the display content of the first screen.

According to a ninth aspect, this application provides a terminal, including one or more processors, a memory, a communications interface, and a display screen of the terminal. The memory, the display screen of the terminal, and the communications interface are coupled to the one or more processors, the communications interface is configured to connect to an external display apparatus, and the display screen of the terminal is configured to receive a touch input of a user.

The memory is configured to store computer program code, where the computer program code includes a computer instruction, and when the one or more processors execute the computer instruction, the terminal performs the display method according to any one of the first aspect, the second aspect, the third aspect, or the fourth aspect, or the implementations thereof, to display corresponding content on the display screen of the terminal or instruct the external display apparatus to display corresponding content.

According to a tenth aspect, this application provides a computer storage medium. The computer storage medium includes a computer instruction, and when the computer instruction runs on a terminal, the terminal performs the display method according to any one of the first aspect, the second aspect, the third aspect, or the fourth aspect, or the implementations thereof.

According to an eleventh aspect, this application provides a computer program product. When the computer program product runs on a computer, the computer performs the display method according to any one of the first aspect, the second aspect, the third aspect, or the fourth aspect, or the implementations thereof.

The terminal according to the fifth aspect, the sixth aspect, the seventh aspect, the eighth aspect, and the ninth aspect, the computer storage medium according to the tenth aspect, or the computer program product according to the eleventh aspect provided above is configured to perform the corresponding method according to any one of the first aspect, the second aspect, the third aspect, or the fourth aspect, or the implementations thereof. Therefore, for beneficial effects that can be achieved by the terminal, the computer storage medium, or the computer program product, refer to the beneficial effects in the corresponding method according to any one of the second aspect and the implementations of the second aspect. Details are not repeated herein.

DESCRIPTION OF EMBODIMENTS

The embodiments of the present disclosure provide a display method. The display method may be applied to a terminal, and may be applied to a process of projecting display content of the terminal on an external display apparatus when the terminal is connected to the external display apparatus.

In the embodiments of the present disclosure, the terminal may be connected to the external display apparatus by using a switching device or in a wireless connection manner. In addition, when the terminal is connected to the external display apparatus, the external display apparatus may be or may not be connected to an external device (such as a keyboard and/or a mouse).

For example, the terminal in the embodiments of the present disclosure may be a mobile phone, a tablet computer, a wearable device, an augmented reality (AR)/virtual reality (VR) device, a notebook computer, an ultra-mobile personal computer (UMPC), a netbook, or a personal digital assistant (PDA). This is not limited in the embodiments of the present disclosure. The external display apparatus in the embodiments of the present disclosure may be any display apparatus such as a display of a PC, a television set, a tablet computer, or a projector.

For example, a manner in which the terminal is connected to the external display apparatus is described below by using an example in which the terminal is a mobile phone and the external display apparatus is a display of a PC.

Figure 1:
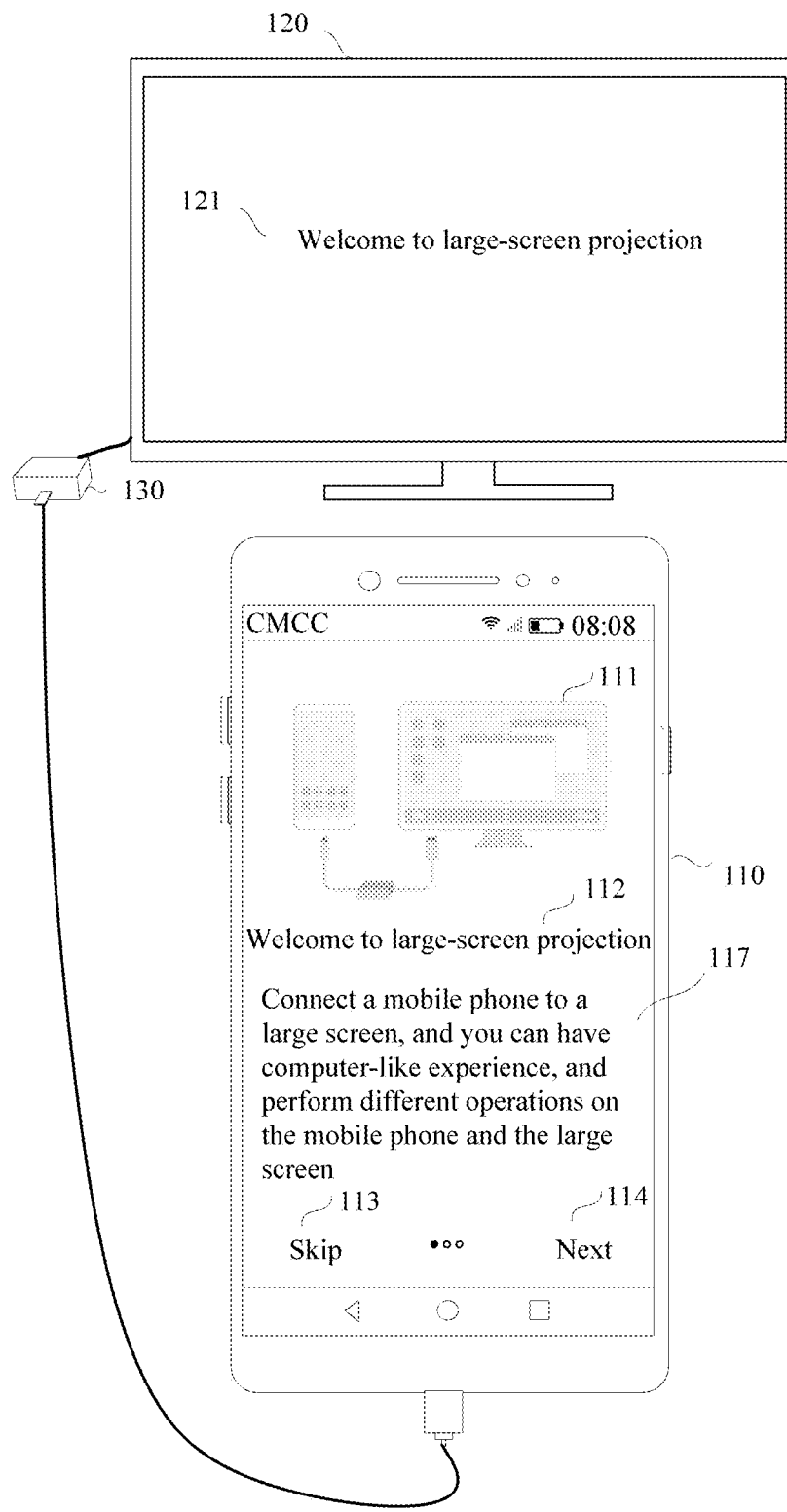
FIG. 1 is a schematic diagram 1 of an example of a connection between a terminal and an external display apparatus according to an embodiment of the present disclosure.

As shown in FIG. 1, a mobile phone 110 may be connected to a display 120 by using a switching device 130. The switching device 130 may be connected to a universal serial bus (USB) interface of a mobile phone data cable, and a type-C interface of a terminal data cable is connected to the mobile phone 110. The switching device 130 may also be connected to the display 120 by using an adapter cable. The adapter cable may include any one of a high definition multimedia interface (HDMI) connection cable, a video graphics array (VGA) connection cable, a digital visual interface (DVI) connection cable, and the like.

The switching device 130 in the embodiments of the present disclosure may be a Mobile High-Definition Link (MHL) device. The MHL device may simultaneously transmit audio signals or video signals of a mobile terminal (such as a mobile phone) to an external display device (namely, the display 120) for display.

Figure 2:
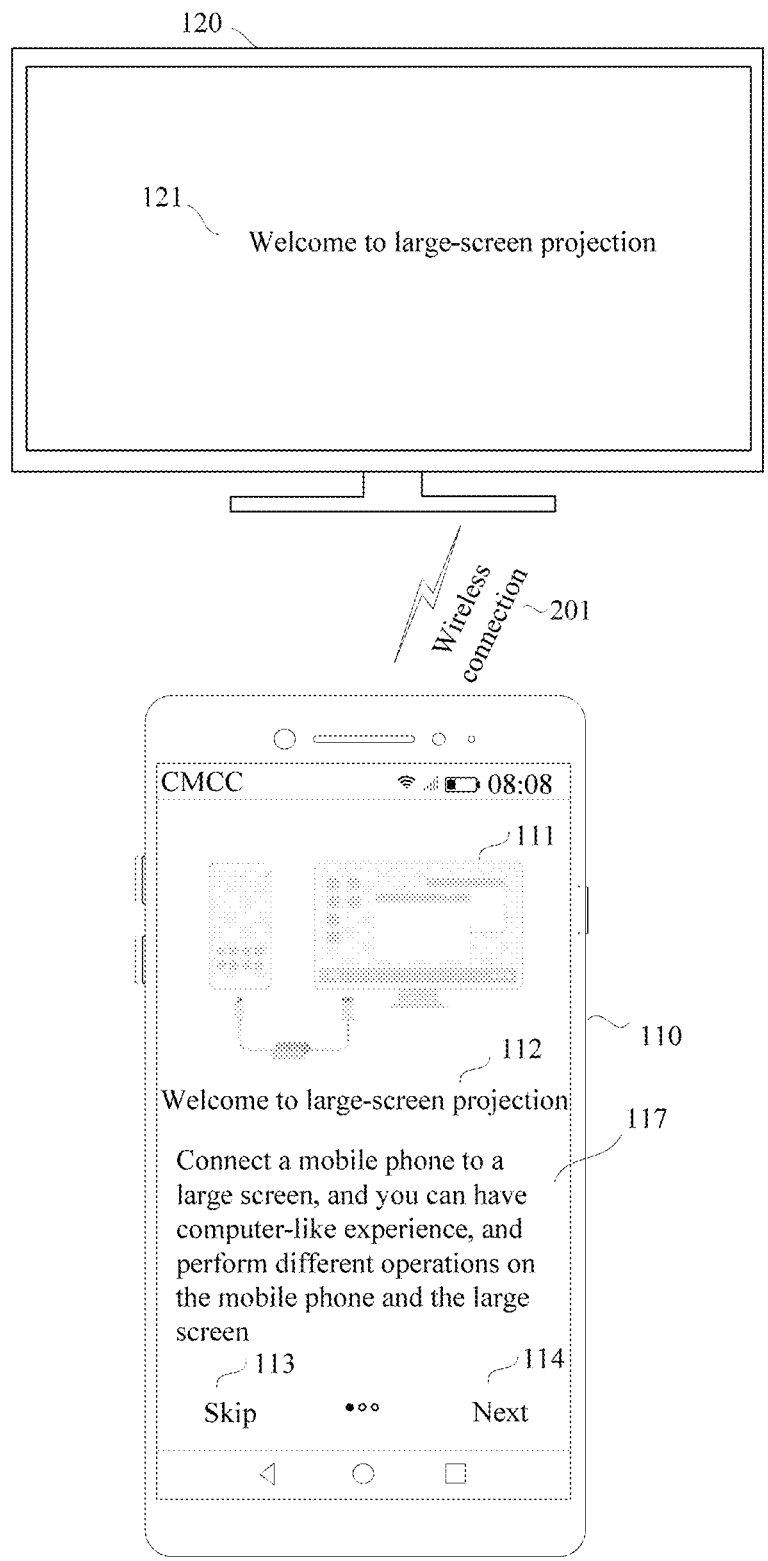
FIG. 2 is a schematic diagram 2 of an example of a connection between a terminal and an external display apparatus according to an embodiment of the present disclosure.

Alternatively, as shown in FIG. 2, the mobile phone 110 may be connected to the display 120 through a wireless connection 201. The wireless connection 201 may be a Bluetooth connection or a Wireless Fidelity (Wi-Fi) connection.

The switching device 130 may further include an interface configured to connect to an external device (a keyboard and/or a mouse), and the external device is configured to control the external display apparatus.

Figure 3:
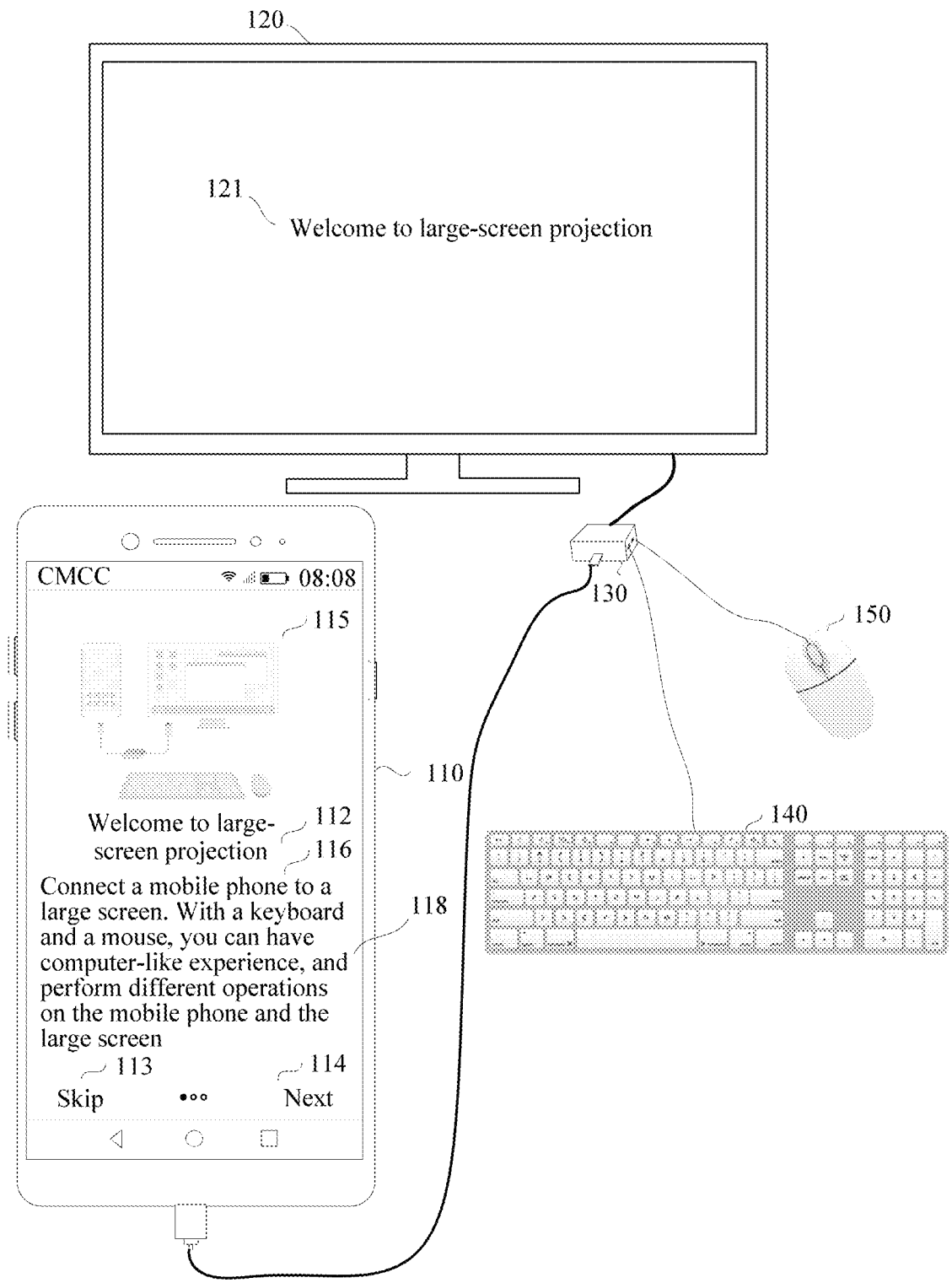
FIG. 3 is a schematic diagram 3 of an example of a connection between a terminal and an external display apparatus according to an embodiment of the present disclosure.
Figure 4:
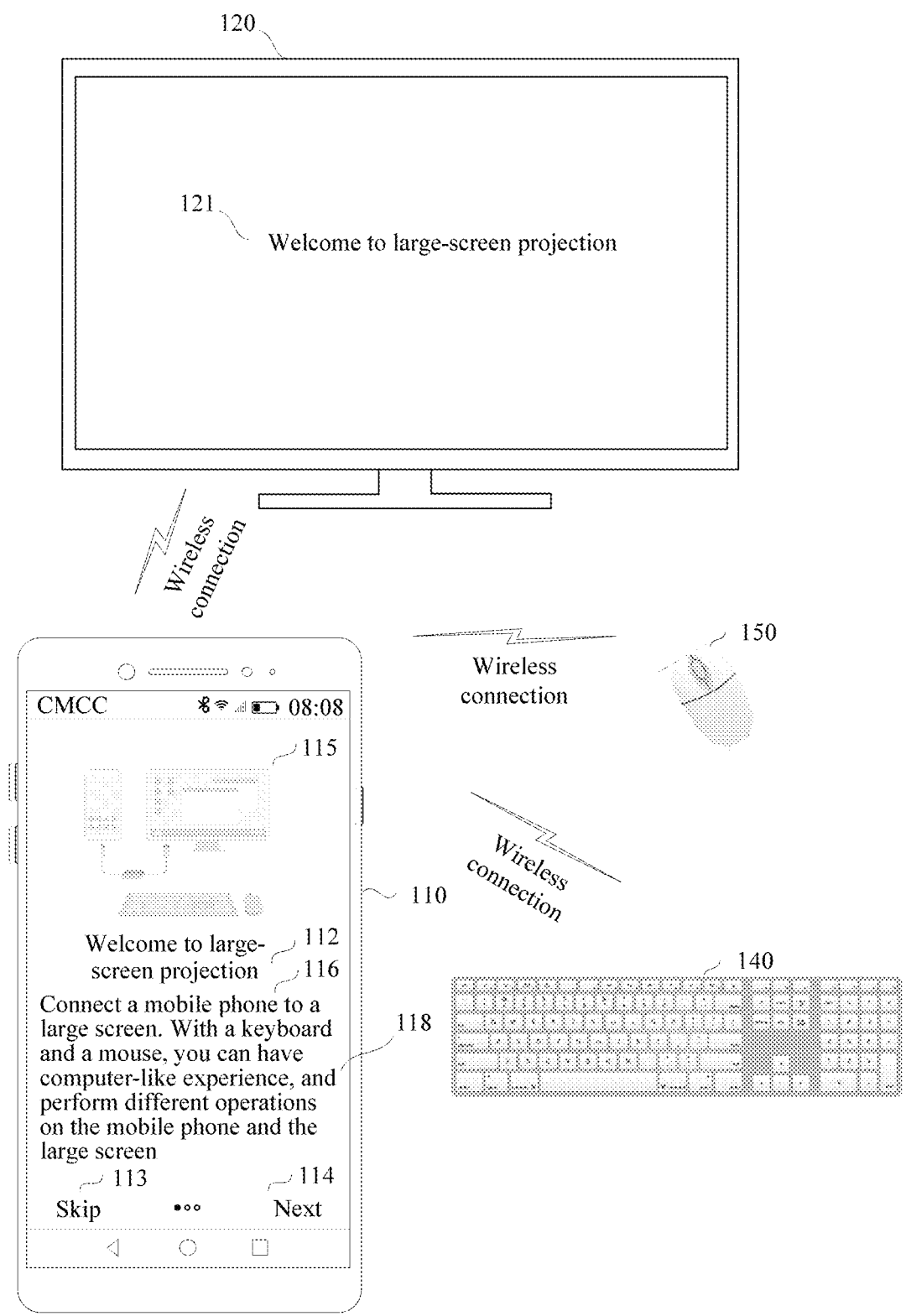
FIG. 4 is a schematic diagram 4 of an example of a connection between a terminal and an external display apparatus according to an embodiment of the present disclosure.

As shown in FIG. 1 or FIG. 2, after the mobile phone 110 is connected to the display 120 by using the switching device 130, the switching device 130 may not be connected to the keyboard and/or the mouse, and the mobile phone 110 is used as a touchpad to control the external display apparatus. Alternatively, as shown in FIG. 3, the switching device 130 may further include interfaces configured to connect to a keyboard 140 and a mouse 150, and connection cables configured to connect to the keyboard 140 and the mouse 150. As shown in FIG. 4, the keyboard 140 and the mouse 150 may also be connected to the display 120 in a wireless manner.

Figure 5:
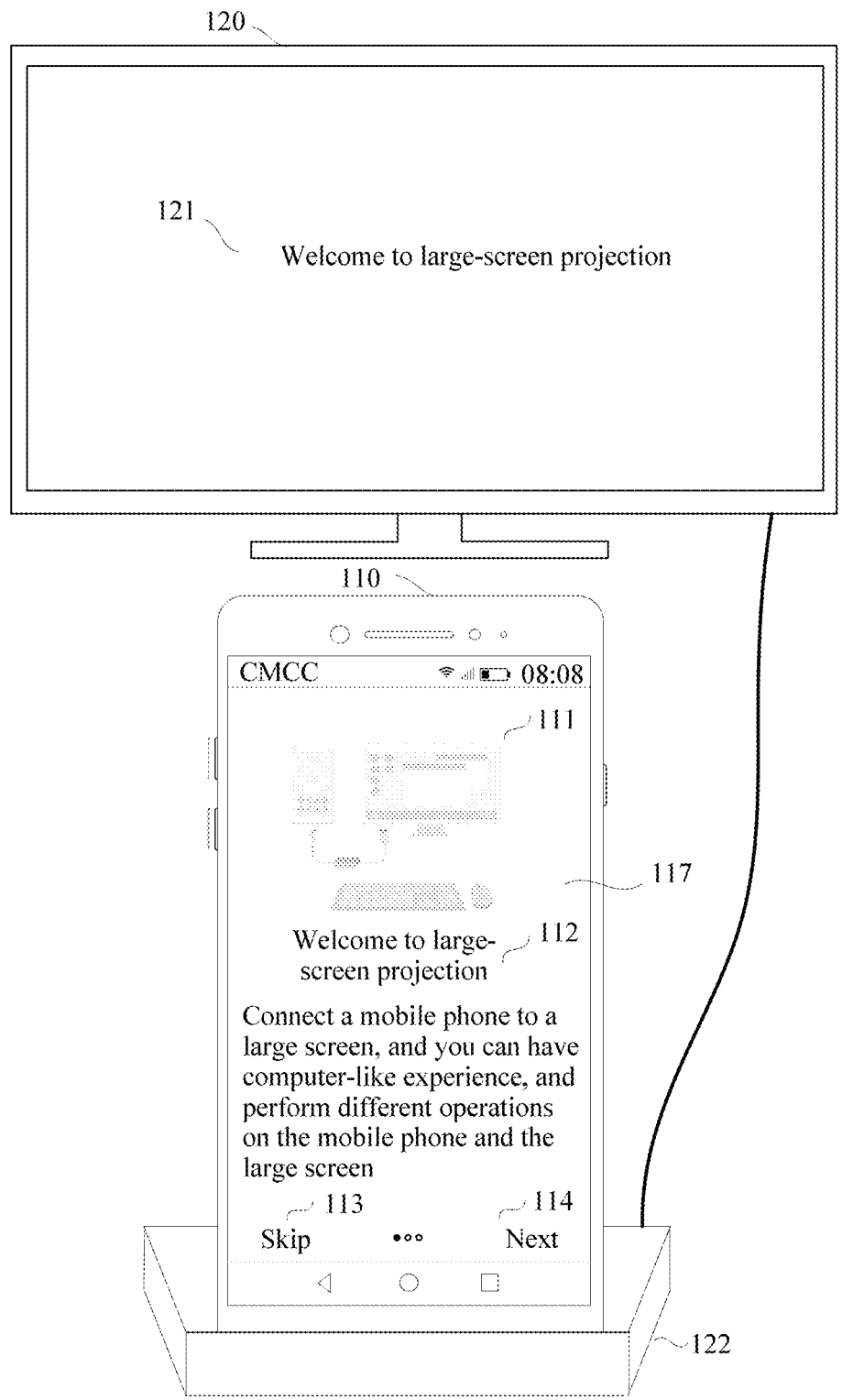
FIG. 5 is a schematic diagram 5 of an example of a connection between a terminal and an external display apparatus according to an embodiment of the present disclosure.

Optionally, the mobile phone may alternatively be connected to the display 120 by using a dock device 122 shown in FIG. 5. The display 120 may also be connected to the keyboard 140 and the mouse 150. For example, each of the keyboard and the mouse may be connected to the dock device 122 by using a connection cable, or the keyboard and the mouse may be connected to the mobile phone 110 or the dock device 122 in a wireless connection manner. The dock device 122 may be one of the foregoing MHL devices.

Figure 6:
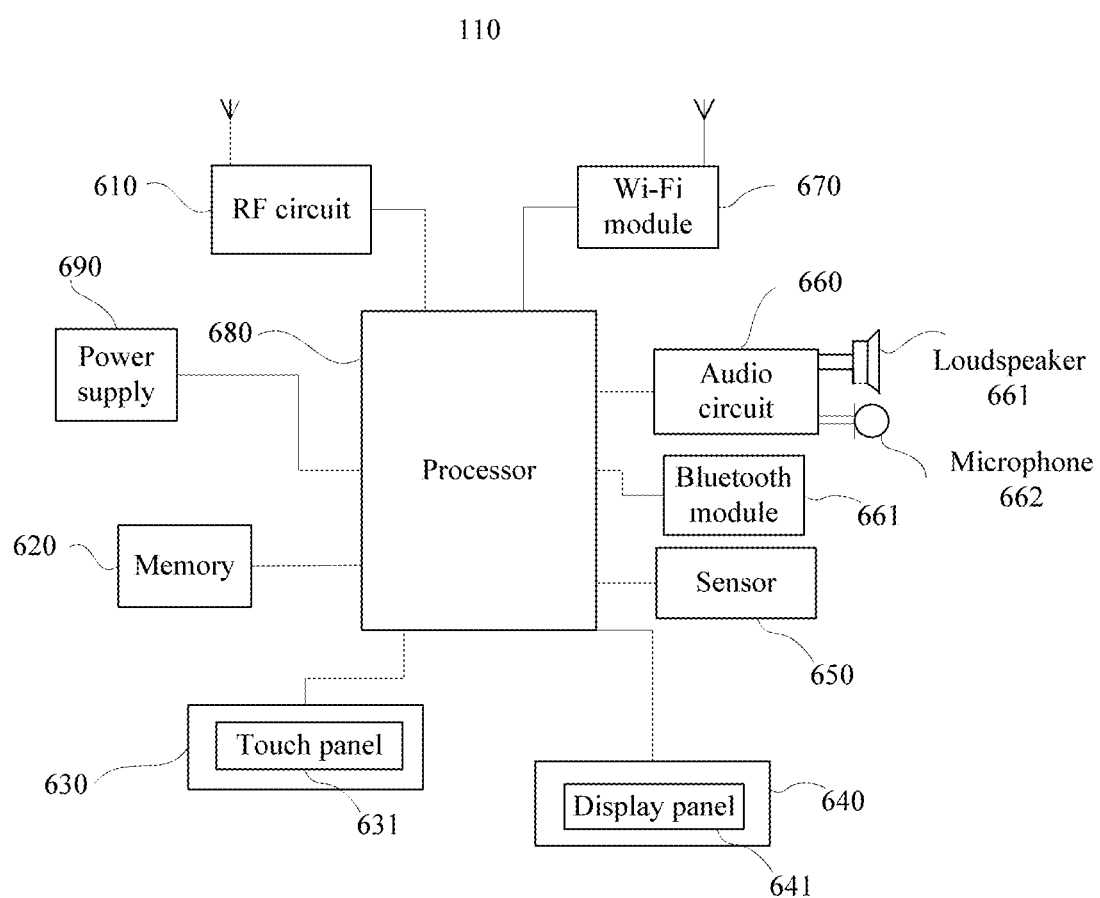
FIG. 6 is a schematic structural diagram of hardware of a mobile phone according to an embodiment of the present disclosure.

How the terminal implements specific technical solutions in the embodiments is described in the following embodiments by using a mobile phone as an example. As shown in FIG. 6, a terminal in this embodiment may be the mobile phone 110. This embodiment is specifically described below by using the mobile phone 110 as an example.

It is understood that the illustrated mobile phone 110 is only an example of the terminal, and the mobile phone 110 may have components more or fewer than those shown in the figure, a combination of two or more components, or components disposed differently. Various components shown in FIG. 6 may be implemented in hardware including one or more signal processors and/or application-specific integrated circuits, software, or a combination of hardware and software.

As shown in FIG. 6, the mobile phone 110 includes components such as a radio frequency (RF) circuit 610, a memory 620, an input unit 630, a display unit 640, a sensor 650, an audio circuit 660, a Wireless Fidelity (Wi-Fi) module 670, a processor 680, and a power supply 690. A person skilled in the art can understand that a structure of the mobile phone shown in FIG. 6 constitutes no limitation to the mobile phone, and the mobile phone may include components more or fewer than those shown in the figure, or a combination of some components, or components disposed differently.

The following describes each component of the mobile phone 110 with reference to FIG. 6.

The RF circuit 610 may be configured to receive and send information, or receive and send signals in a call process. The RF circuit 610 may receive downlink information of a base station, and then send the downlink information to the processor 680 for processing; and also send related uplink data to the base station. Usually, the RF circuit includes but is not limited to devices such as an antenna, at least one amplifier, a transceiver, a coupler, a low noise amplifier, and a duplexer. In addition, the RF circuit 610 may further communicate with a network and another mobile device through wireless communication. Any communications standard or protocol may be used for the wireless communication, including but not limited to Global System for Mobile Communications, general packet radio service, Code Division Multiple Access, Wideband Code Division Multiple Access, Long Term Evolution, email, and a short message service.

The memory 620 may be configured to store a software program and data. The processor 680 executes various functions of the mobile phone 110 and processes data by running the software program and the data stored in the memory 620. The memory 620 may mainly include a program storage area and a data storage area. The program storage area may store an operating system, an application program required by at least one function (such as a voice play function or an image play function), and the like. The data storage area may store data (such as audio data and a phone book) and the like created based on use of the mobile phone 110. In addition, the memory 620 may include a high-speed random access memory, and may also include a non-volatile memory such as at least one disk storage device, a flash memory device, or another non-volatile solid-state storage device. In the following embodiments, the memory 620 stores an operating system that enables the mobile phone 110 to run, such as an iOS® operating system developed by Apple Inc., an Android® open source operating system developed by Google Inc., or a Windows® operating system developed by Microsoft Corporation.

The input unit 630 (such as a touchscreen) may be configured to receive entered digital or character information, and generate signal input related to user setting and function control of the mobile phone 110. The input unit 630 may include a touch panel 631, and the touch panel 631 may collect a touch operation performed by a user on or near the touch panel 631 (such as an operation performed by the user on the touch panel 631 or near the touch panel 131 by using any suitable object or accessory such as a finger or a stylus), and drive a corresponding connection apparatus according to a preset program. Optionally, the touch panel 631 may include two parts: a touch detection apparatus and a touch controller (not shown in FIG. 6). The touch detection apparatus detects a touch direction of the user, detects a signal generated by the touch operation, and transmits the signal to the touch controller. The touch controller receives touch information from the touch detection apparatus, converts the touch information into touch point coordinates, and transmits the touch point coordinates to the processor 680, and can receive and execute an instruction transmitted by the processor 680. In addition, the touch panel 631 may be implemented by using a plurality of types such as a resistive type, a capacitive type, an infrared type, and a surface acoustic wave type.

The display unit 640 (namely, a display screen) may be configured to display information entered by the user or information provided for the user, and graphical user interfaces (GUI) of various menus of the mobile phone 110. The display unit 640 may include a display panel 641 disposed on a front face of the mobile phone 110. The display panel 641 may be configured in a form of an external liquid crystal display apparatus, a light-emitting diode, or the like.

In some embodiments, an optical touch key may be disposed at the bottom of the front face of the mobile phone 110, and the touch panel 631 and the display panel 641 are further disposed. The touch panel 631 covers the display panel 641. After a touch operation on or near the touch panel 631 is detected, the touch panel 631 transfers the information about the touch operation to the processor 680 to determine a touch event, and then the processor 680 provides a corresponding visual output on the display panel 641 based on a type of the touch event. In FIG. 6, the touch panel 631 and the display panel 641 are configured as two independent components to implement input and output functions of the mobile phone 110. However, in some embodiments, the touch panel 631 and the display panel 641 may be integrated to implement the input and output functions of the mobile phone 110. The integrated touch panel 631 and display panel 641 may be referred to as a touch display screen.

In some other embodiments, a pressure sensor may be further disposed on the touch panel 631. In this way, when the user performs a touch operation on the touch panel, the touch panel can further detect pressure of the touch operation, so that the mobile phone 110 can more accurately detect the touch operation.

The mobile phone 110 may further include at least one sensor 650 such as a light sensor, a motion sensor, and another sensor. The light sensor may include an ambient light sensor and a proximity sensor. The ambient light sensor 651 may adjust luminance of the display panel 641 according to brightness of ambient light. The optical proximity sensor 652 is disposed on the front face of the mobile phone 110. When the mobile phone 110 moves close to an ear, the mobile phone 110 turns off a power supply of the display panel 641 based on detection by the optical proximity sensor 652. In this way, the mobile phone 110 may further save electricity. As a type of motion sensor, an accelerometer sensor may detect magnitudes of acceleration in various direction (usually three axes), may detect, in a static state, a magnitude and a direction of gravity, and may be used for an application recognizing a posture of the mobile phone (such as screen switching between a landscape mode and a portrait mode, a related game, and magnetometer posture calibration), a vibration identification-related function (such as a pedometer or tapping), and the like. For other sensors that may also be configured for the mobile phone 110, such as a gyroscope, a barometer, a hygrometer, a thermometer, and an infrared sensor, details are not described herein.

The audio circuit 660, a loudspeaker 661, and a microphone 662 may provide an audio interface between the user and the mobile phone 110. The audio circuit 660 may transmit, to the loudspeaker 661, an electrical signal converted from received audio data, and the loudspeaker 661 converts the electrical signal into a sound signal and outputs the sound signal. In addition, the microphone 262 converts a collected sound signal into an electrical signal, and the audio circuit 660 receives the electrical signal, converts the electrical signal into audio data, and outputs the audio data to the RF circuit 610, so that the audio data is sent to, for example, another mobile phone, or outputs the audio data to the memory 620 for further processing.

Wi-Fi is a short-range wireless transmission technology. With the Wi-Fi module 670, the mobile phone 110 may help the user receive and send emails, browse a web page, access streaming media, and the like. The Wi-Fi module 670 provides wireless access to the broadband Internet for the user.

The processor 680 is a control center of the mobile phone 110, and is connected to all components of the entire mobile phone by using various interfaces and lines. By running or executing the software program stored in the memory 620 and invoking the data stored in the memory 620, the processor 680 executes various functions of the mobile phone 110 and processes data, so as to perform overall monitoring on the mobile phone. In some embodiments, the processor 680 may include one or more processing units. An application processor and a modem processor may be integrated into the processor 680. The application processor mainly processes an operating system, a user interface, an application program, and the like, and the modem processor mainly processes wireless communication. The modem processor may be not integrated into the processor 680.

A Bluetooth module 681 is configured to exchange information with another device by using a short-range communications protocol such as Bluetooth. For example, the mobile phone 110 may establish a Bluetooth connection to a wearable electronic device (such as a smartwatch) that also has a Bluetooth module by using the Bluetooth module 681, to exchange data.

The mobile phone 110 further includes the power supply 690 (such as a battery) that supplies power to each component. The power supply may be logically connected to the processor 680 by using a power supply management system, so as to implement functions such as charging management, discharging management, and power consumption management by using the power supply management system. In the following embodiments, the power supply 690 may be configured to supply power to the display panel 641 and the touch panel 631.

All methods in the following embodiments may be implemented in the mobile phone 110 having the foregoing hardware structure.

Operations of the methods in subsequent embodiments of the present disclosure may be performed by the foregoing terminal, or display methods provided in the embodiments of the present disclosure may be performed by some function modules of the terminal, such as a central processing unit (CPU) of the terminal. This is not limited in the embodiments of the present disclosure. In the embodiments of the present disclosure, the display methods provided in the embodiments of the present disclosure are described in detail by using an example in which the terminal performs the display methods.

Figure 7:
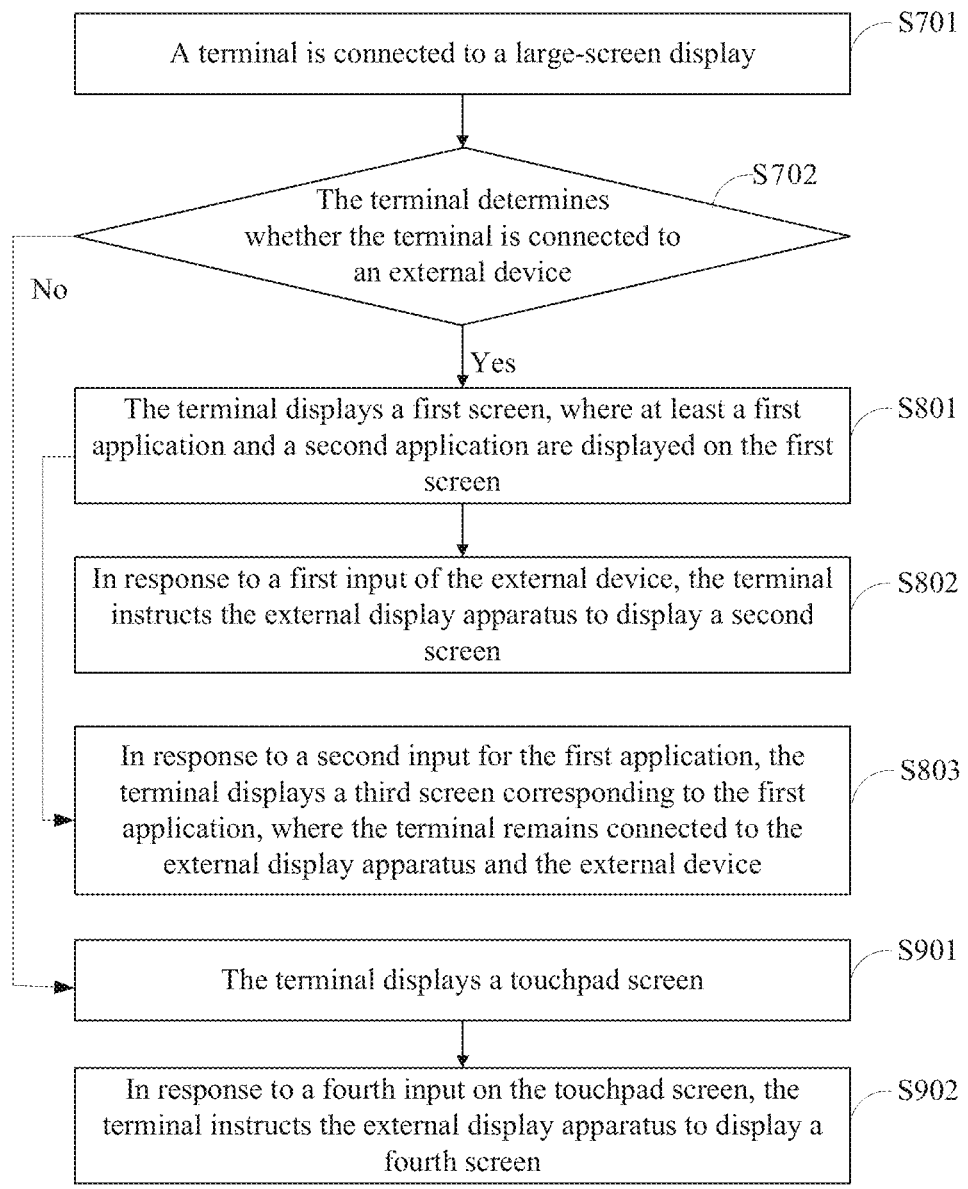
FIG. 7 is a flowchart 1 of a display method according to an embodiment of the present disclosure.

An embodiment of the present disclosure provides a display method. As shown in FIG. 7, the display method may include S701 and S702 and subsequent method processes.

S701: A terminal is connected to an external display apparatus.

For example, as shown in any one of FIG. 1 to FIG. 5, the terminal may be connected to the external display apparatus in a wired connection or wireless connection manner.

Optionally, when the terminal is connected to the external display apparatus, the terminal may display a Large-screen projection welcome screen 117 shown in any one of FIG. 1, FIG. 2, or FIG. 5 on a display screen of the terminal, or the terminal may display a "large-screen projection welcome screen" 118 shown in FIG. 3 or FIG. 4 on a display screen of the terminal. When the terminal is connected to an external device, the terminal may display the "large-screen projection welcome screen" 118 shown in FIG. 3 or FIG. 4 on the display screen of the terminal; or when the external display apparatus is not connected to an external device, the terminal may display the "large-screen projection welcome screen" 117 shown in any one of FIG. 1, FIG. 2, or FIG. 5 on the display screen of the terminal.

The terminal may display a "Welcome to large-screen projection" prompt 121 shown in any one of FIG. 1 to FIG. 5 on the external display apparatus.

Figure 8:
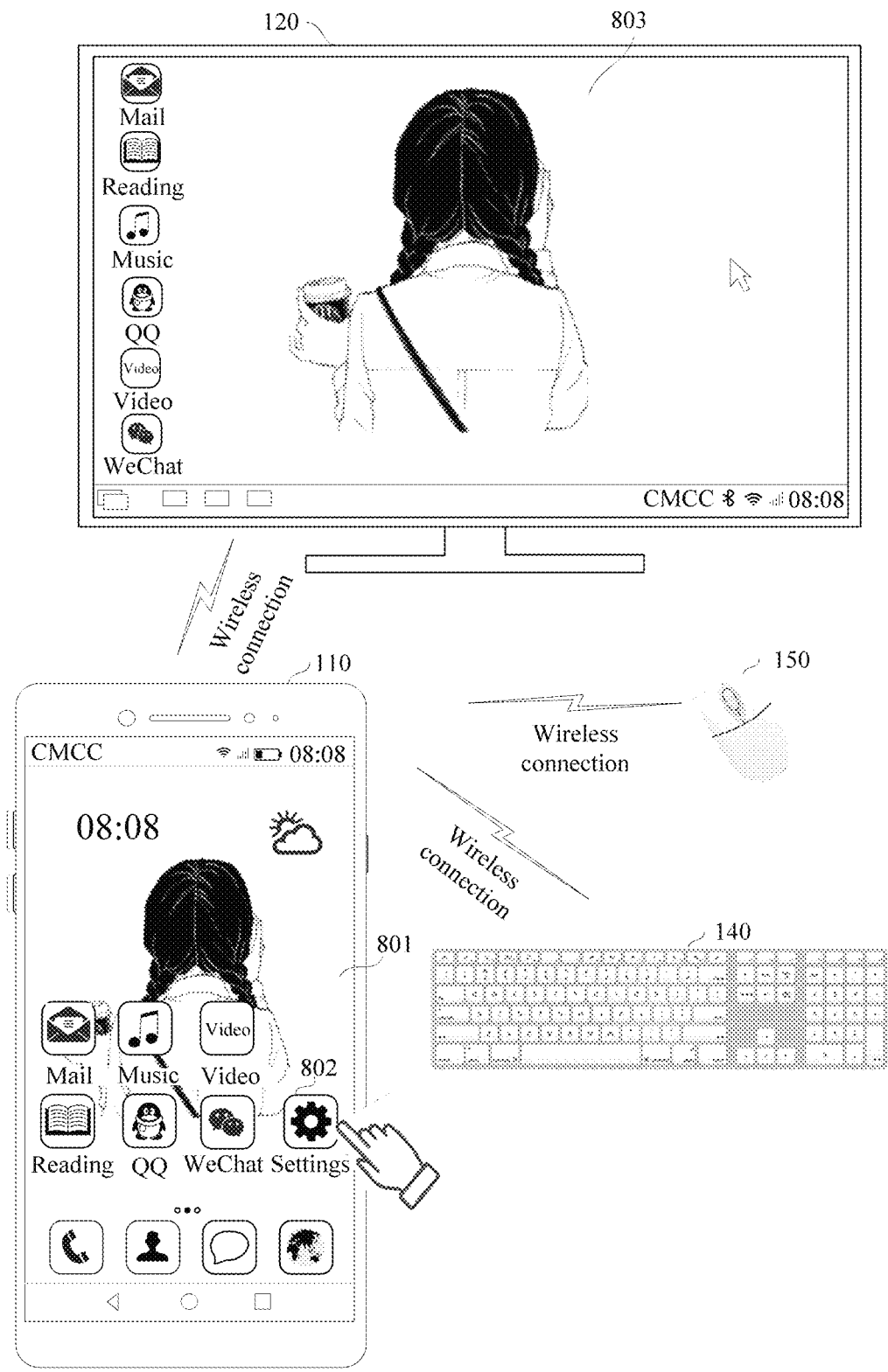
FIG. 8 is a schematic diagram 1 of an example of a displayed screen of a terminal and an external display apparatus according to an embodiment of the present disclosure.

Using FIG. 4 as an example, when a user taps a "Skip" option 113 on the "large-screen projection welcome screen" 118 shown in FIG. 4, or after the terminal displays the "large-screen projection welcome screen" 118 shown in FIG. 4 on the display screen of the terminal for a specific time, the terminal may display a terminal screen 801 shown in FIG. 8 on the display screen of the terminal, and display a large-screen window 803 shown in FIG. 8 on the external display apparatus.

S702: The terminal determines whether the terminal is connected to an external device.

The external device includes a keyboard and/or a mouse. The external device may further include other devices such as a sounder and a microphone.

When the terminal is connected to the external device, S801 to S803 may be performed; or when the external display apparatus is not connected to the external device, S901 and S902 may be performed.

S801: The terminal displays a first screen, where at least a first application and a second application are displayed on the first screen.

S802: In response to a first input of the external device, the terminal instructs the external display apparatus to display a second screen.

S803: In response to a second input for the first application, the terminal displays a third screen corresponding to the first application, where the terminal remains connected to the external display apparatus and the external device.

When the terminal is connected to the external device, a cursor of the external display apparatus may be controlled by the keyboard or the mouse, and the terminal may display the second screen on the external display apparatus in response to the first input of the keyboard or the mouse. Content displayed by the terminal may be the third screen displayed by the terminal in response to the second input for the first application displayed on a display panel of the terminal (such as the display screen of the terminal). A touch panel and the display panel of the terminal may be integrated as the display screen of the terminal.

The second screen and the third screen may be the same or different. However, the second screen is content displayed on the external display apparatus after the terminal receives an input of the external device, and the third screen is content displayed on the display panel of the terminal after the terminal receives an input on the touch panel of the terminal.

Figure 9:
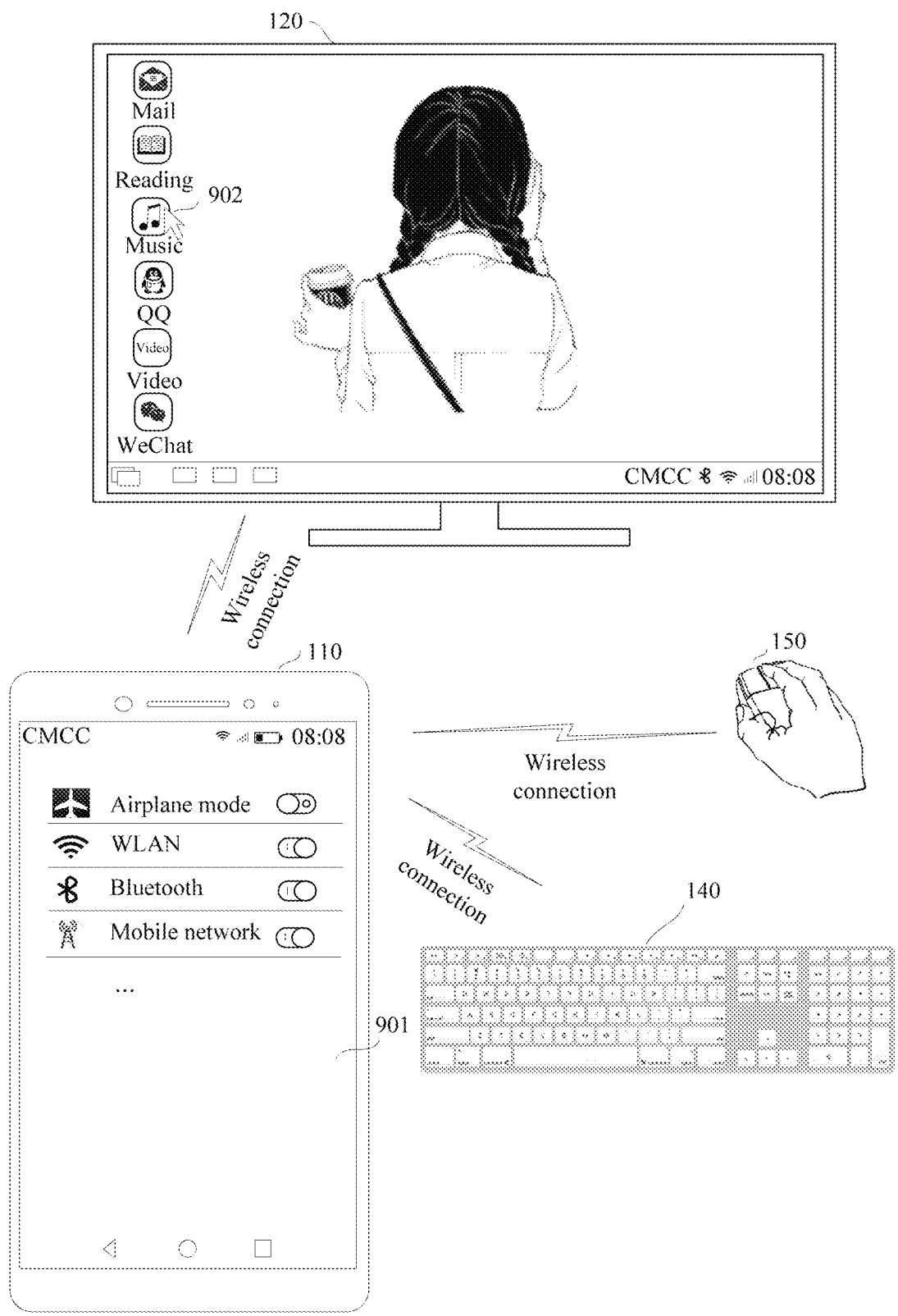
FIG. 9 is a schematic diagram 2 of an example of a displayed screen of a terminal and an external display apparatus according to an embodiment of the present disclosure.

For example, when the user taps a "Settings" option 802 on the terminal screen 801 shown in FIG. 8 by using a finger, the terminal may display a "settings screen" 901 (namely, the third screen) shown in FIG. 9 on the display screen of the terminal in response to the tap operation (namely, the second input on the display screen of the terminal) performed by the user on the "Settings" option 802 on the display screen of the terminal.

Figure 10:
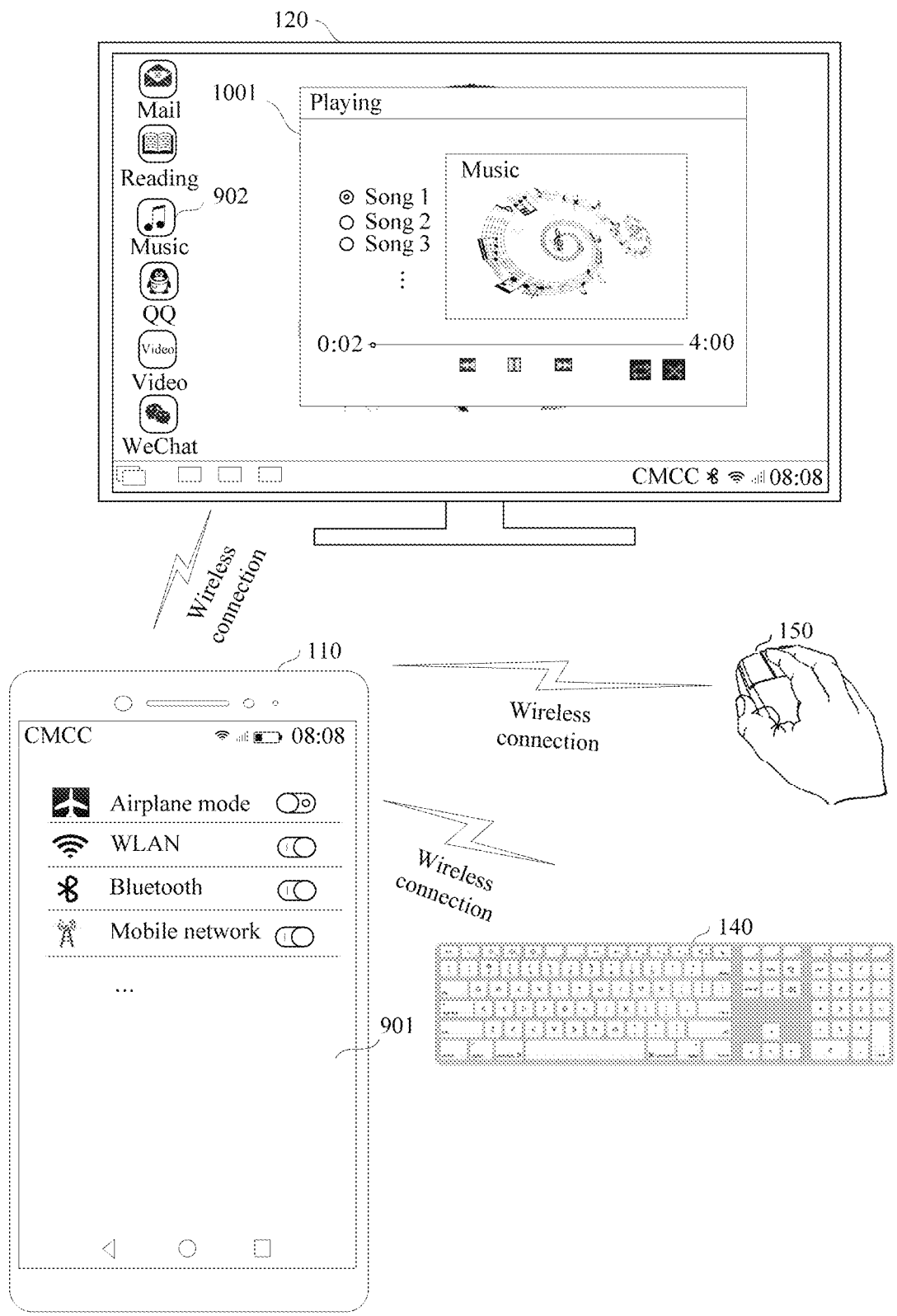
FIG. 10 is a schematic diagram 3 of an example of a displayed screen of a terminal and an external display apparatus according to an embodiment of the present disclosure.

As shown in FIG. 9, when the user controls, by using the mouse, the cursor of the external display apparatus to move to a "Music" option 902 displayed on the external display apparatus, and taps or double-taps the "Music" option 902, the terminal may display a "music play screen" 1001 (namely, the second screen) shown in FIG. 10 on the external display apparatus in response to the first input of the mouse (namely, the external device) on the external display apparatus.

As shown in FIG. 9 and FIG. 10, the terminal screen (the third screen) displayed on the terminal is different from the large-screen window (the second screen) displayed on the external display apparatus. In other words, the terminal and the external display apparatus may be independent of each other and display different content.

When the external display apparatus is not connected to the external device, the terminal may be used as a touchpad to control the external display apparatus. When the external display apparatus is not connected to the external device, the method in this embodiment of the present disclosure may further include S901 and S902.

S901: The terminal displays a touchpad screen.

Figure 11:
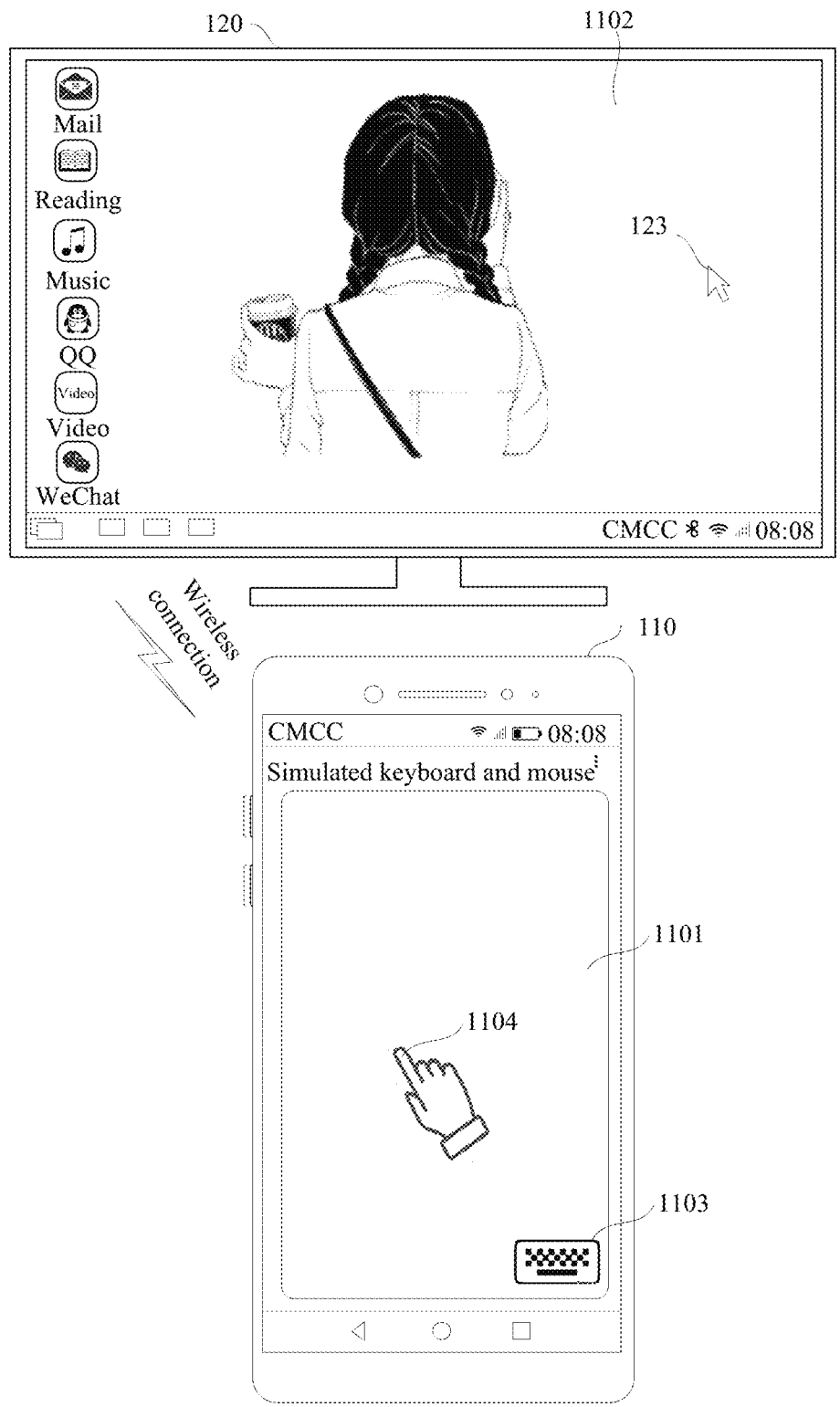
FIG. 11 is a schematic diagram 4 of an example of a displayed screen of a terminal and an external display apparatus according to an embodiment of the present disclosure.

Using FIG. 2 as an example, when the external display apparatus is not connected to the external device, if the user taps a "Skip" option 113 on the "large-screen projection welcome screen" 117 shown in FIG. 2, or after the terminal displays the "large-screen projection welcome screen" 117 shown in FIG. 2 on the display screen of the terminal for a specific time, the terminal may display a touchpad screen 1101 shown in FIG. 11 on the display screen of the terminal, and display a large-screen window 1102 shown in FIG. 11 on the external display apparatus.

When the user touches the touchpad screen 1101 shown in FIG. 11 by using a finger 1104, and moves the finger 1104 on the touchpad screen 1101, a cursor 123 in the large-screen window 1102 shown in FIG. 11 may be controlled to correspondingly move.

S902: In response to a fourth input on the touchpad screen, the terminal instructs the external display apparatus to display a fourth screen.

For a method for controlling, by the terminal as the touchpad of the external display apparatus, the external display apparatus to display corresponding display content, refer to related descriptions in the prior art. Details are not repeated in this embodiment of the present disclosure.

According to the display method provided in this embodiment of the present disclosure, when the terminal is connected to the external display apparatus and the external display apparatus is connected to the external device, the terminal may use the external device to control the external display apparatus to display the second screen, and the terminal may be independent of the external display apparatus, and display the third screen in response to the input on the display screen of the terminal. In other words, the terminal and the external display apparatus may be independent of each other and display different content.

Figure 12:
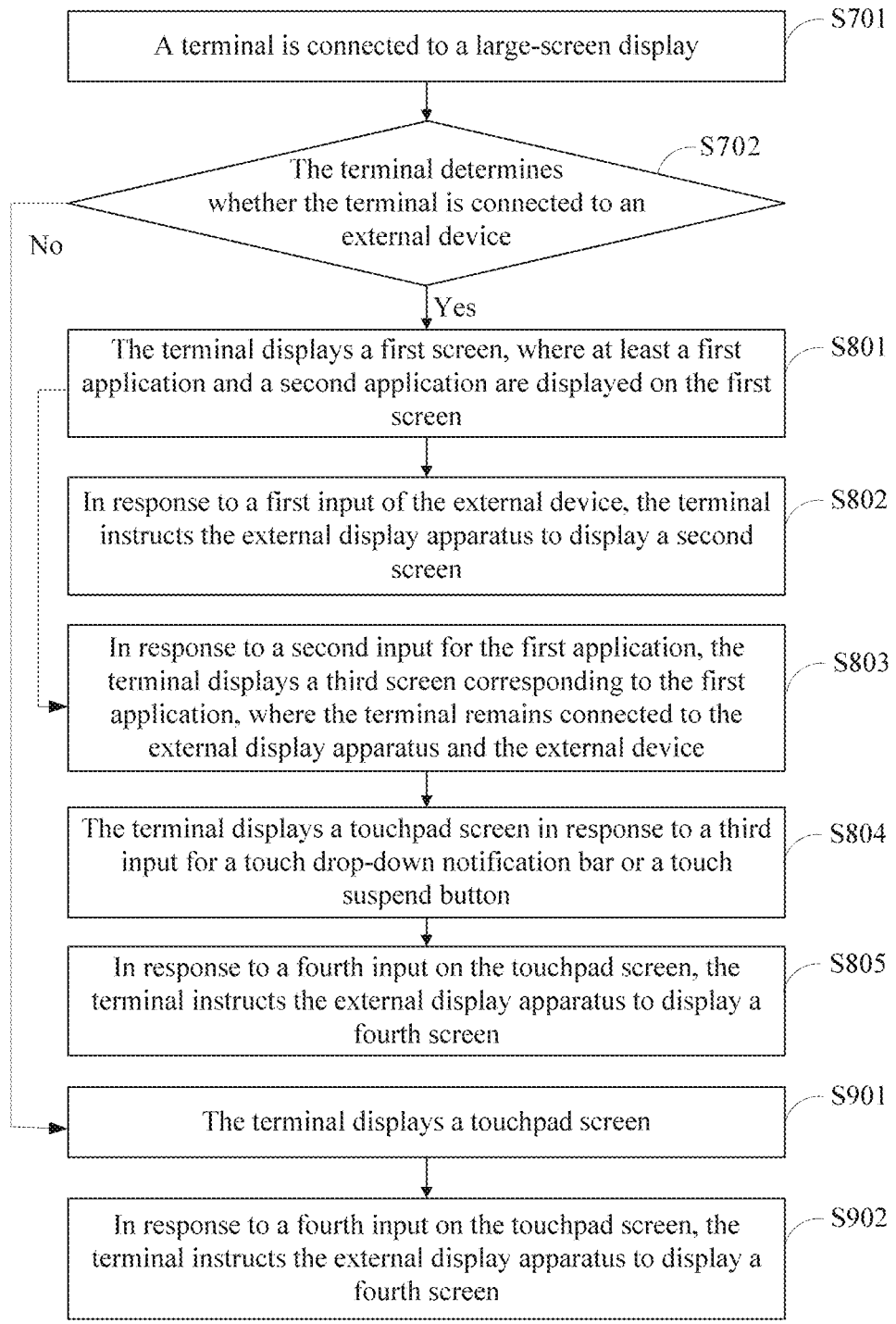
FIG. 12 is a flowchart 2 of a display method according to an embodiment of the present disclosure.

Optionally, in an application scenario of this embodiment of the present disclosure, the first screen and/or the third screen may further include a touch drop-down notification bar or a touch suspend button. In this application scenario, even if the terminal is connected to the external device, the user may use the touch drop-down notification bar or the touch suspend button to control the terminal to serve as the touchpad of the external display apparatus. In other words, in this application scenario, the content displayed by the external display apparatus may be controlled by the external device (namely, the mouse and/or the keyboard), or may be controlled by the display screen, as the touchpad, of the terminal. As shown in FIG. 12, after S803 shown in FIG. 7, the method in this embodiment of the present disclosure may further include S804 and S805.

S804: The terminal displays a touchpad screen in response to a third input for a touch drop-down notification bar or a touch suspend button.

The first screen or the third screen may further include the touch drop-down notification bar or the touch suspend button. Using FIG. 8 as an example, as shown in FIG. 13, a "Touch drop-down notification bar" 1301 may also be displayed on the first screen or the third screen displayed by the terminal.

Figure 14:
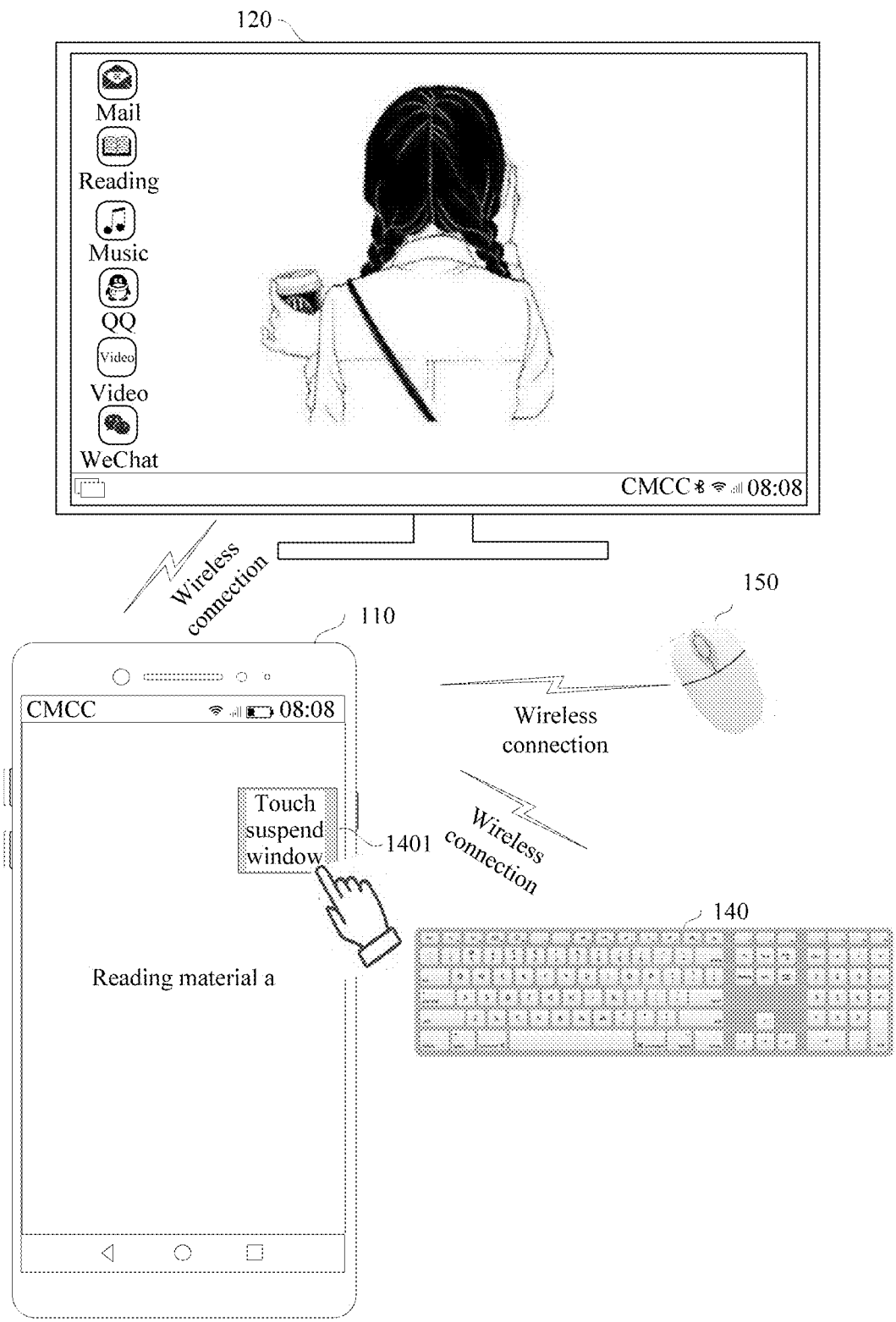
FIG. 14 is a schematic diagram 6 of an example of a displayed screen of a terminal and an external display apparatus according to an embodiment of the present disclosure.

Alternatively, as shown in FIG. 14, assuming that the terminal is displaying a "Reading material a" screen of a "Reading" application, a "Touch suspend button" 1401 may be displayed on the "Reading material a" screen shown in FIG. 14. The "Touch suspend button" 1391 may be displayed at any position on the terminal along a drag track in response to a drag operation performed by the user on the "Touch suspend button" 1391.

Figure 13:
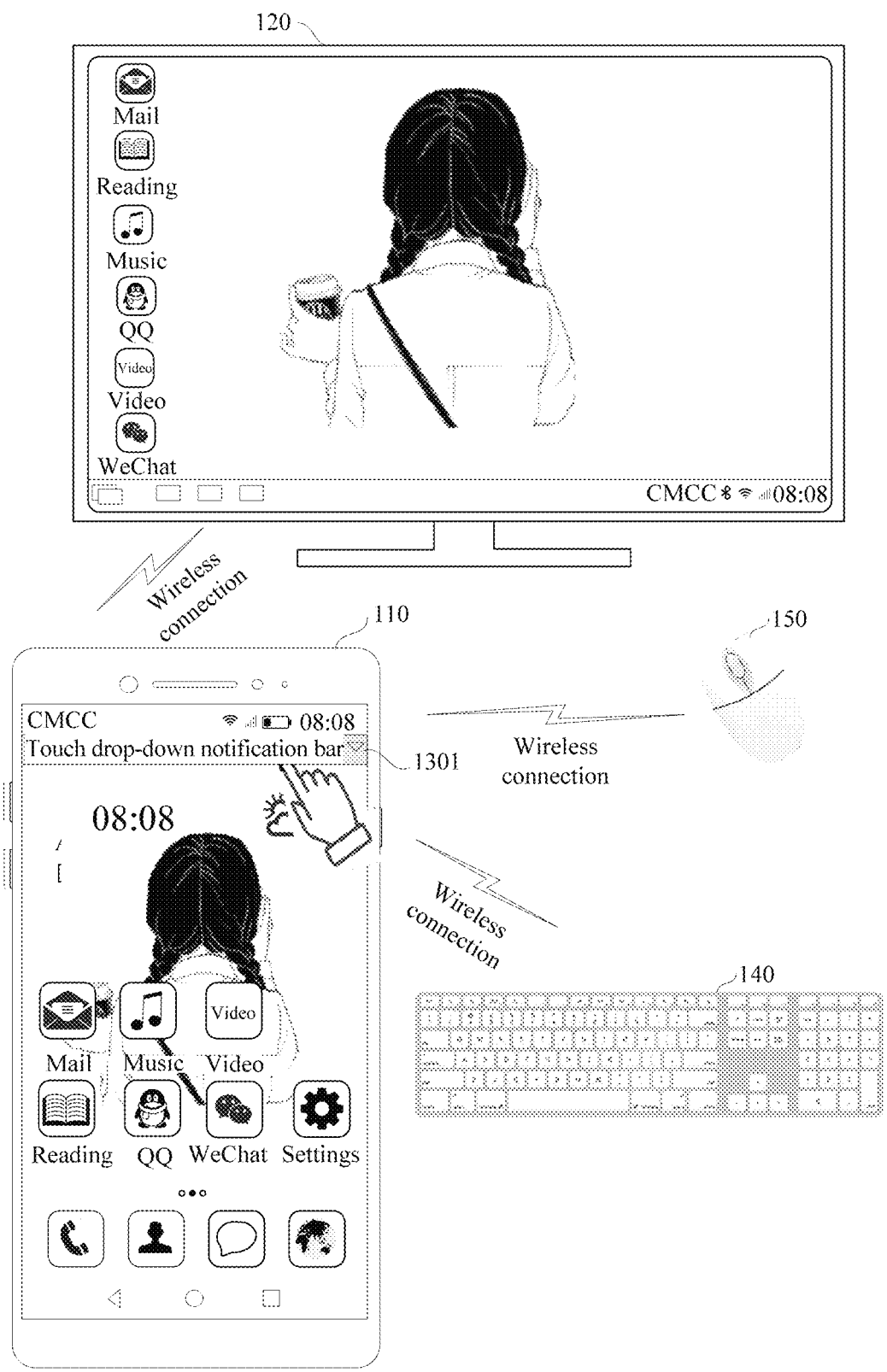
FIG. 13 is a schematic diagram 5 of an example of a displayed screen of a terminal and an external display apparatus according to an embodiment of the present disclosure.
Figure 15:
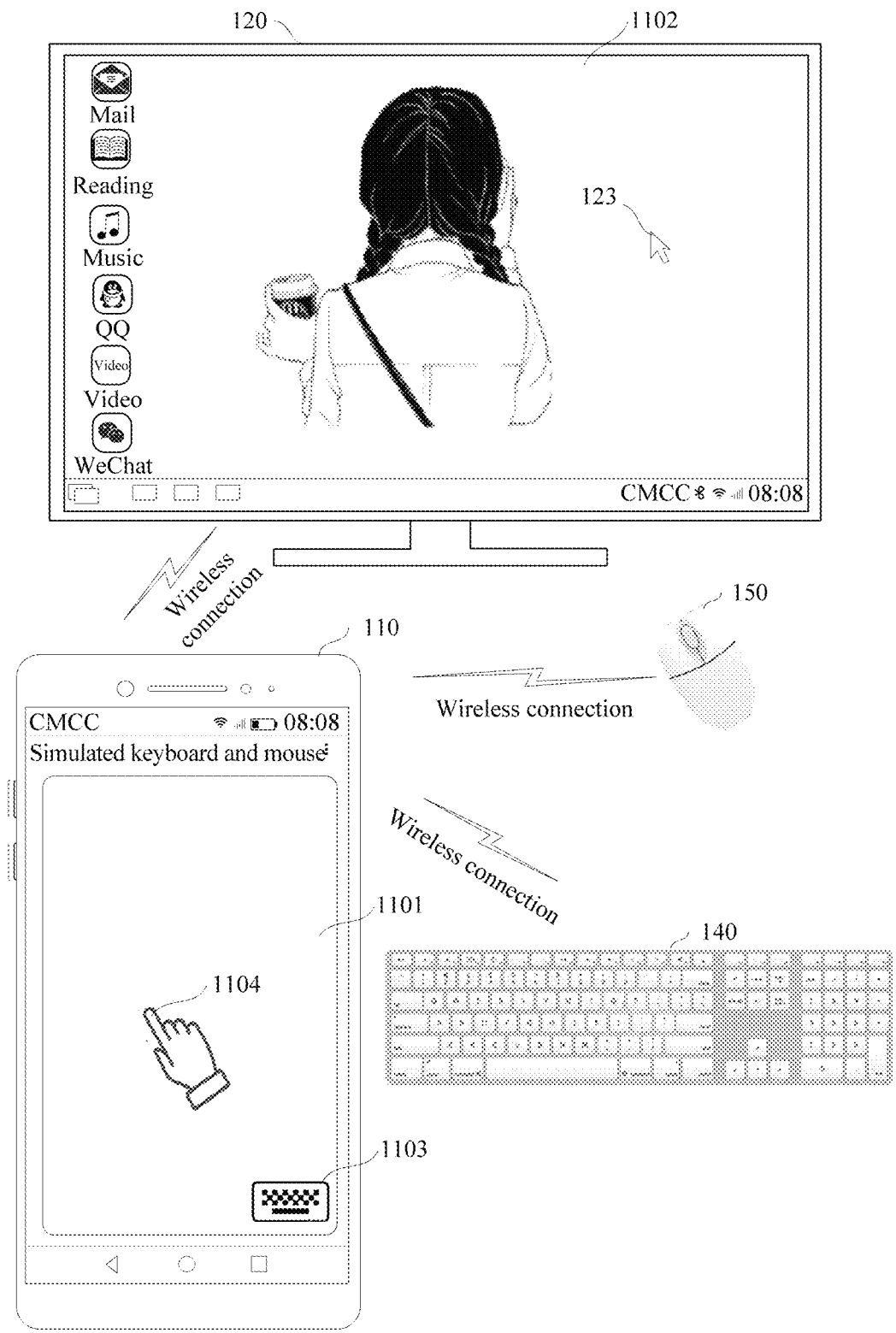
FIG. 15 is a schematic diagram 7 of an example of a displayed screen of a terminal and an external display apparatus according to an embodiment of the present disclosure.

For example, when the user taps the "Touch drop-down notification bar" 1301 shown in FIG. 13 by using the finger, or when the user taps the "Touch suspend button" 1391 shown in FIG. 14 by using the finger, the terminal may display the touchpad screen 1101 shown in FIG. 15.

When the user touches the touchpad screen 1101 shown in FIG. 15 by using the finger 1104, and moves the finger 1104 on the touchpad screen 1101, the cursor 123 in the large-screen window 1102 shown in FIG. 15 may be controlled to correspondingly move.

The terminal, as the touchpad, not only can control the cursor 123 in the large-screen window 1102, but also can enter a character or a text on the external display apparatus by using a virtual keyboard icon on a touch screen. The touch screen displayed on the display screen of the terminal may further include the virtual keyboard icon.

Figure 16:
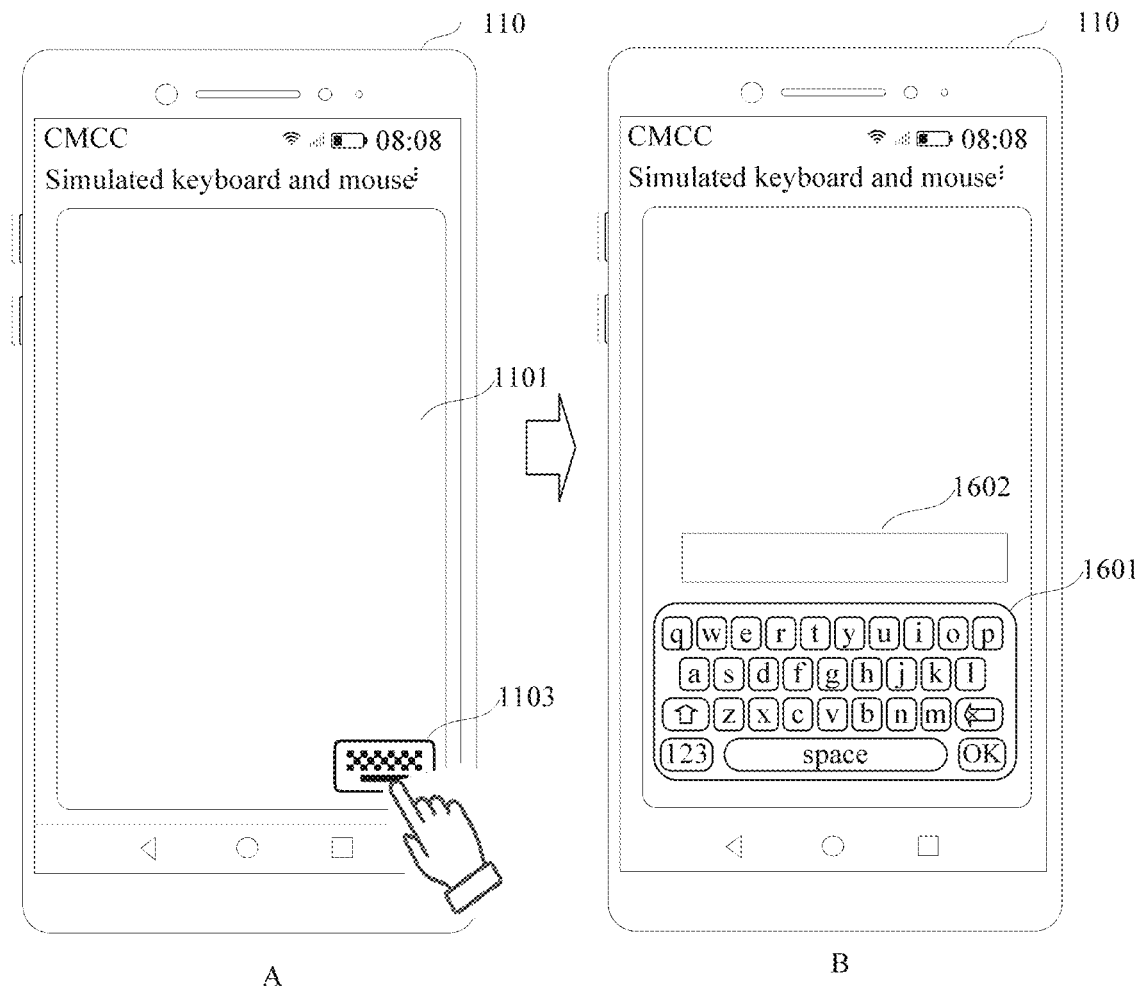
FIG. 16 is a schematic diagram 1 of an example of a displayed screen of a terminal according to an embodiment of the present disclosure.

For example, the touchpad screen 1101 shown in FIG. 11 or FIG. 15 may further include a "virtual keyboard icon" 1103. When the user taps the "virtual keyboard icon" 1103 shown in FIG. 16A, the terminal may display a simulated keyboard and mouse screen shown in FIG. 16B. The simulated keyboard and mouse screen shown in FIG. 16B may include an "input box" 1602 and a simulated keyboard 1601. The simulated keyboard 1601 is used to enter a character or a text into the input box 1602.

S805: In response to a fourth input on the touchpad screen, the terminal instructs the external display apparatus to display a fourth screen.

For a method for displaying, by the terminal, the fourth screen on the external display apparatus in response to the fourth input on the touchpad screen in S805 refer to the description in S902. Details are not repeated in this embodiment of the present disclosure.

According to the display method provided in this embodiment of the present disclosure, even if the terminal is connected to the external device, the user may use the touch drop-down notification bar or the touch suspend button to control the terminal to serve as the touchpad of the external display apparatus. In other words, in this application scenario, the content displayed by the external display apparatus may be controlled by the external device (namely, the mouse and/or the keyboard or a handwriting tablet), or may be controlled by the display screen, as the touchpad, of the terminal.

Figure 44:
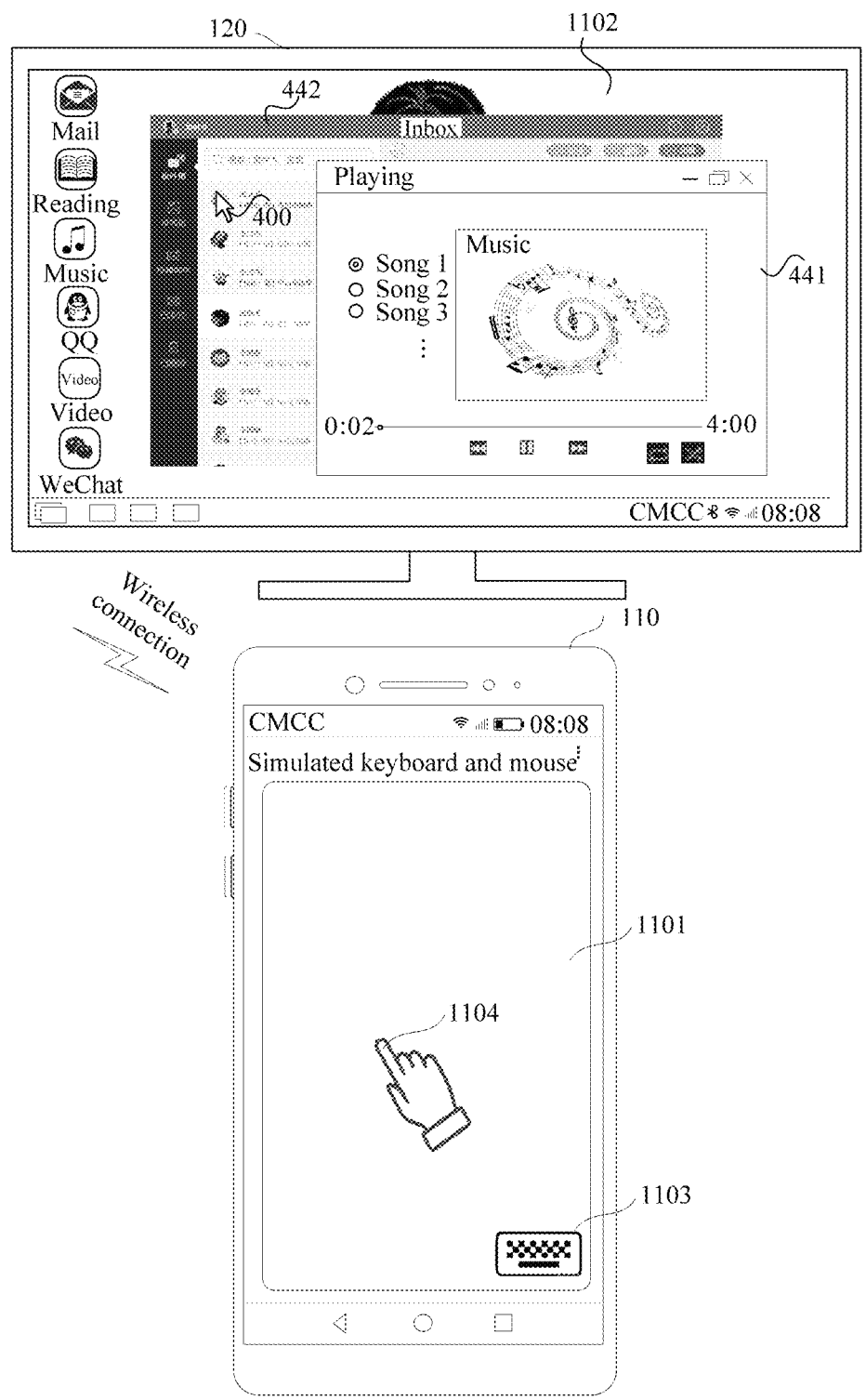
FIG. 44 is a schematic diagram 26 of an example of a displayed screen of a terminal and an external display apparatus according to an embodiment of the present disclosure.

In some embodiments of this application, the terminal 110 may further control the external display apparatus 120 to display an application window of a plurality of applications on a display screen of the external display apparatus 120. For example, as shown in FIG. 44, a first application window 441 of a "Music" application and a second application window 442 of a "Mail" application are running on a desktop of the external display apparatus 120. Both the "Music" application and the "Mail" application are applications projected from the terminal 110 onto the external display apparatus 120.

In this multi-application window projection scenario, the terminal 110 may still be used as the touchpad to control the external display apparatus 120. In this case, a plurality of application windows are displayed on the external display apparatus 120, such as the first application window 441 and the second application window 442 in FIG. 44. Then, when the user uses the terminal 110 as the touchpad to control a cursor 400 displayed on the external display apparatus 120 to perform a mouse operation such as tapping or double-tapping, the terminal 110 may first determine whether an object of the mouse operation is a currently focused application window.

A focused application window is an application window that has been selected from a plurality of current application windows. In the focused application window, the user may directly operate a widget in the window or edit information in the window. Usually, the focused application window is displayed on top of the desktop.

Figure 45:
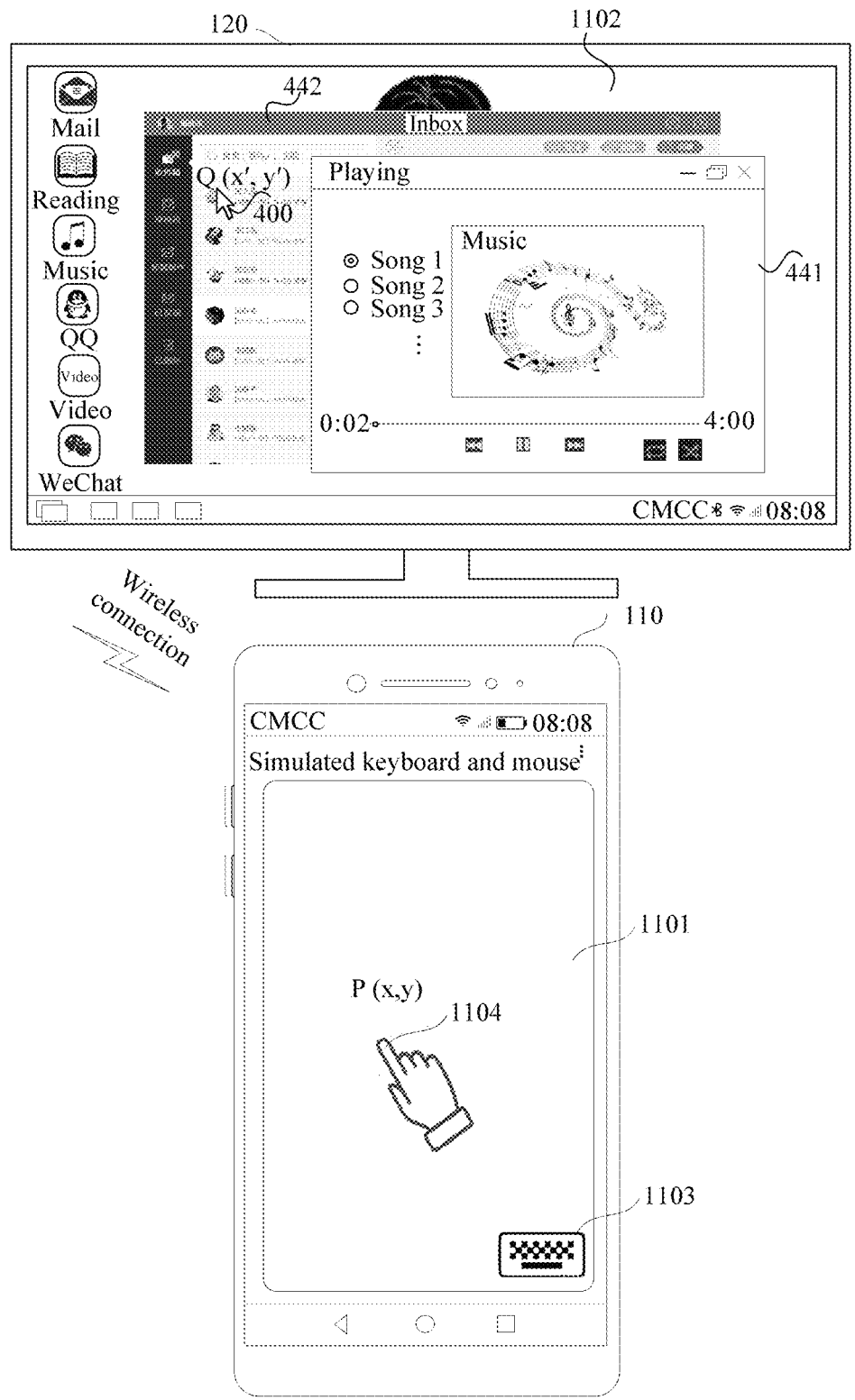
FIG. 45 is a schematic diagram 27 of an example of a displayed screen of a terminal and an external display apparatus according to an embodiment of the present disclosure.

For example, as shown in FIG. 45, the user moves the finger from up to down or from left to right on the touchpad screen 1101 displayed by the terminal 110, to control a position of the cursor 400 on the external display apparatus 120. When the user performs a tap operation at a first position P(x,y) on the touchpad screen 1101 by using the finger 1104, a mouse click operation is correspondingly performed at a second position Q(x',y') on a displayed screen of the external display apparatus 120.

Still as shown in FIG. 45, the external display apparatus 120 displays two application windows: the first application window 441 and the second application window 442, and the currently focused application window is the first application window 441. Then, the terminal 110 may determine, based on the second position Q(x',y'), whether the mouse operation falls within the first application window 441. If the mouse operation falls within the first application window 441, the terminal 110 may determine that the object of the mouse operation is the currently focused application window. Otherwise, the terminal 110 may determine that the object of the mouse operation is not the currently focused application window.

If the object of the mouse operation is not the currently focused application window, the terminal 110 may further determine a specific application window corresponding to the mouse operation. For example, the terminal 110 may determine, through calculation based on the second position Q(x',y') and a display position of the second application window 442 on the external display apparatus 120, that the object of the mouse operation is the second application window 442 displayed by the external display apparatus 120.

Because the second application window 442 is not the focused application window, the user cannot perform an operation on the second application window 442 in this case. Therefore, after determining the specific application window corresponding to the mouse operation, the terminal 110 may switch the currently focused application window from the first application window 441 to the second application window 442.

Figure 46:
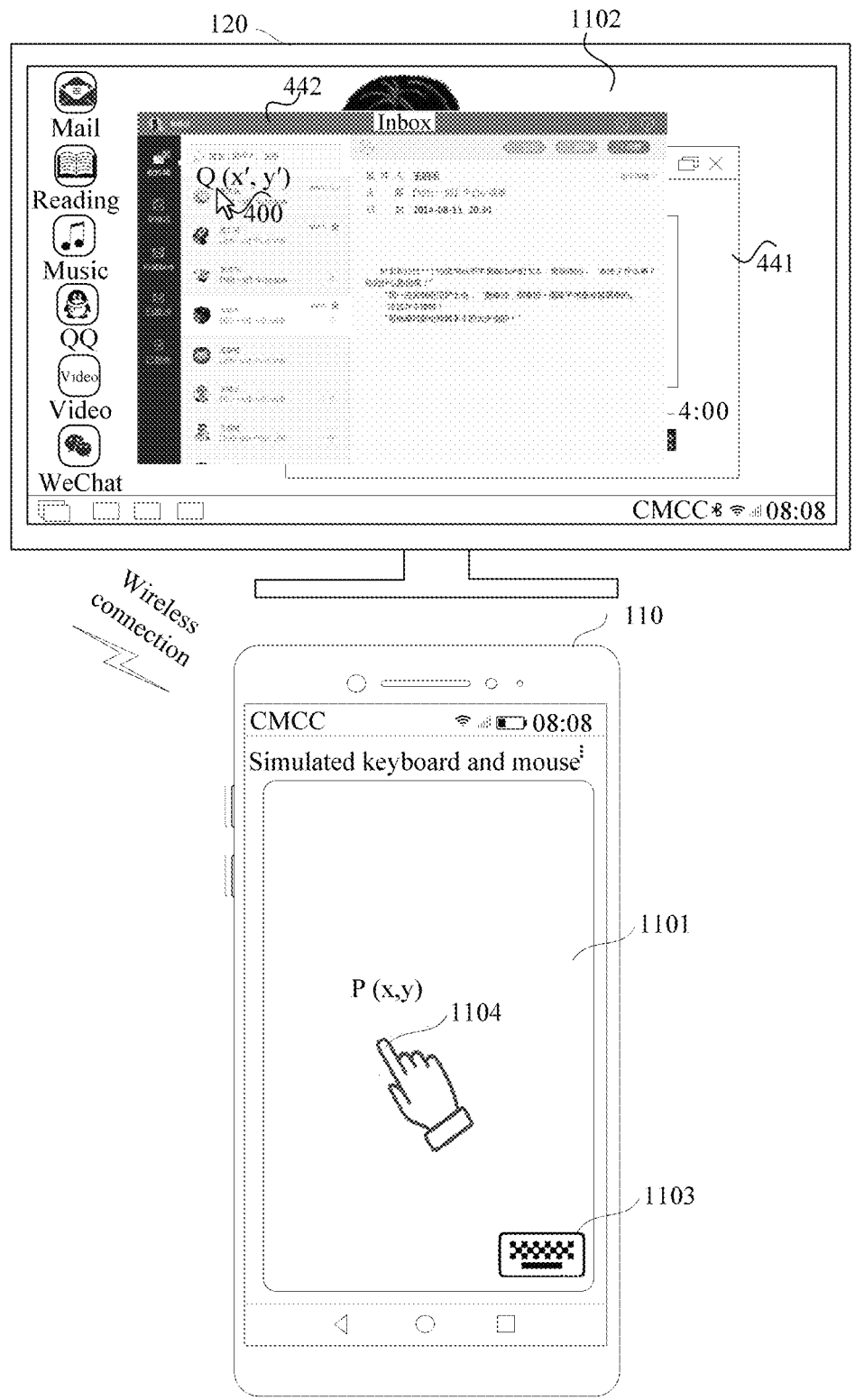
FIG. 46 is a schematic diagram 28 of an example of a displayed screen of a terminal and an external display apparatus according to an embodiment of the present disclosure.

In this case, as shown in FIG. 46, the user controls, by using the touchpad screen 1101 of the terminal 110, the cursor 400 of the external display apparatus 120 to perform a click operation at the second location Q(x',y'). Because the second application window 442 within which the second position Q(x',y') falls is not the currently focused application window, the terminal 110 may draw a layer of the second application window 442 of the "Mail" application over the first application window 441 of the "Music" application, and send display data obtained after drawing to the external display apparatus 120. The external display apparatus 120 displays, on the display screen of the external display apparatus 120, a desktop obtained after the focused application window is switched to the second application window 442.

It should be noted that a drawn layer of the cursor 400 may be located on top of all layers on the external display apparatus 120, to ensure that the cursor 400 is not blocked by various application windows, allowing the user to operate a position of the cursor.

The terminal 110 may create an application stack for each application running in the external display apparatus 120. When the terminal 110 switches the focused application window to a window of a new application, a target token may be assigned to an application stack of the application.

In other words, the application window corresponding to the application stack having the target token is the currently focused application window.

Figure 47:
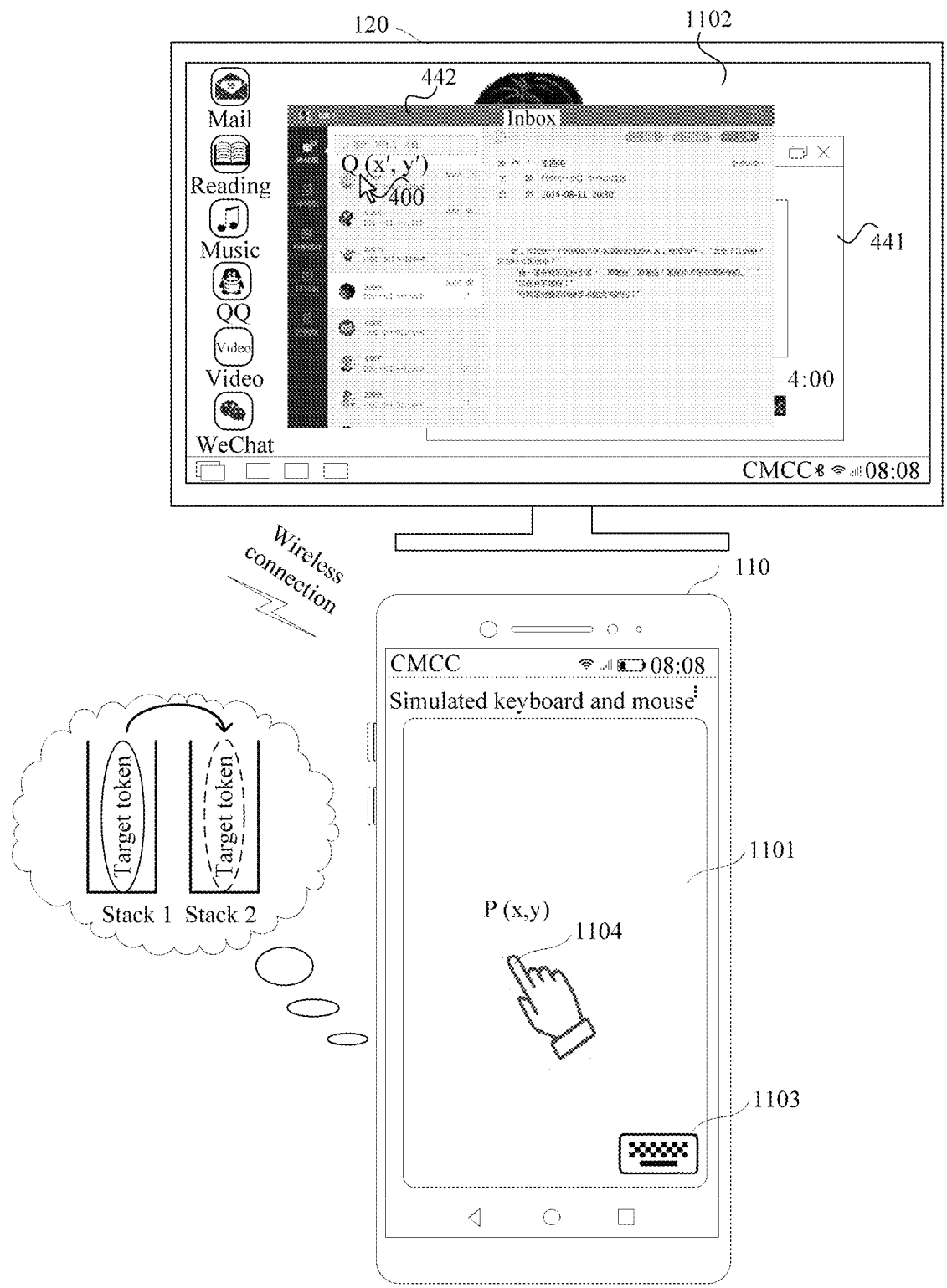
FIG. 47 is a schematic diagram 29 of an example of a displayed screen of a terminal and an external display apparatus according to an embodiment of the present disclosure.

As shown in FIG. 47, an application stack of the "Music" application is a stack 1, and an application stack of the "Mail" application is a stack 2. The stack 1 includes a target token, that is, the currently focused application window is the first application window 441 of the "Music" application. When the user controls the cursor 400 to click in the second application window 442 of the "Mail" application, the terminal moves the target token from the stack 1 to the stack 2, sends display data of the "Mail" application in the stack 2 to the external display apparatus 120, and instructs the external display apparatus 120 to display the layer of the second application window 442 of the "Mail" application over the first application window 441 of the "Music" application.

After the terminal 110 switches the currently focused application window from the first application window 441 to the second application window 442, the user may continue to control, on the touchpad screen 1101 of the terminal 110, the cursor 400 on the external display apparatus 120 to perform a mouse operation such as clicking or double-clicking on the second application window 442. For example, after the terminal 110 switches the currently focused application window to the second application window 442 of the "Mail" application, the user may control, on the touchpad screen 1101 of the terminal 110, the cursor 400 to perform a click operation on an "Inbox" button in the second application window 442. In response to the click operation, while triggering the "Mail" application to receive mails, the terminal 110 may draw a displayed screen of receiving mails, and send the displayed screen to the external display apparatus 120 for display.

In addition, if the object of the mouse operation triggered by the user on the touchpad screen 1101 is the currently focused application window, for example, the first application window 441, the terminal 110 does not need to switch the currently focused application window, and may execute, in the current first application window 441, an instruction corresponding to the mouse operation.

Figure 48:
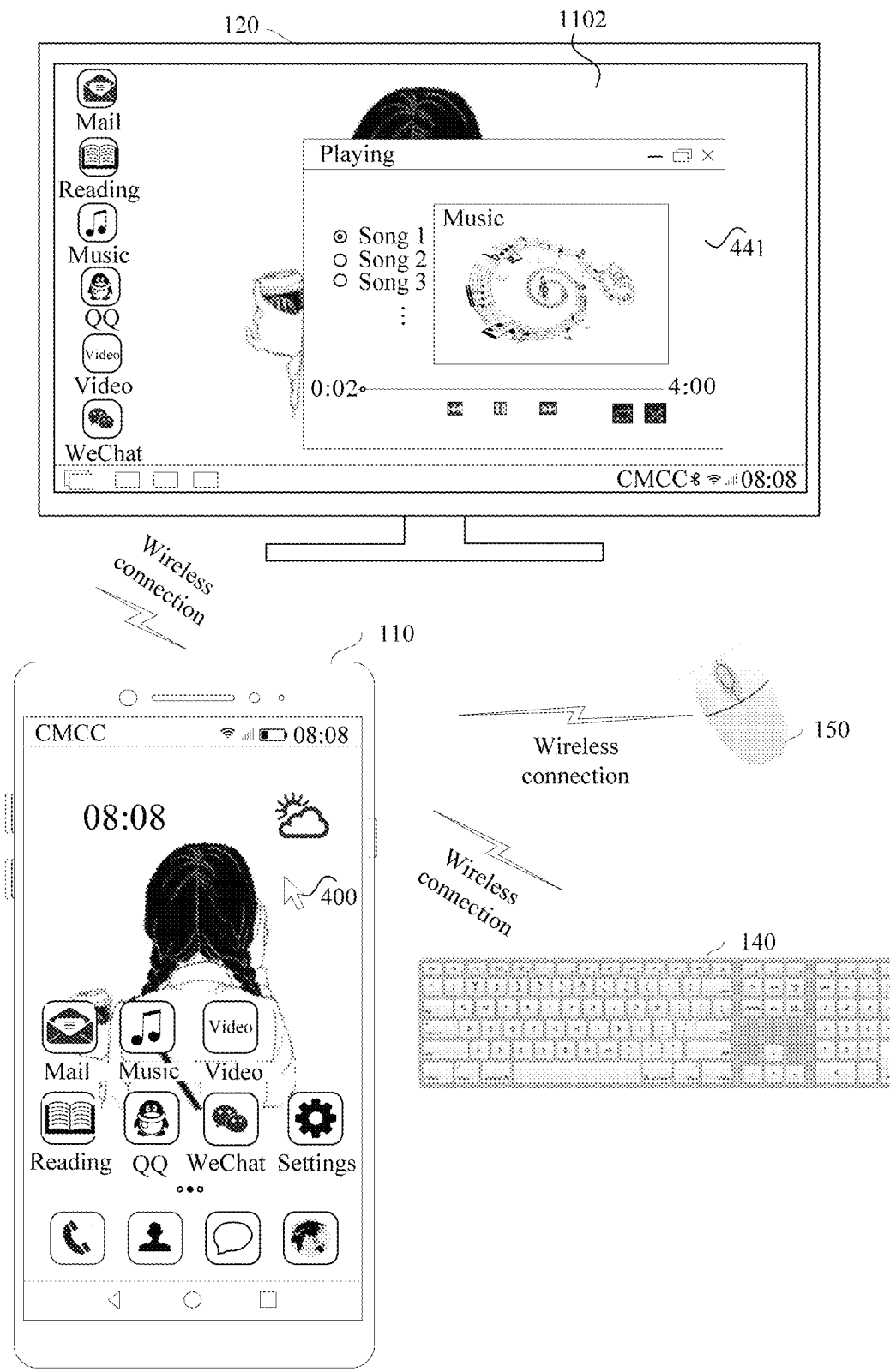
FIG. 48 is a schematic diagram 30 of an example of a displayed screen of a terminal and an external display apparatus according to an embodiment of the present disclosure.

In some other embodiments of this application, the terminal 110 may also be connected to the external device (namely, the mouse and/or the keyboard). As shown in FIG. 48, the terminal 110 may be wirelessly connected to a Bluetooth mouse 150 and a Bluetooth keyboard 140 by using Bluetooth. In this case, the user may control, by using the Bluetooth mouse 150, the cursor 400 to switch between a displayed screen of the terminal 110 and a displayed screen of the external display apparatus 120, to change the currently focused application window.

Unlike FIG. 44 to FIG. 47, the focused application window in this case may be any application window on the external display apparatus 120, or may be any application window on the terminal 110.

Figure 49A:
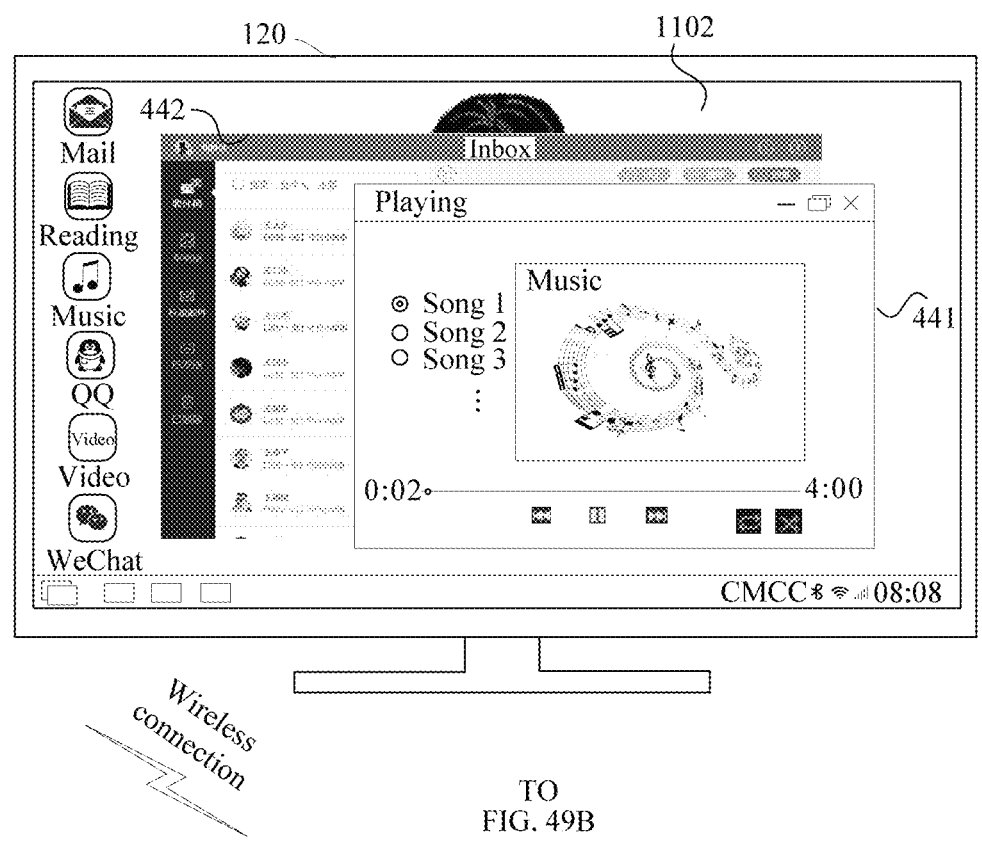
FIG. 49A and FIG. 49B are a schematic diagram 31 of an example of a displayed screen of a terminal and an external display apparatus according to an embodiment of the present disclosure.
Figure 49B:
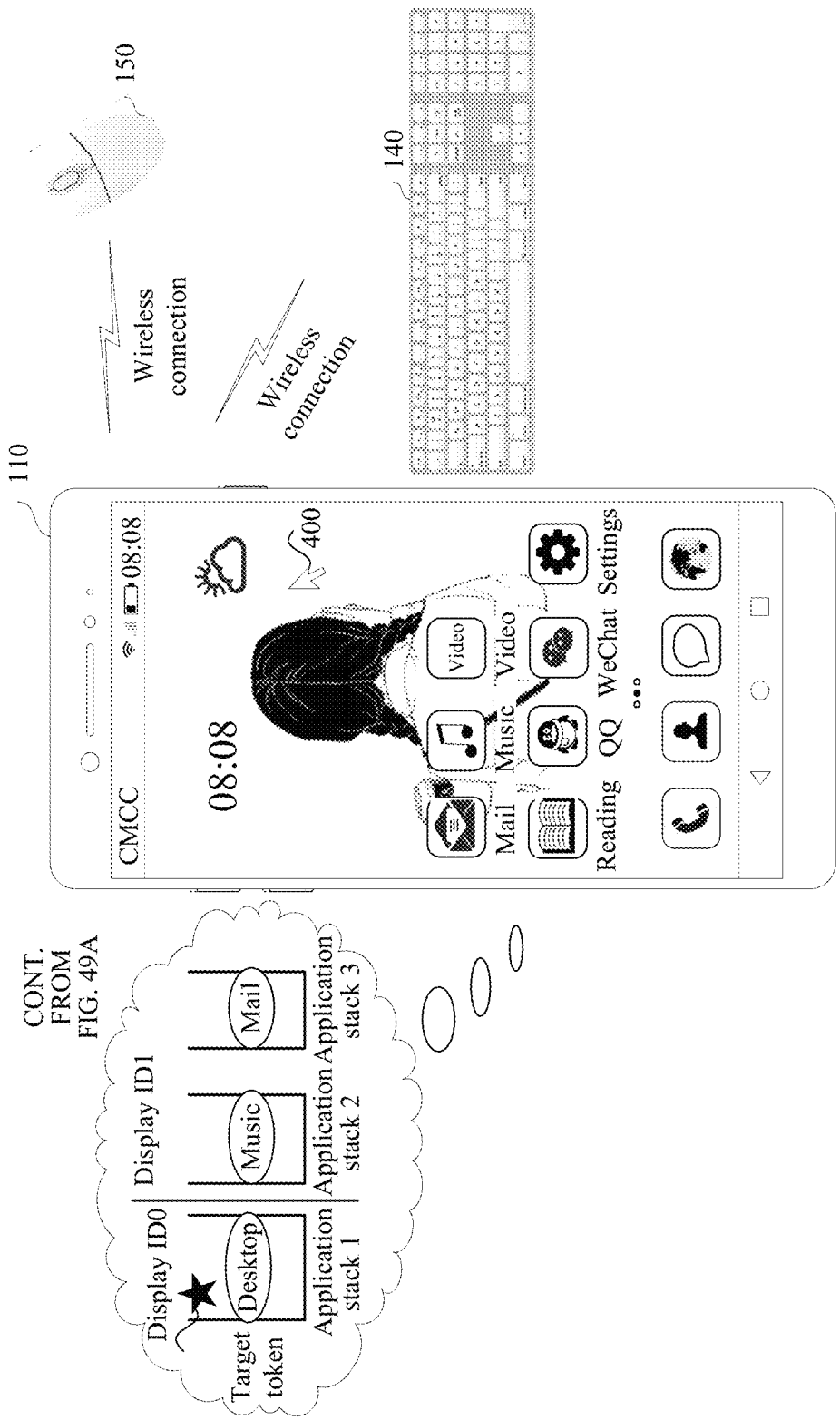

As shown in FIG. 49A and FIG. 49B, when the terminal 110 is connected to the external display apparatus 120, the terminal 110 may use two display identities (display ID) to distinguish between a displayed screen on the terminal 110 and a displayed screen on the external display apparatus 120. A display ID0 is used to indicate the displayed screen of the terminal 110, and a display ID1 is used to indicate the displayed screen of the external display apparatus 120. An application stack 1 of a "desktop" currently being displayed by the terminal 110 is set for the display ID0, two application stacks (an application stack 2 and an application stack 3) of the "Mail" application and the "Music" application that are being displayed by the external display apparatus 120 are set for the display ID1. When the user controls, by using the Bluetooth mouse 150, the cursor 400 to tap the desktop of the terminal 110, the terminal 110 assigns a target token to the application stack 1, so that the terminal 110 switches the focused application window to a desktop window displayed on the terminal 110.

Figure 50A:
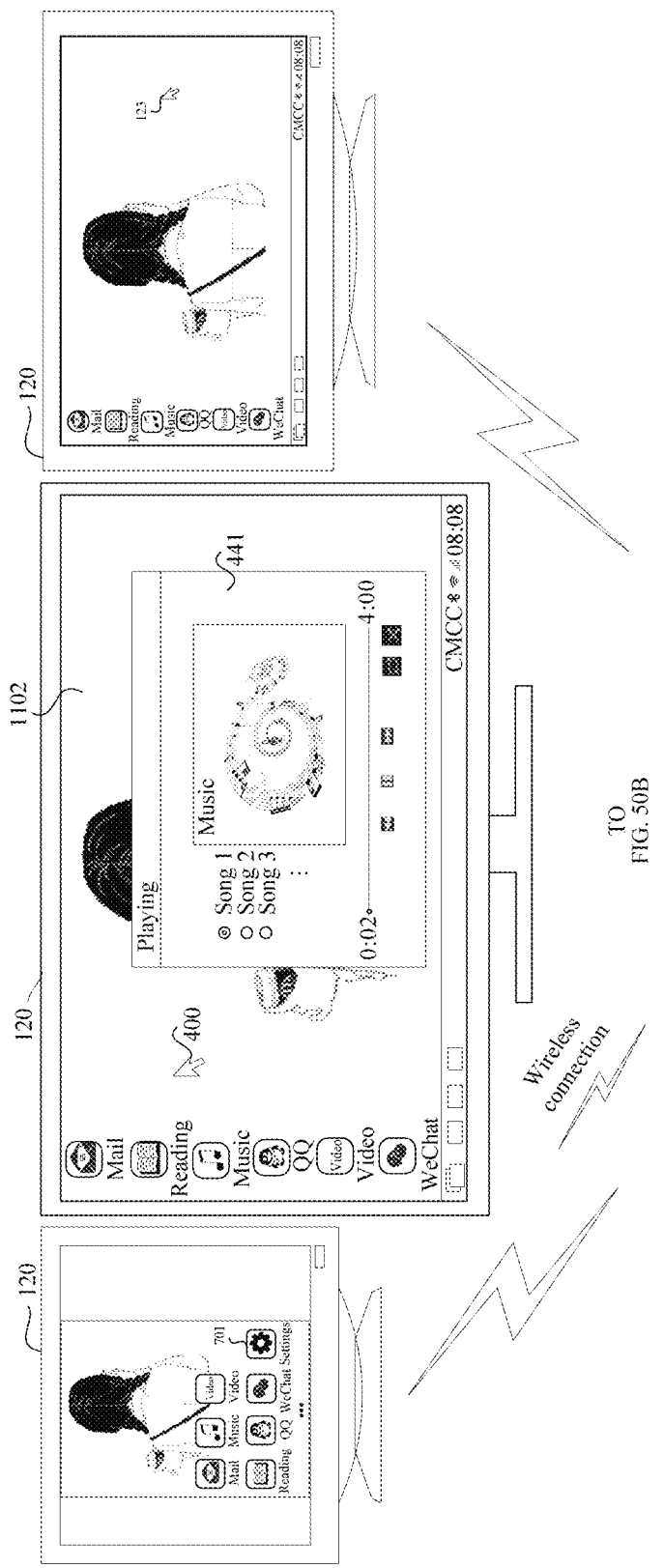
FIG. 50A and FIG. 50B are a schematic diagram 32 of an example of a displayed screen of a terminal and an external display apparatus according to an embodiment of the present disclosure.
Figure 50B:
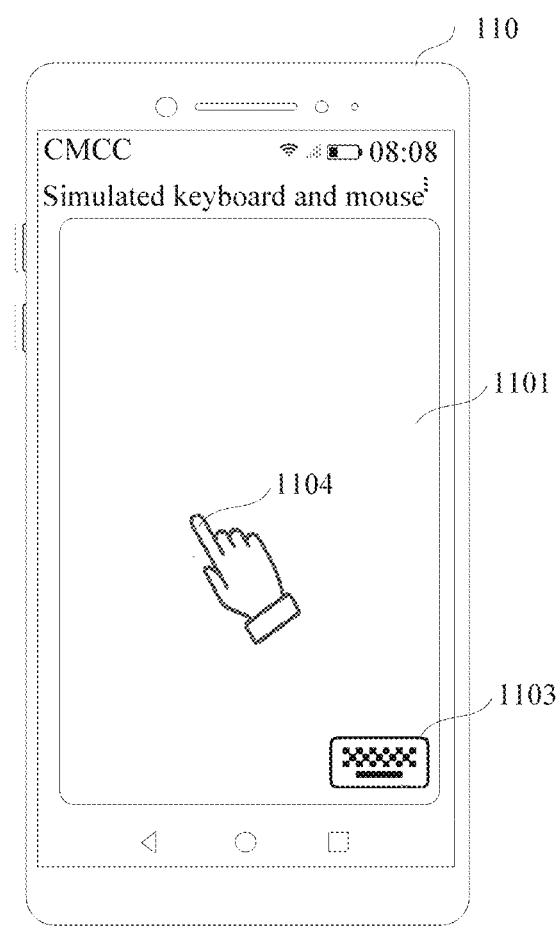

In some other embodiments of this application, as shown in FIG. 50A and FIG. 50B, the terminal 110 may be further connected to a plurality of external display apparatuses 120, and run and display one or more applications in the terminal 110 on the plurality of external display apparatuses 120. Similar to the foregoing embodiment, as shown in FIG. 50A and FIG. 50B, the terminal 110 may be still used as the touchpad to display the touchpad screen 1101, so that the user can control, on the touchpad screen 1101, the cursor 400 to switch between displayed screens of the plurality of external display apparatuses 120, and enter information such as a text or a symbol into a corresponding application window by using the "virtual keyboard" icon 1103.

Figure 17:
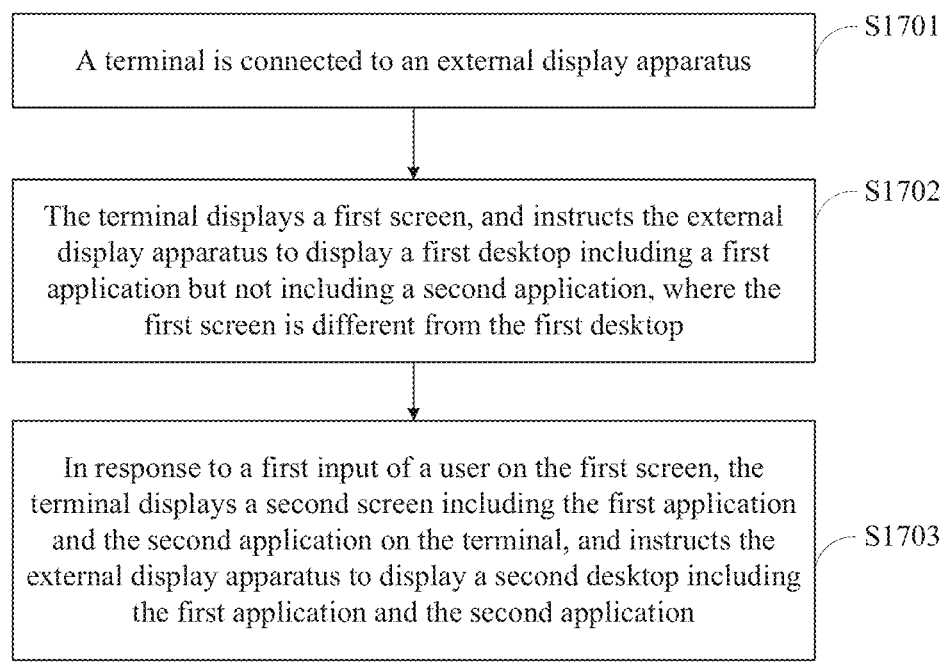
FIG. 17 is a flowchart 3 of a display method according to an embodiment of the present disclosure.

An embodiment of the present disclosure provides a display method. As shown in FIG. 17, the display method may include S1701 to S1703.

S1701: A terminal is connected to an external display apparatus.

For a manner in which the terminal is connected to the external display apparatus, refer to the connection manner described in the foregoing embodiments and the connection manner shown in any one of FIG. 1 to FIG. 5. Details are not repeated in this embodiment of the present disclosure. In addition, for welcome screens displayed by the terminal and the external display apparatus after the terminal is connected to the external display apparatus, refer to the detailed descriptions in the foregoing embodiments. Details are not repeated in this embodiment of the present disclosure.

S1702: The terminal displays a first screen, and instructs the external display apparatus to display a first desktop including a first application but not including a second application, where the first screen is different from the first desktop.

In a first application scenario of this embodiment of the present disclosure, the first screen displayed by the terminal includes the first application but does not include the second application. In S1702, a method for displaying the first screen by the terminal may include S1702a.

S1702a: The terminal displays a first screen including the first application but not including the second application.

Figure 18:
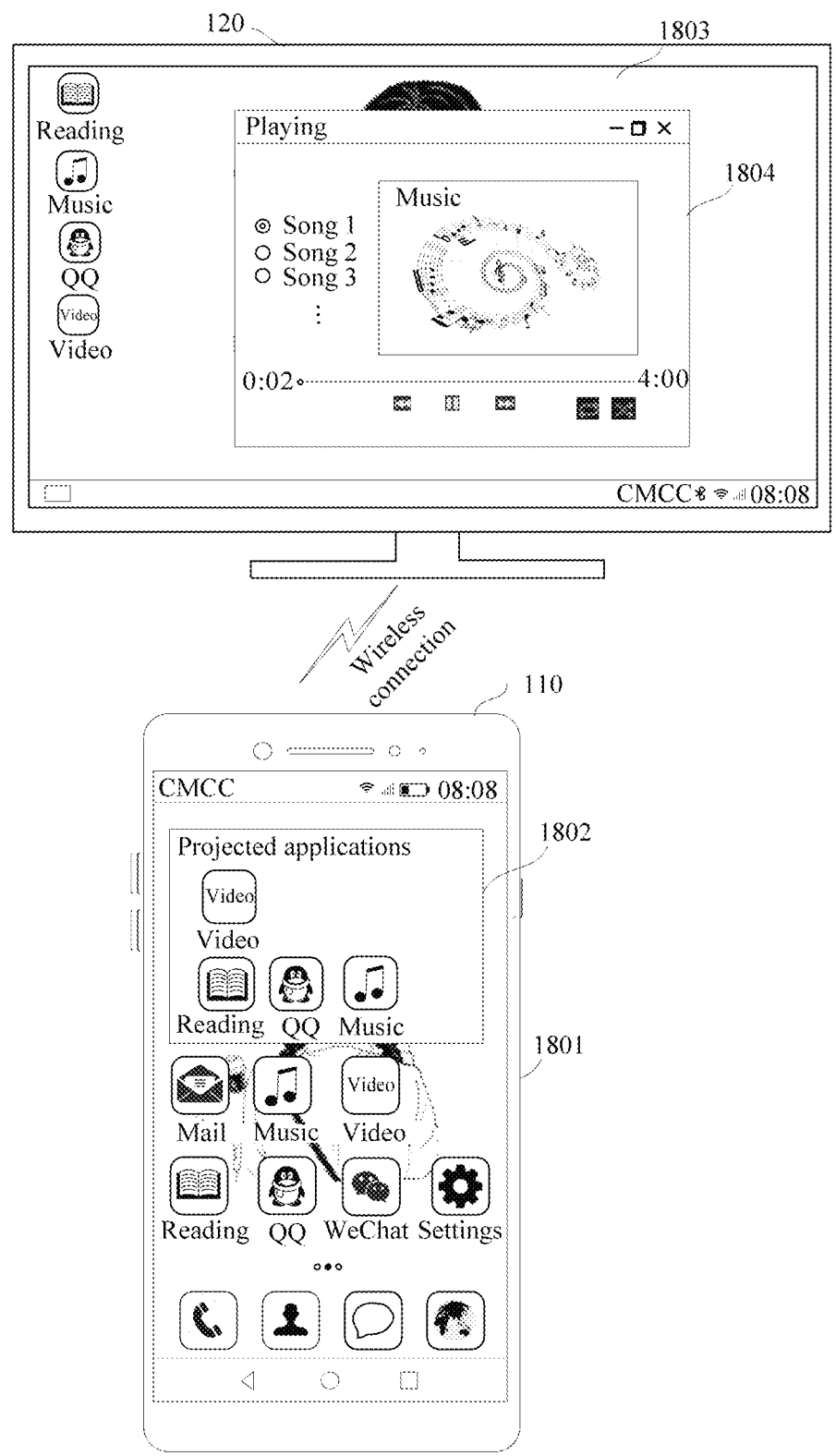
FIG. 18 is a schematic diagram 8 of an example of a displayed screen of a terminal and an external display apparatus according to an embodiment of the present disclosure.

For example, as shown in FIG. 18, when the terminal 110 displays a "projected application screen" 1802 (namely, the first screen) including a "Video" application, a "Reading" application, a "QQ" application, and a "Music" application, the terminal may instruct the external display apparatus 120 to display a first desktop 1803 including the same applications (namely, the "Video" application, the "Reading" application, the "QQ" application, and the "Music" application). As shown in FIG. 18, the "Video" application, the "Reading" application, the "QQ" application, and the "Music" application on the "projected application screen" 1802 are some applications on a displayed screen 1801 of the terminal.

In a second application scenario of this embodiment of the present disclosure, the first screen displayed by the terminal includes the first application in a selected state and the second application in a non-selected state. In S1702, a method for displaying the first screen by the terminal may include S1702b.

S1702b: The terminal displays a first screen including the first application in a selected state and the second application in a non-selected state.

Figure 19:
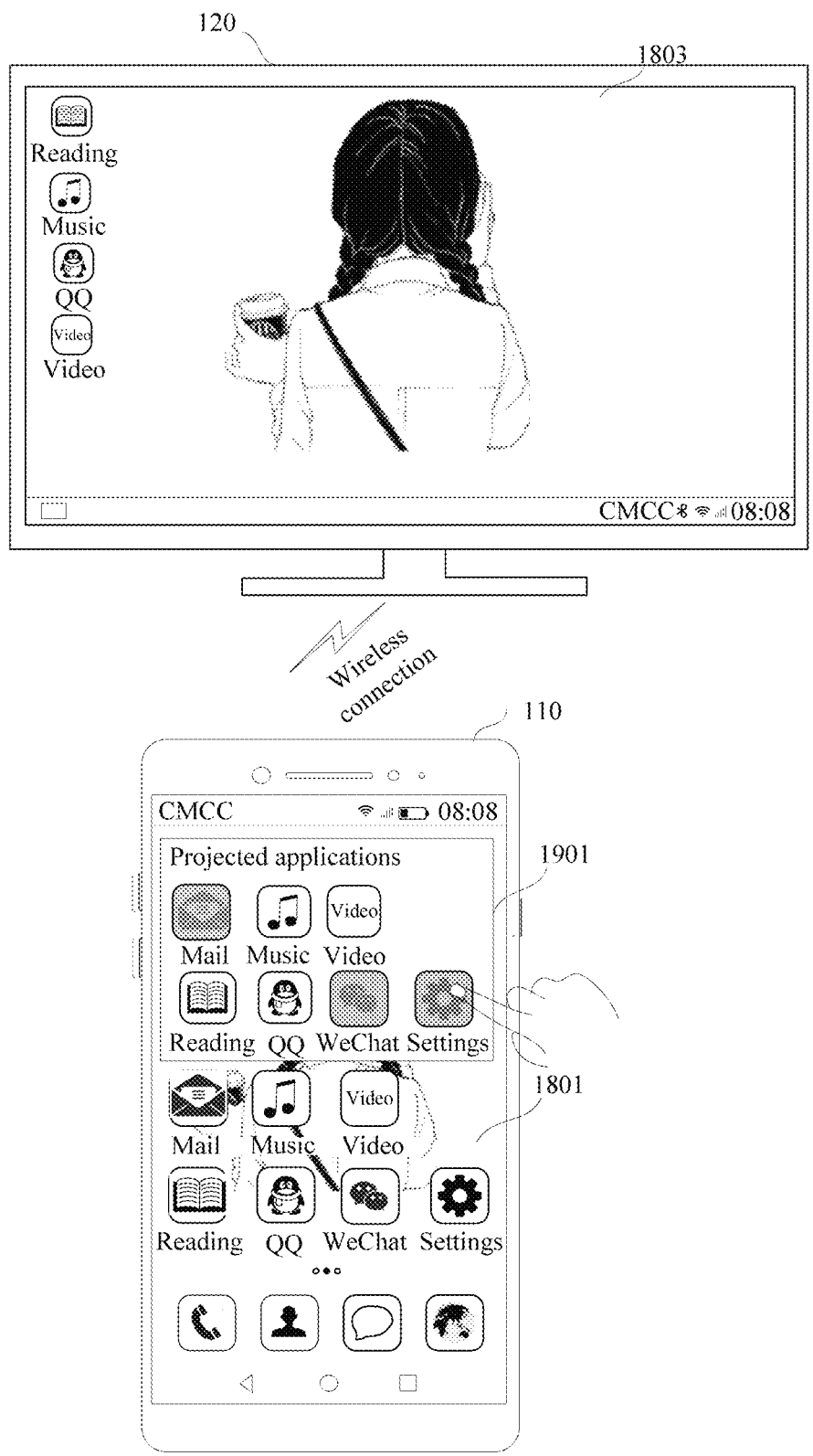
FIG. 19 is a schematic diagram 9 of an example of a displayed screen of a terminal and an external display apparatus according to an embodiment of the present disclosure.

For example, as shown in FIG. 19, the terminal may display a "projected application screen" 1901 (namely, the first screen), and the "projected application screen" 1901 includes the "Video" application, the "Reading" application, the "QQ" application, and the "Music" application that are in the selected state (namely, the first application), and a "WeChat" application, a "Mail" application, and a "Settings" application that are in the non-selected state (namely, the second application). In addition, as shown in FIG. 19, the terminal may instruct the external display apparatus 120 to display the first desktop 1803 including the same applications (namely, the "Video" application, the "Reading" application, the "QQ" application, and the "Music" application).

Figure 20:
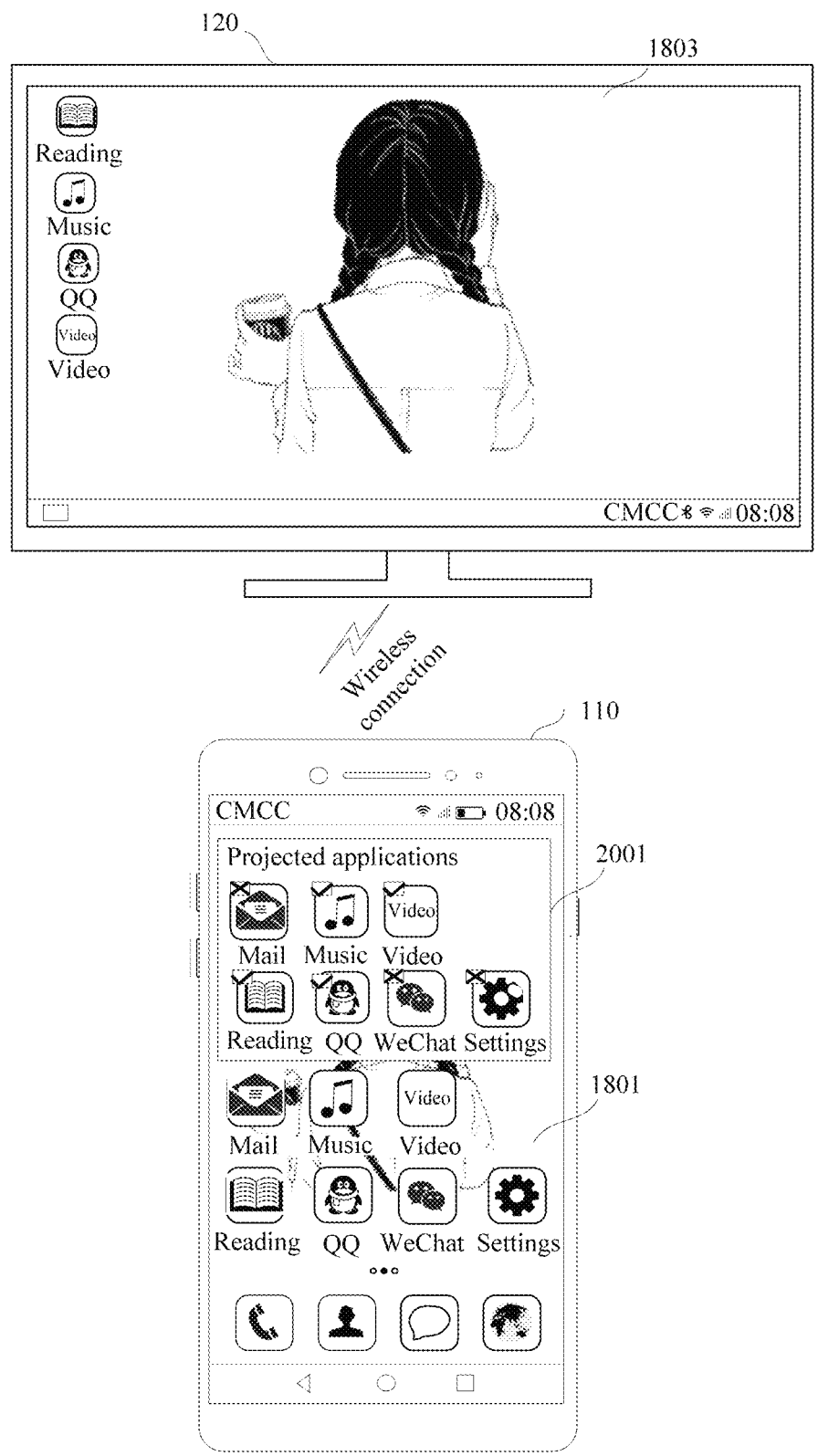
FIG. 20 is a schematic diagram 10 of an example of a displayed screen of a terminal and an external display apparatus according to an embodiment of the present disclosure.

In FIG. 19, an icon of an application is shaded to indicate that the application is in the non-selected state. In this embodiment of the present disclosure, a manner of identifying an application in a selected state and an application in a non-selected state includes but is not limited to the shading manner. For example, as shown in FIG. 20, the terminal may alternatively tick an application in a selected state, to indicate that the application is in the selected state.

Figure 21:
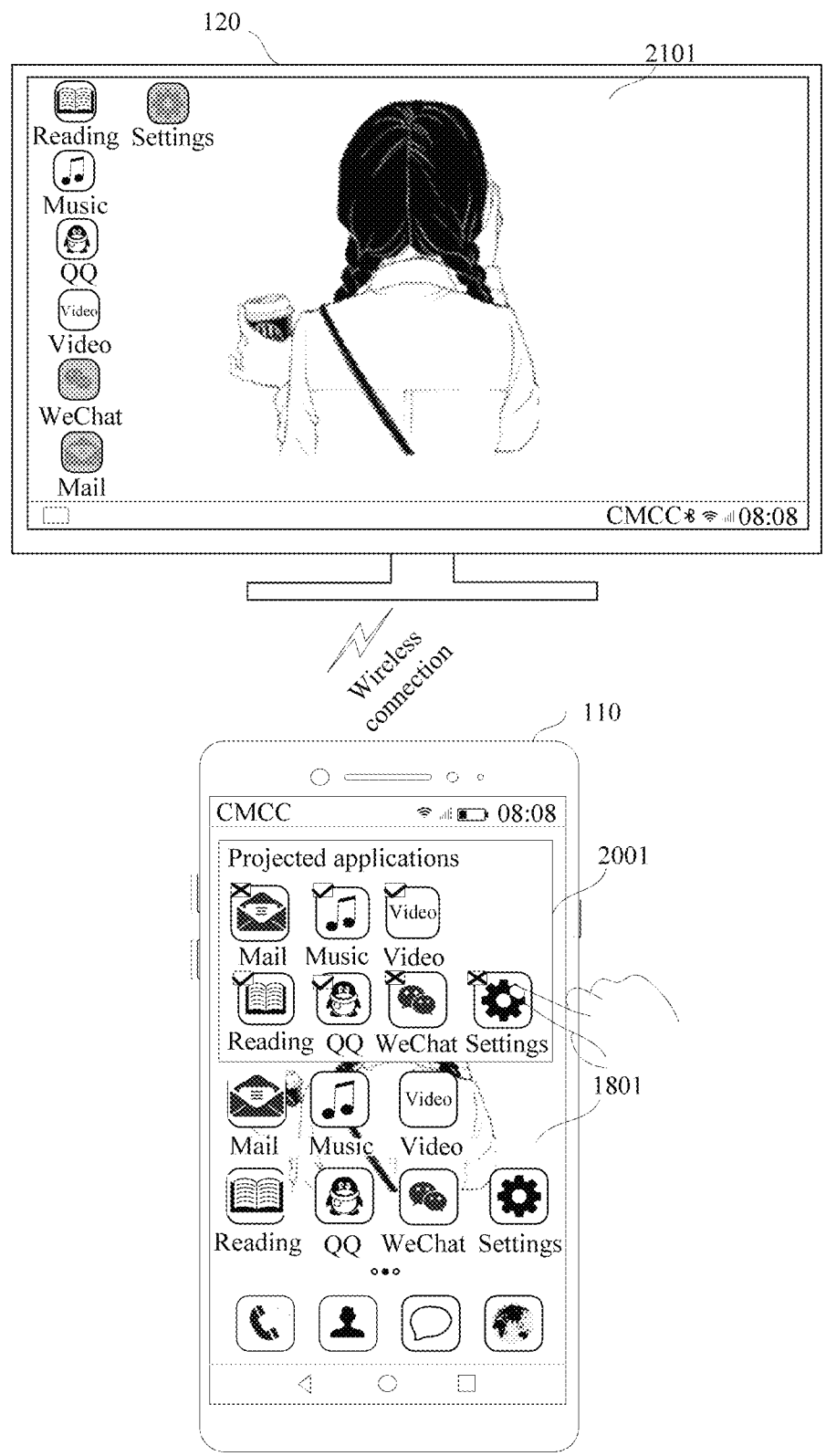
FIG. 21 is a schematic diagram 11 of an example of a displayed screen of a terminal and an external display apparatus according to an embodiment of the present disclosure.

Optionally, in this embodiment of the present disclosure, when displaying the first screen, the terminal may further instruct the external display apparatus to display a first desktop including the first application in the selected state and the second application in the non-selected state. For example, as shown in FIG. 21, the terminal may instruct the external display apparatus to display a first desktop 2101 including the "Video" application, the "Reading" application, the "QQ" application, and the "Music" application that are in the selected state (namely, the first application), and the "WeChat" application, the "Mail" application, and the "Settings" application that are in the non-selected state (namely, the second application).

Optionally, in this embodiment of the present disclosure, the terminal instructs the external display apparatus to display a first desktop including the first application but not including the second application, where the first desktop is a desktop that the external display apparatus should display. The first desktop may be partially or totally blocked by another screen. The first desktop includes the first application but does not include the second application once the first desktop is displayed completely. That the first desktop is different from the first screen includes: the two screens have different quantities of included applications, different applications, different layouts, or other differences.

S1703: In response to a first input of a user in the first screen, the terminal displays a second screen including the first application and the second application on the terminal, and instructs the external display apparatus to display a second desktop including the first application and the second application.

Figure 22:
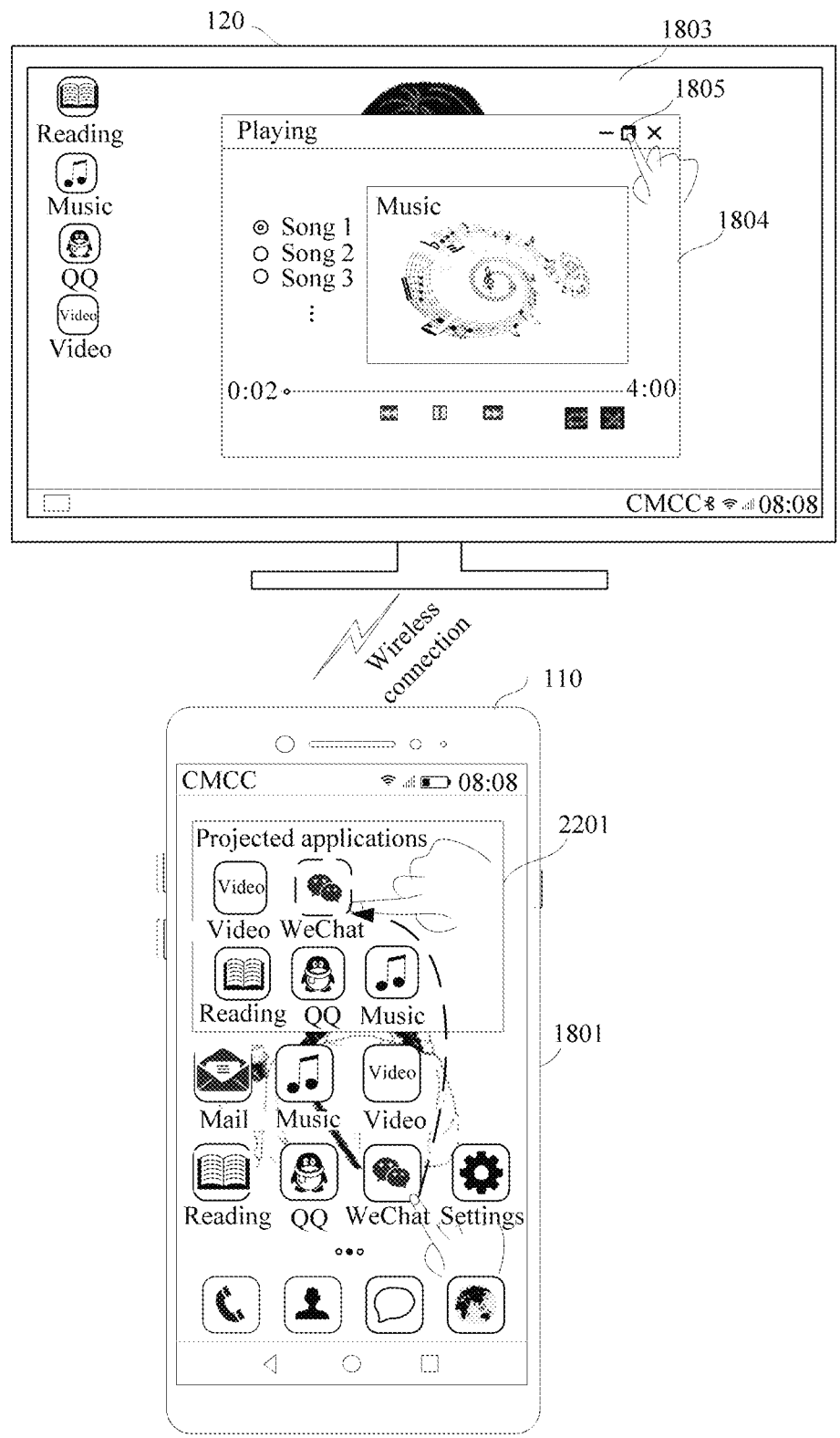
FIG. 22 is a schematic diagram 12 of an example of a displayed screen of a terminal and an external display apparatus according to an embodiment of the present disclosure.
Figure 23:
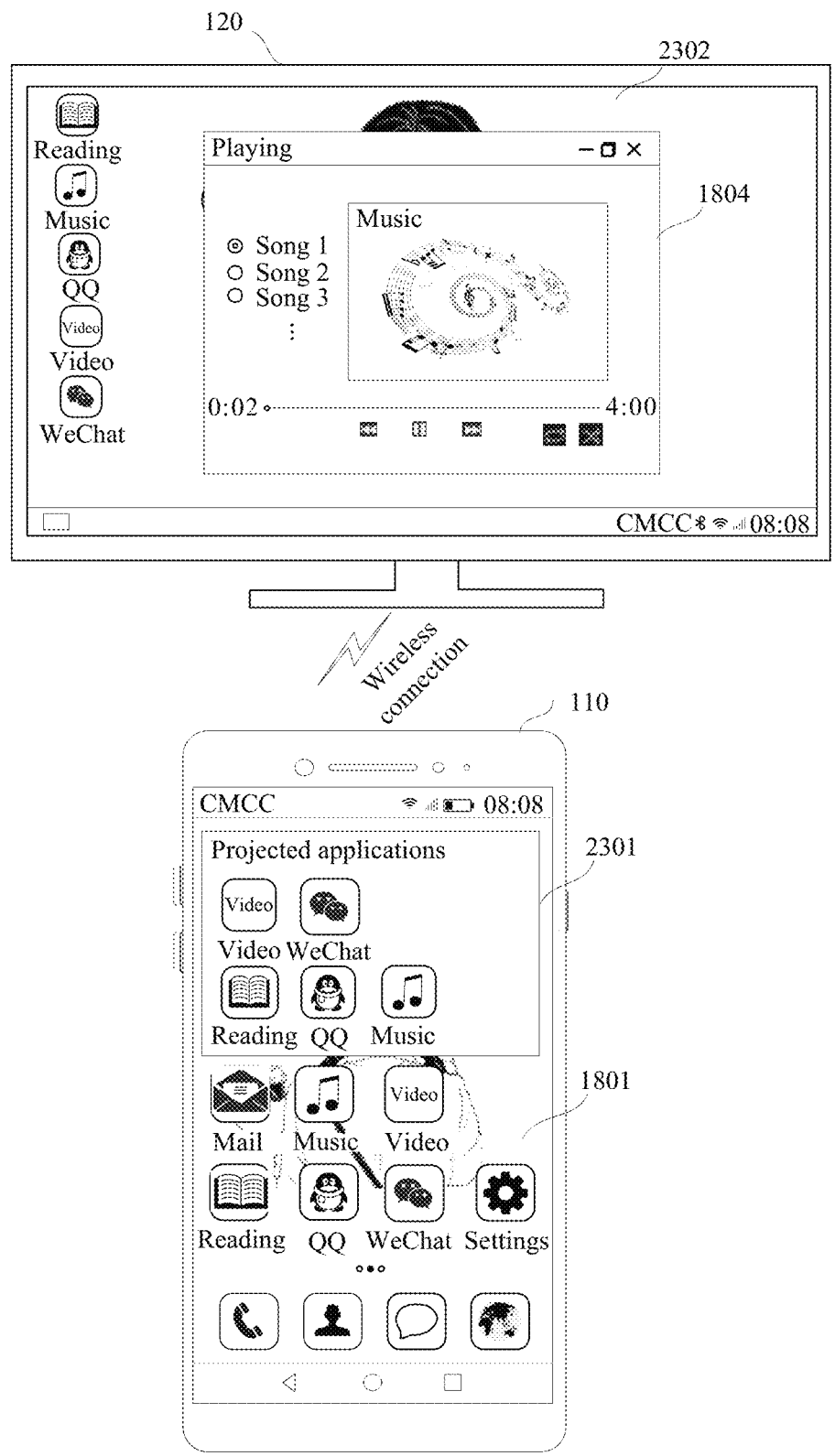
FIG. 23 is a schematic diagram 13 of an example of a displayed screen of a terminal and an external display apparatus according to an embodiment of the present disclosure.

Using FIG. 18 as an example, as shown in FIG. 22, when the user drags an icon of the "WeChat" application from the terminal screen 1801 to the "projected application screen" 1802 by using a finger, the terminal may display a "projected application screen" 2301 (namely, the second screen), shown in FIG. 23, including the "Video" application, the "Reading" application, the "QQ" application, and the "Music" application (namely, the first application) and the "WeChat" application (namely, the second application), and instruct the external display apparatus 120 to display a second desktop 2302, shown in FIG. 23, including the "Video" application, the "Reading" application, the "QQ" application, and the "Music" application (namely, the first application) and the "WeChat" application (namely, the second application).

Figure 24:
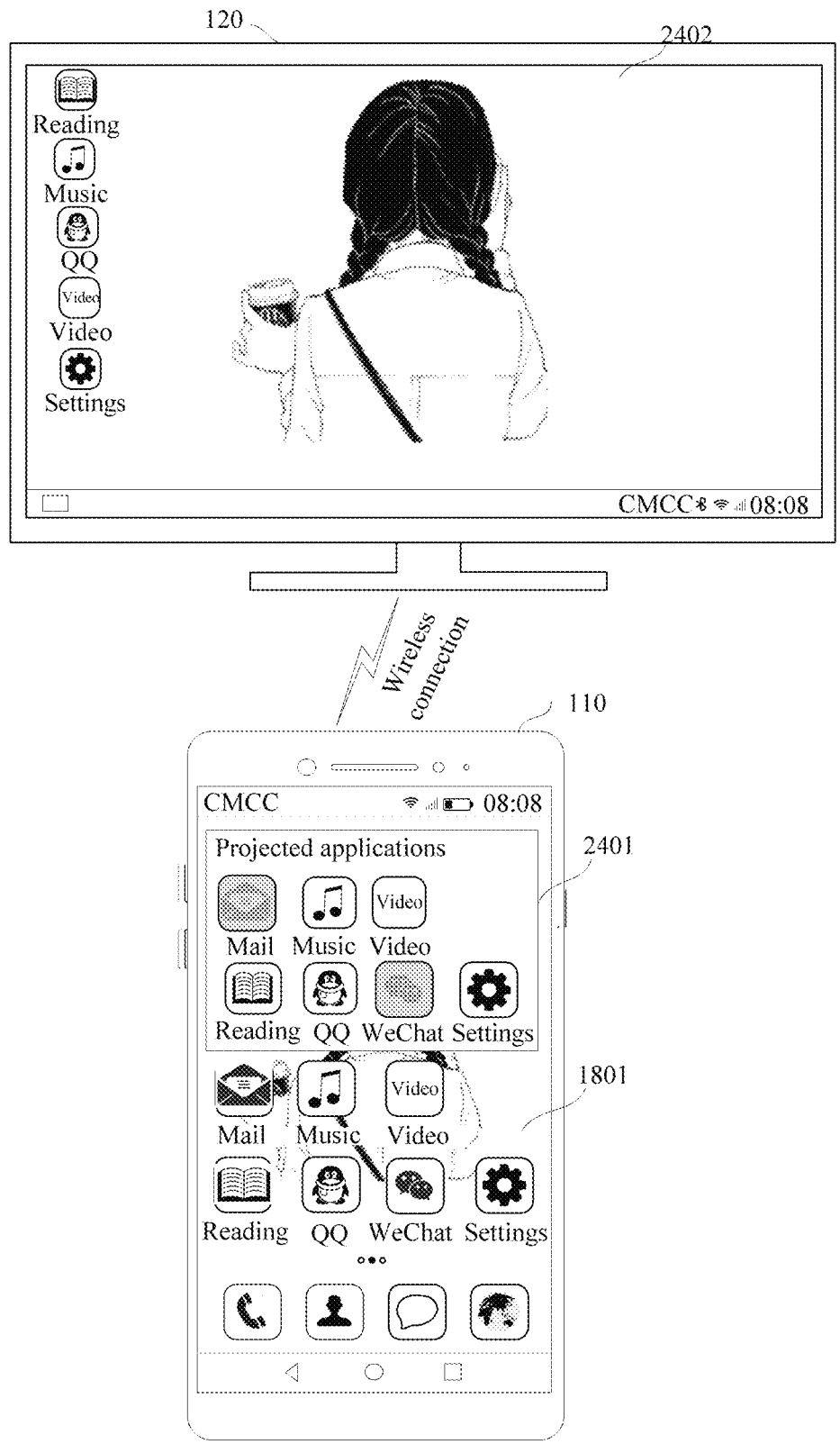
FIG. 24 is a schematic diagram 14 of an example of a displayed screen of a terminal and an external display apparatus according to an embodiment of the present disclosure.

Using FIG. 19 as an example, after the user taps the "Settings" application on the "projected application screen" 1901 shown in FIG. 19 by using a finger, the terminal may display a "projected application screen" 2401, shown in FIG. 24, including the "Video" application, the "Reading" application, the "QQ" application, and the "Music" application (namely, the first application) and the "Settings" application (namely, the second application) that are in the selected state and the "Mail" application and the "WeChat" application that are in the non-selected state, and instruct the external display apparatus 120 to display a second desktop 2402, shown in FIG. 24, including the "Video" application, the "Reading" application, the "QQ" application, and the "Music" application (namely, the first application) and the "Settings" application (namely, the second application) that are in the selected state and the "Mail" application and the "WeChat" application that are in the non-selected state.

Figure 25:
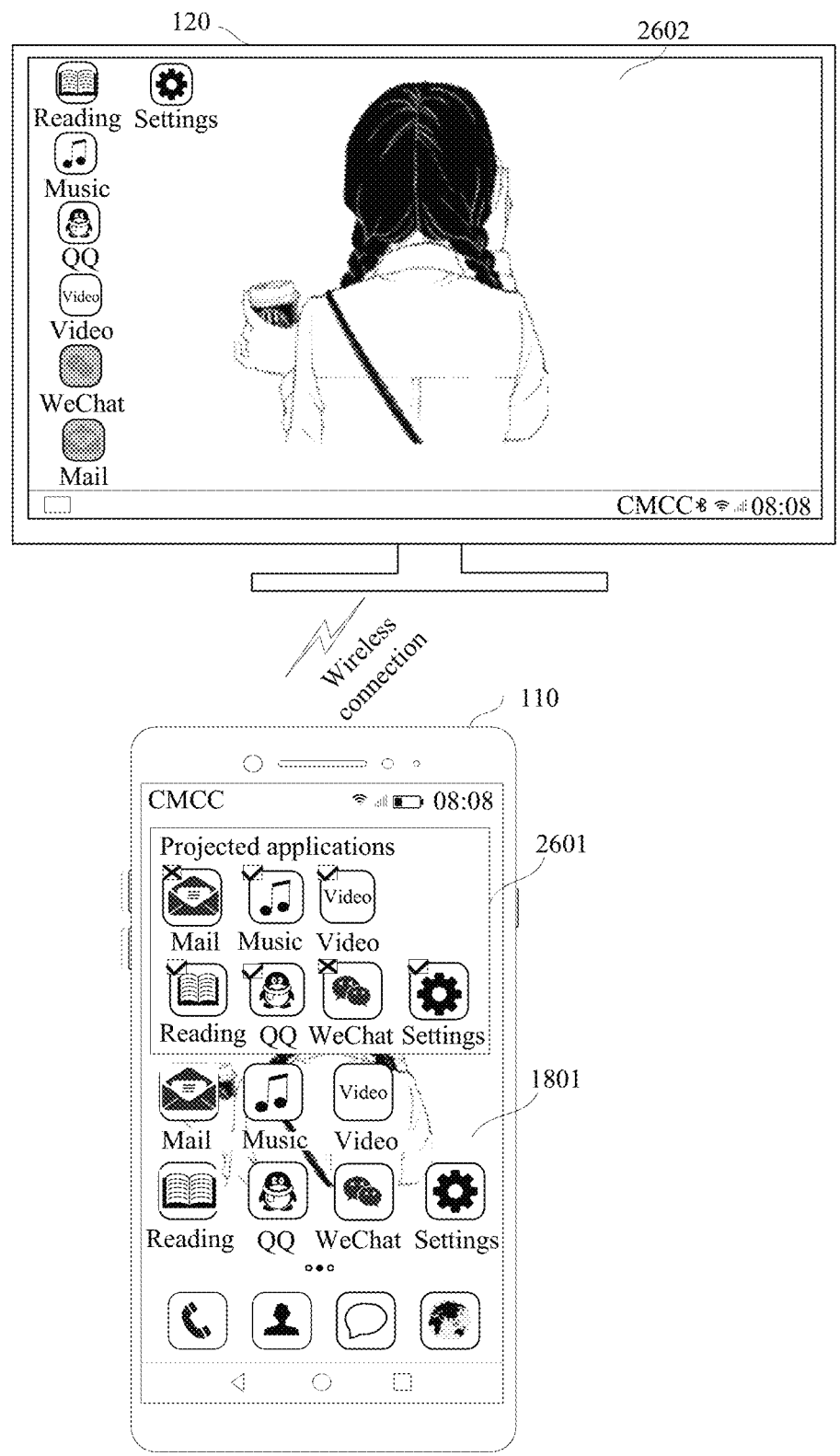
FIG. 25 is a schematic diagram 15 of an example of a displayed screen of a terminal and an external display apparatus according to an embodiment of the present disclosure.

Using FIG. 21 as an example, after the user taps the "Settings" application on a "projected application screen" 2001 shown in FIG. 21 by using a finger, the terminal may display a "projected application screen" 2601, shown in FIG. 25, including the "Video" application, the "Reading" application, the "QQ" application, and the "Music" application (namely, the first application) and the "Settings" application (namely, the second application) that are in the selected state and the "Mail" application and the "WeChat" application that are in the non-selected state, and instruct the external display apparatus 120 to display a second desktop 2602, shown in FIG. 25, including the "Video" application, the "Reading" application, the "QQ" application, and the "Music" application (namely, the first application) and the "Settings" application (namely, the second application) that are in the selected state and the "Mail" application and the "WeChat" application that are in the non-selected state.

After the terminal receives the first input on the first screen, the applications included in the second screen displayed by the terminal are the same as or different from the applications included in the second desktop. For example, as shown in FIG. 18, FIG. 21, FIG. 22, FIG. 23, or FIG. 25, the applications included in the second screen displayed by the terminal 110 are the same as the applications included in the second desktop displayed by the external display apparatus 120; as shown in FIG. 19, FIG. 20, or FIG. 24, the applications included in the second screen displayed by the terminal 110 are different from the applications included in the second desktop displayed by the external display apparatus 120.

Figure 26:
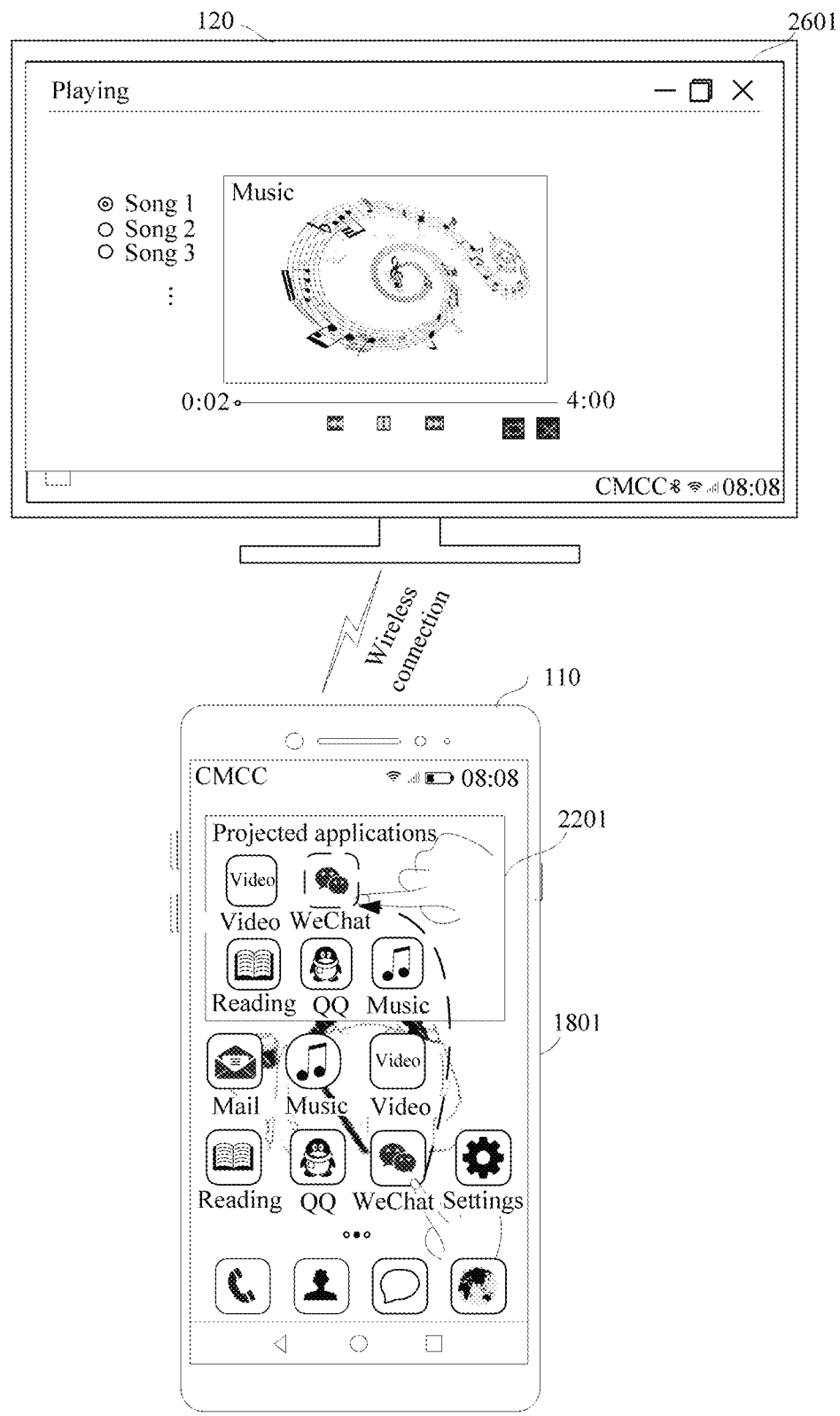
FIG. 26 is a schematic diagram 16 of an example of a displayed screen of a terminal and an external display apparatus according to an embodiment of the present disclosure.

For example, when the user taps, by using the finger, a "maximize screen" button 1805, shown in FIG. 22, on a "music play screen" 1804 displayed by the external display apparatus 120, the terminal may instruct the external display apparatus 120 to display a "music play screen" 2601 shown in FIG. 26. It should be noted that as shown in FIG. 22, the displayed desktop 1803 of the external display apparatus 120 includes the "Reading" application, the "Music" application, the "QQ" application, and the "Video" application.

Figure 51:
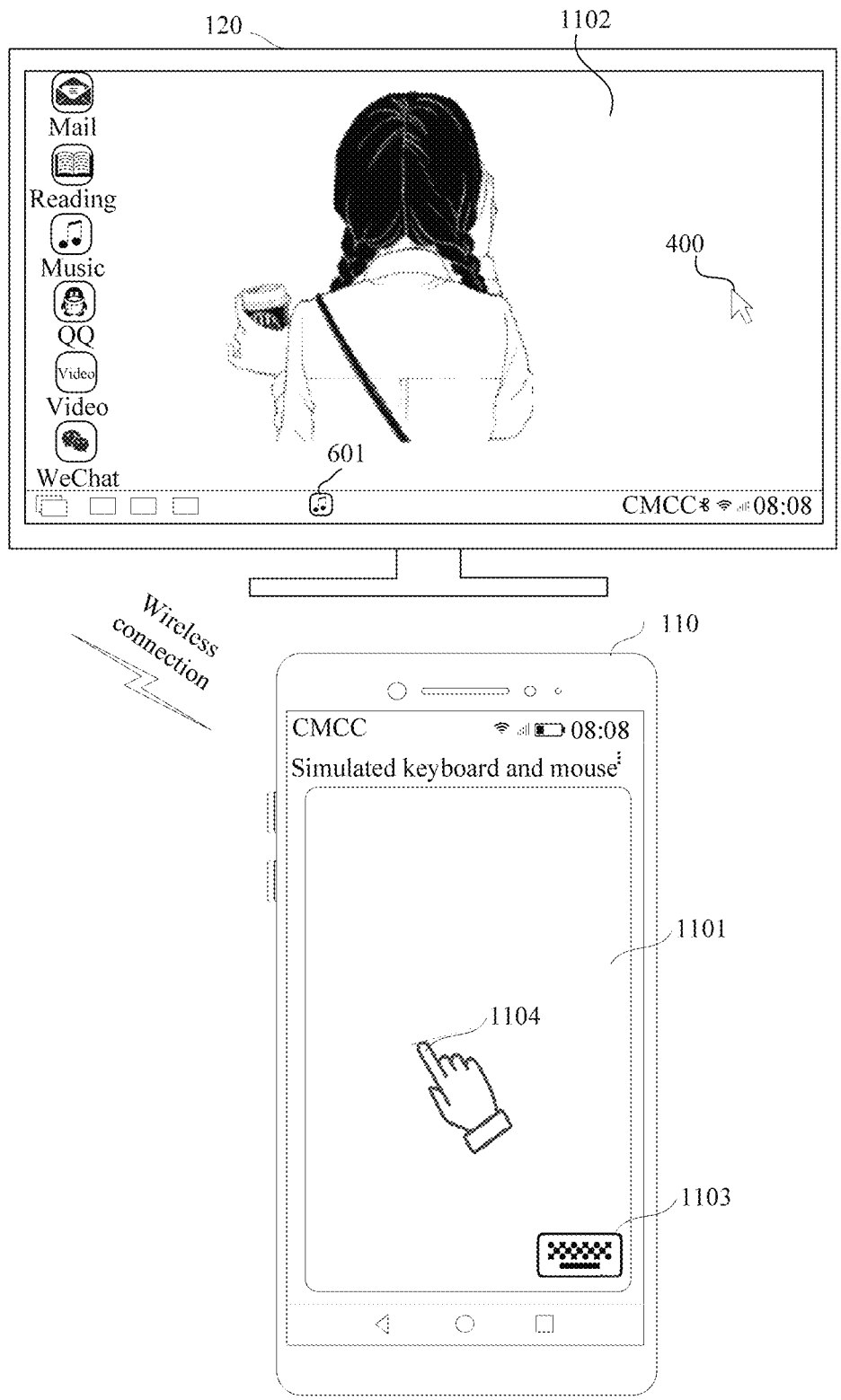
FIG. 51 is a schematic diagram 33 of an example of a displayed screen of a terminal and an external display apparatus according to an embodiment of the present disclosure.

For another example, when the user taps a "minimize screen" button 600 on the "music play screen" 1804 displayed by the external display apparatus 120 shown in FIG. 22, the terminal may switch the "Music" application to the background. In this case, as shown in FIG. 51, the terminal may instruct the external display apparatus 120 to minimize the "music play screen", and only retain an icon 601 of the "Music" application in a toolbar window.

In addition, after an application in the external display apparatus 120 is minimized, the terminal may suspend executing the application. For example, after instructing the external display apparatus 120 to minimize the "music play screen", the terminal may instruct the external display apparatus 120 to stop playing music being played.

In this embodiment of this application, in addition to the three display modes of maximizing, minimizing, and closing an application window displayed on the external display apparatus 120, the terminal sets another three display modes for each application window displayed on the external display apparatus 120: a full-screen mode, a portrait mode, and a landscape mode.

Figure 52:
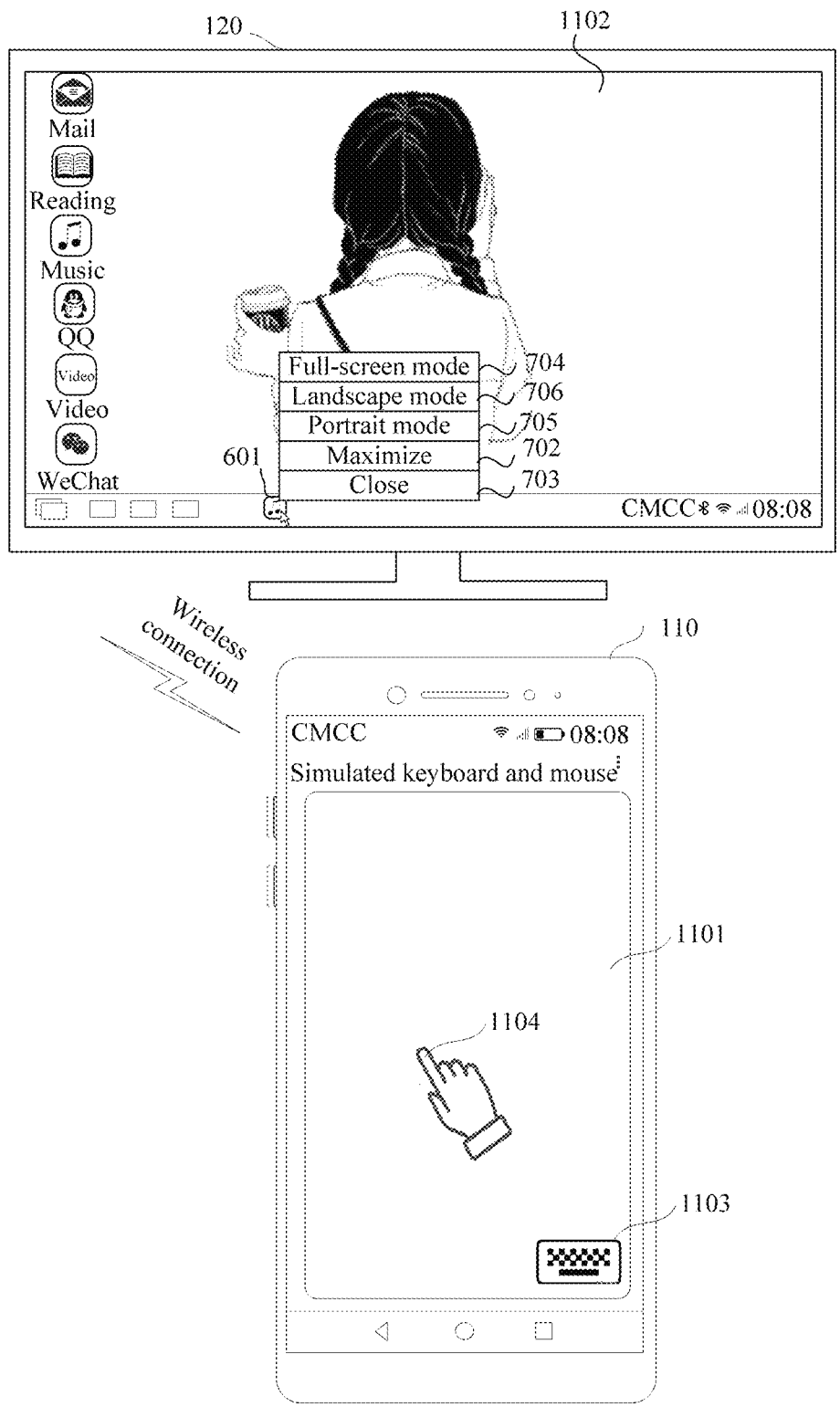
FIG. 52 is a schematic diagram 34 of an example of a displayed screen of a terminal and an external display apparatus according to an embodiment of the present disclosure.

For example, as shown in FIG. 52, a toolbar displayed by the external display apparatus 120 includes an icon 601 of at least one application window that is being displayed, and when the user performs a right-click mouse operation on the icon 601 of the "Music" application, a plurality of display modes such as Maximize 702, Close 703, Full-screen display 704, Portrait display 705, and Landscape display 706 may be displayed to the user.

Figure 53:
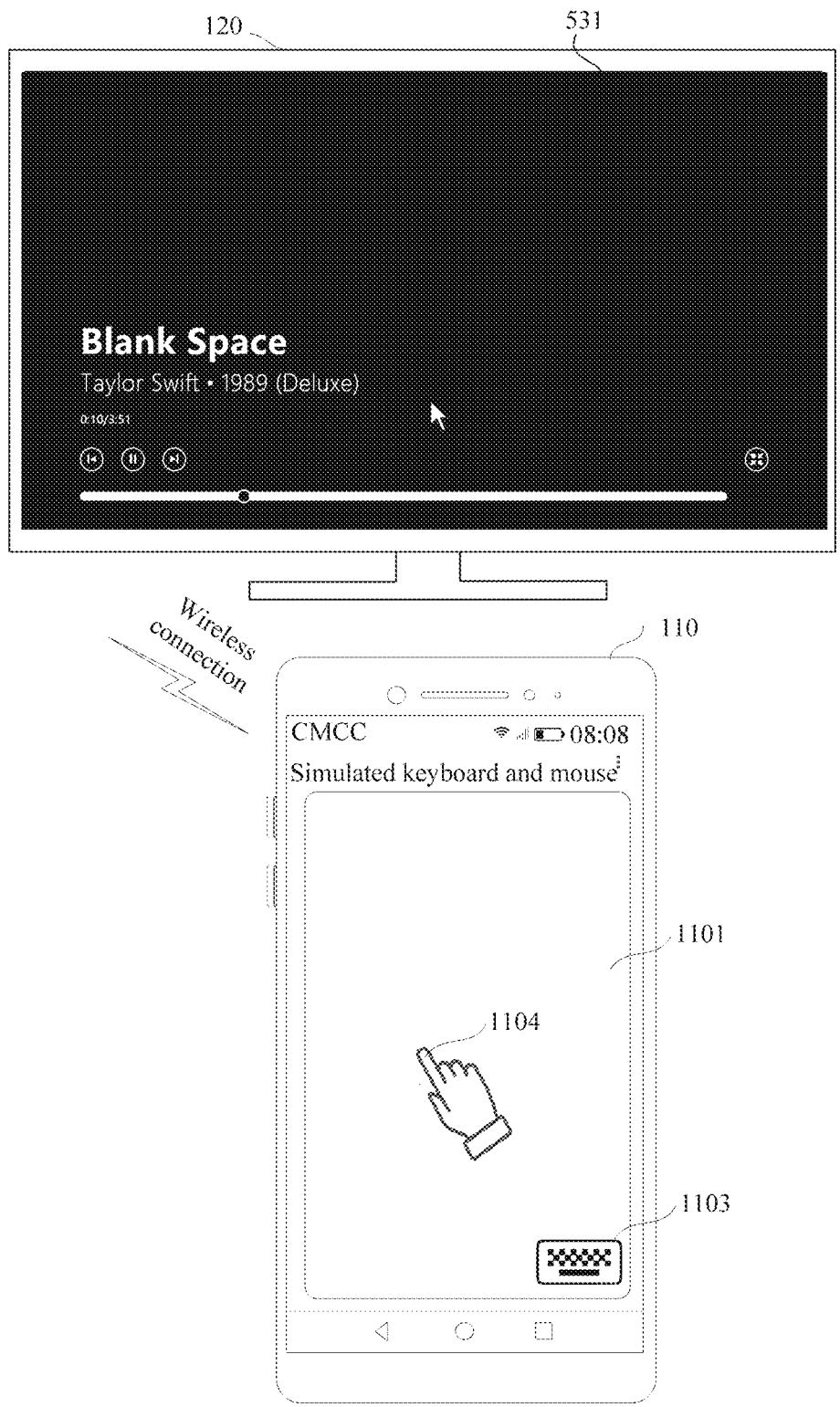
FIG. 53 is a schematic diagram 35 of an example of a displayed screen of a terminal and an external display apparatus according to an embodiment of the present disclosure.

When the user selects the Full-screen display 704, the terminal may search for a pre-stored full-screen display resource of the "Music" application, and the full-screen display resource may also be switched, in a form of an application stack, to the top of a queue corresponding to a display ID1 in the terminal. The external display apparatus 120 always reads an application stack on the top of the queue. Therefore, as shown in FIG. 53, the external display apparatus 120 invokes an application window 531 of the "Music" application in a full-screen layout, and the application window 531 fills the whole display screen. In this case, another application window displayed on the external display apparatus 120 is switched to the background.

Figure 54:
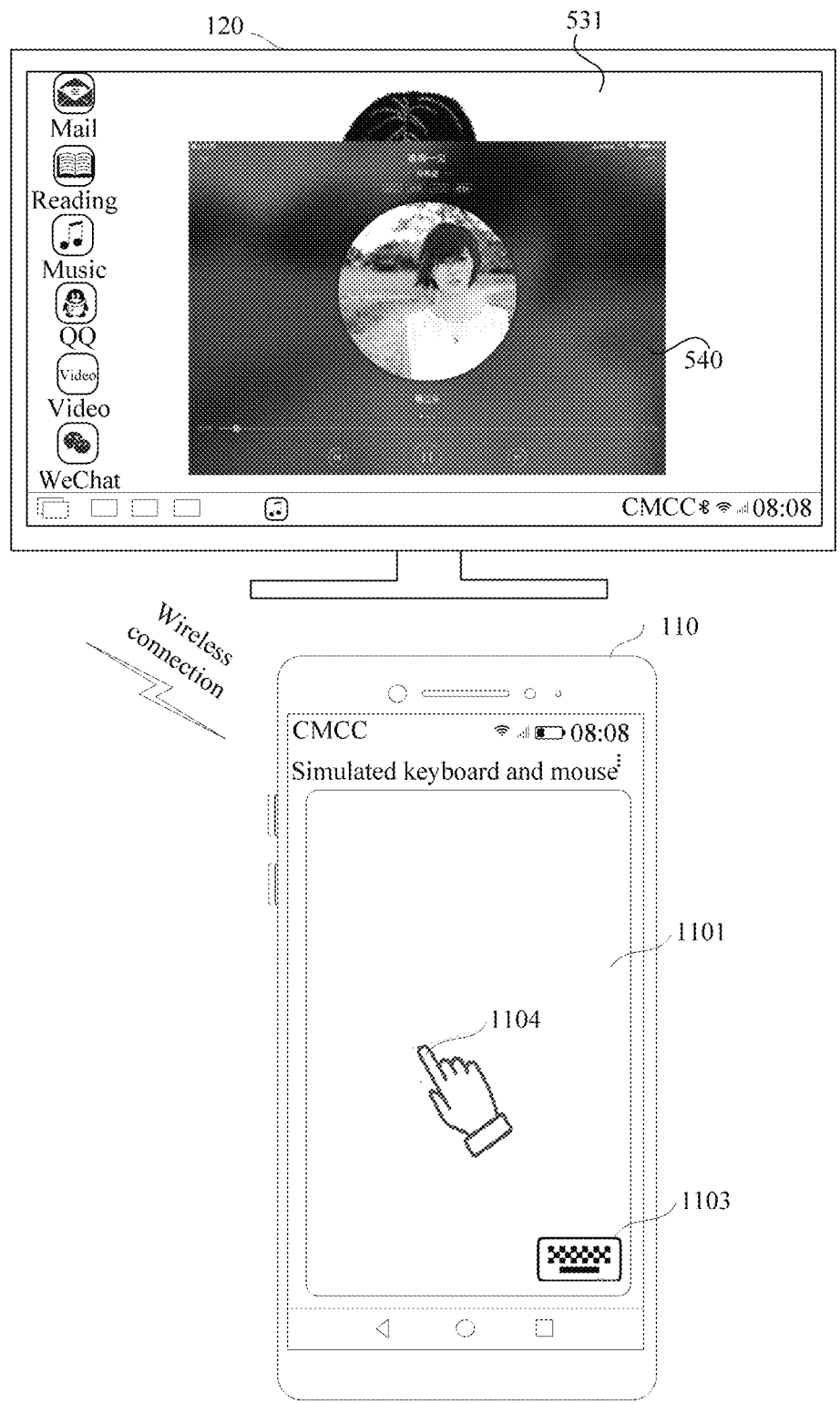
FIG. 54 is a schematic diagram 36 of an example of a displayed screen of a terminal and an external display apparatus according to an embodiment of the present disclosure.

Similarly, the terminal may pre-store a landscape display resource of each application in the Portrait display 705 and a portrait display resource of each application in the Landscape display 706. In this way, when the user triggers the landscape display (or the portrait display) mode, the terminal may switch an application stack including the portrait display (or landscape display) resource of the application to the top of the queue corresponding to the display ID1. In this case, as shown in FIG. 54, the external display apparatus 120 loads the portrait display (or the landscape display) resource onto a desktop, to display an application window 540 of the "music" application in a landscape layout.

Optionally, for any application window displayed on the external display apparatus 120, the terminal may set default values of a portrait display resource of the application window as follows: An aspect ratio is 9:16, a default width is 360 dp, and a default height is 80% of the screen. The terminal may set default values of a landscape display resource of the application window as follows: An aspect ratio is 16:9, a default width is 550 dp, and a default height is 60% of the screen.

In addition, in this embodiment of this application, the terminal may set an application stack for each application running in the display apparatus 120, and an attribute of the application stack (such as a size of the application stack and a resolution supported by the application stack) may be adjusted based on a display mode selected by the user, to adapt to display resources in different display modes. Each time the display apparatus 120 may read the application stack on top of the queue, images of application windows in different display modes are loaded onto the desktop of the display apparatus 120.

If the user manually adjusts configuration information such as a size or a position of a specific application window on the display apparatus 120, the terminal may record the user-adjusted configuration information of the application window in response to the adjustment operation. In this way, at next-time display of the application window, a specific previous display mode of the application window may be restored on the display apparatus 120 based on the recorded user-adjusted configuration information of the application window, providing better use experience for the user.

Figure 27:
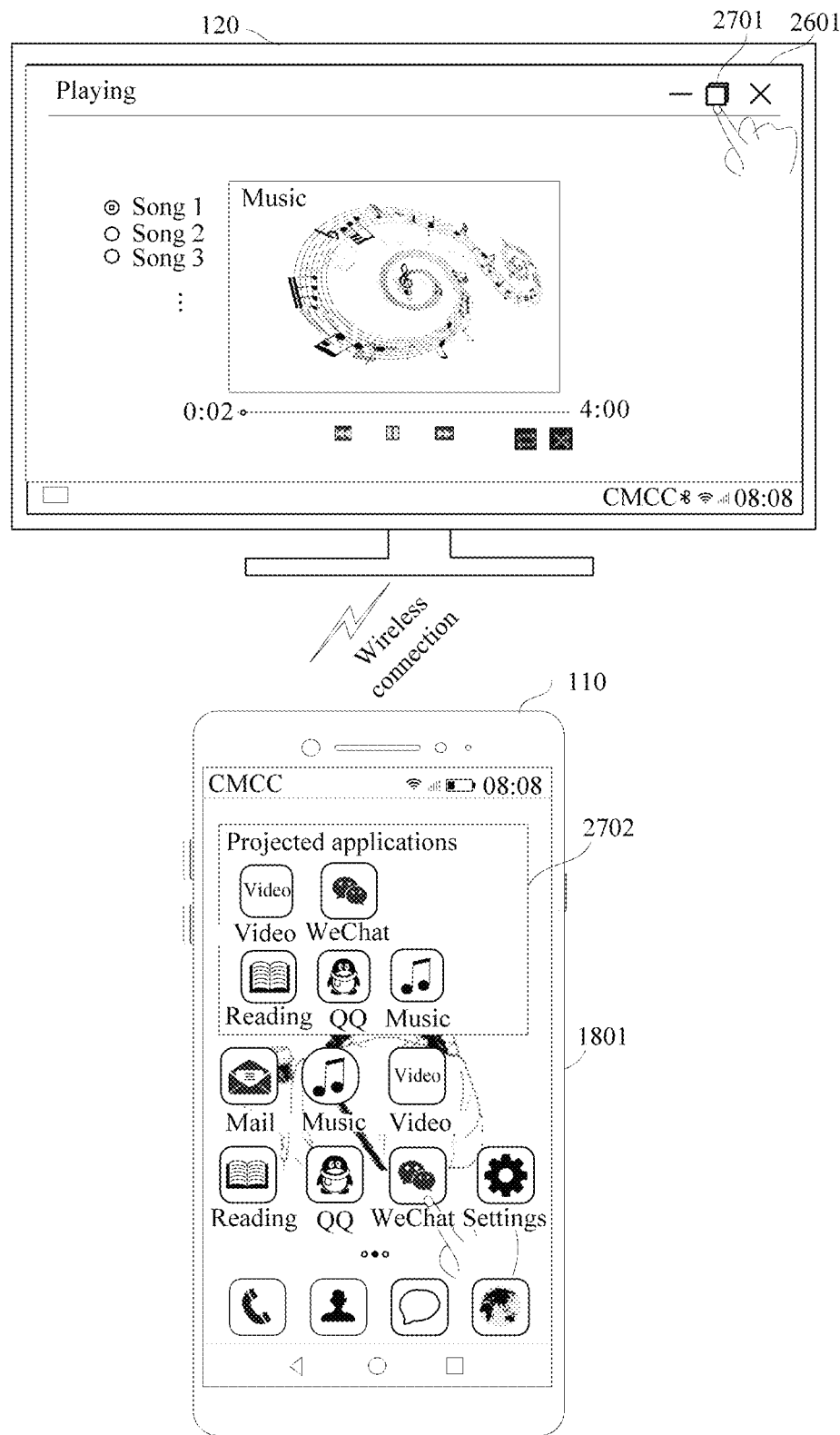
FIG. 27 is a schematic diagram 17 of an example of a displayed screen of a terminal and an external display apparatus according to an embodiment of the present disclosure.

As shown in FIG. 26, when the user drags an icon of the "WeChat" application from the terminal screen 1801 to the "projected application screen" 2201 by using the finger, the terminal may display a "projected application screen" 2301 (namely, the second screen), shown in FIG. 23, including the "Video" application, the "Reading" application, the "QQ" application, and the "Music" application (namely, the first application) and the "WeChat" application (namely, the second application), and instruct the external display apparatus 120 to display the second desktop 2302, shown in FIG. 23, including the "Video" application, the "Reading" application, the "QQ" application, and the "Music" application (namely, the first application) and the "WeChat" application (namely, the second application). As shown in FIG. 27, the external display apparatus 120 is displaying a "music play screen" 2601, and a change in the applications displayed on the desktop of the external display apparatus 120 cannot be viewed. However, when the user taps a "restore screen button" shown in FIG. 27 by using the finger, the terminal may instruct the external display apparatus 120 to display the second desktop shown in FIG. 23. Compared with the first desktop 1803, shown in FIG. 22, including the "Reading" application, the "Music" application, the "QQ" application, and the "Video" application (namely, the first application), the second desktop 2302 shown in FIG. 23 further includes the "WeChat" application (namely, the second application).

According to the display method provided in this embodiment of the present disclosure, in response to the first input of the user on the first screen, the terminal can instruct to switch the displayed screen of the external display apparatus from the "first desktop including the first application and the second application" to the "second desktop including the first application but not including the second application". In other words, in this application, the terminal can display a displayed screen (the first screen) related to content of a desktop (the first desktop) displayed by the external display apparatus, and the terminal can correspondingly switch, in response to an input on the related displayed screen (the first screen), the content displayed on the desktop of the external display apparatus. For example, an application on the desktop of the external display apparatus is deleted, to control permission of the external display apparatus to use data in the terminal.

Figure 28:
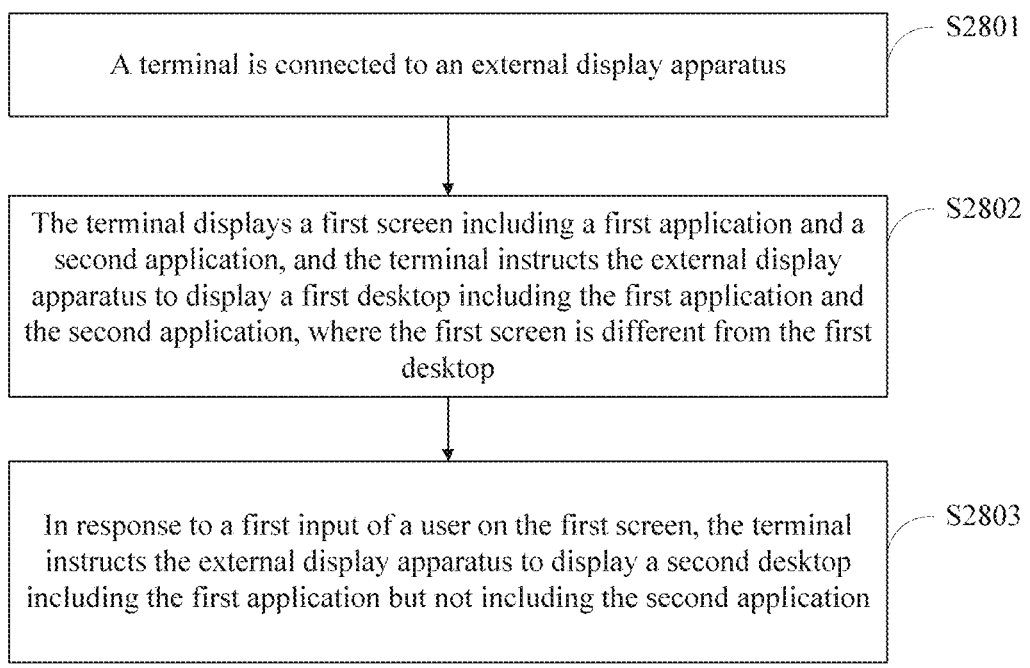
FIG. 28 is a flowchart 4 of a display method according to an embodiment of the present disclosure.

An embodiment of the present disclosure further provides a display method. As shown in FIG. 28, the display method may include S2801 to S2803.

S2801: A terminal is connected to an external display apparatus.

S2802: The terminal displays a first screen including a first application and a second application, and the terminal instructs the external display apparatus to display a first desktop including the first application and the second application, where the first screen is different from the first desktop.

For example, the terminal may display the "projected application screen" 2301 (namely, the first screen), shown in FIG. 23, including the "Video" application, the "Reading" application, the "QQ" application, and the "Music" application (namely, the first application) and the "WeChat" application (namely, the second application), and instruct the external display apparatus 120 to display the first desktop 2302, shown in FIG. 23, including the "Video" application, the "Reading" application, the "QQ" application, and the "Music" application (namely, the first application) and the "WeChat" application (namely, the second application).

S2803: In response to a first input of a user on the first screen, the terminal instructs the external display apparatus to display a second desktop including the first application but not including the second application.

Further, after S2802, the method in this embodiment of the present disclosure may further include S2804*a* or S2804*b*.

S2804*a*: In response to the first input of the user on the first screen, the terminal displays a second screen including the first application but not including the second application.

Figure 29:
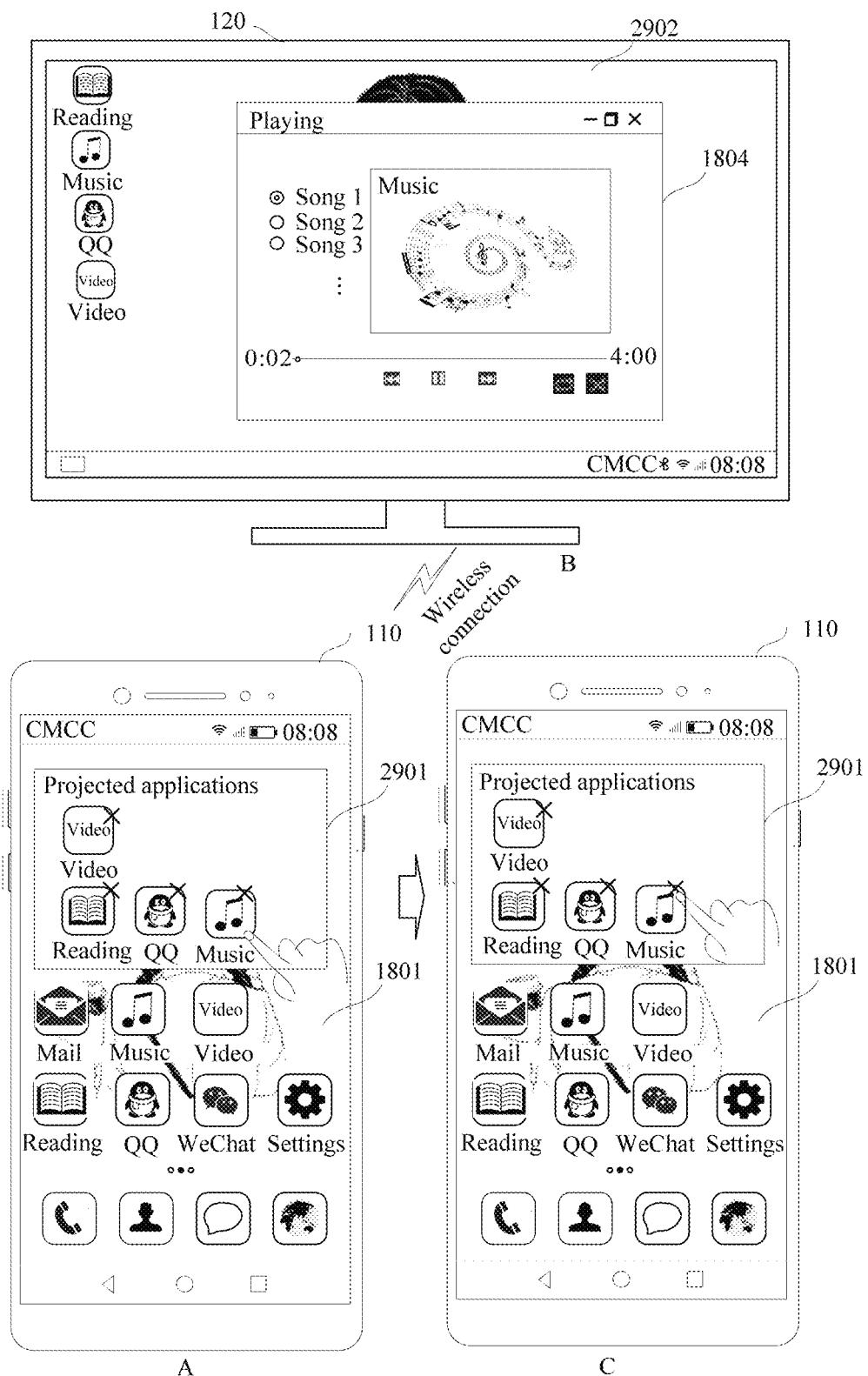
FIG. 29 is a schematic diagram 18 of an example of a displayed screen of a terminal and an external display apparatus according to an embodiment of the present disclosure.
Figure 30:
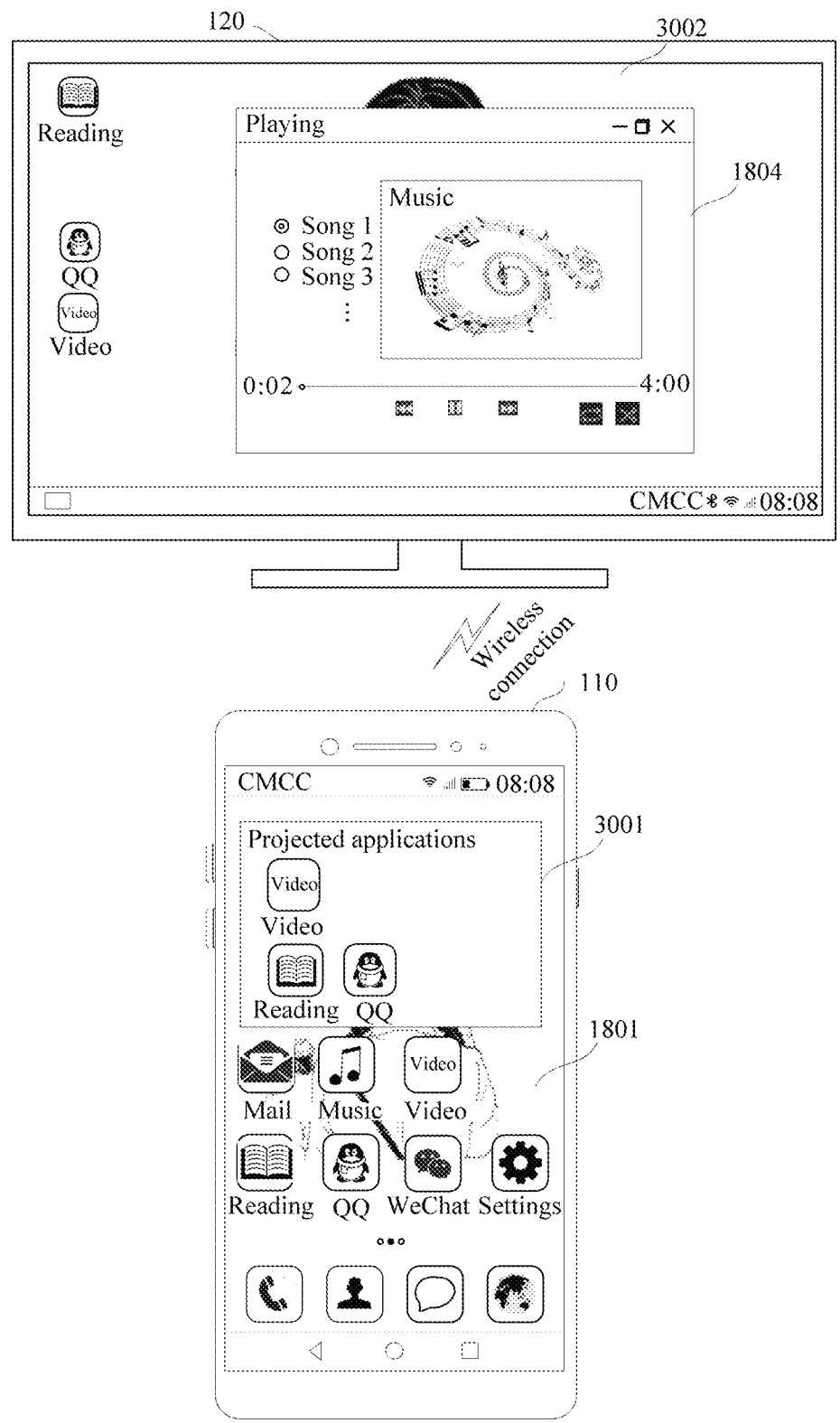
FIG. 30 is a schematic diagram 19 of an example of a displayed screen of a terminal and an external display apparatus according to an embodiment of the present disclosure.

Using FIG. 23 as an example, when the user taps or touches and holds the icon of the "Music" application shown in FIG. 23 by using the finger, the terminal may display a "projected application screen" 2901 shown in FIG. 29A; and when the user taps an "x" icon in the right corner of the "Music" application on the "projected application screen" 2901 shown in FIG. 29C, the terminal 110 may display a "projected application screen" 3001 (namely, the second screen) shown in FIG. 30, and instruct the external display apparatus 120 to display a second desktop 3002 shown in FIG. 30. It should be noted that compared with the "projected application screen" 2901 (the first screen) shown in FIG. 29A or FIG. 29C, the "projected application screen" 3001 shown in FIG. 30 does not include the "Music" application; and compared with a first desktop 2902 shown in FIG. 29B, the second desktop 3002 shown in FIG. 30 does not include the "Music" application.

S2804*b*: In response to the first input of the user on the first screen, the terminal displays a second screen including the first application in a selected state and the second application in a non-selected state, where both the first application and the second application on the first screen are in the selected state.

When the user taps or touches and holds the icon of the "Music" application shown in FIG. 23 by using the finger, the terminal may also use the shading manner shown in FIG. 24 to indicate that the "Music application" is in the non-selected state; or the terminal may use a deselecting manner shown in FIG. 25 to indicate that the "Music" application is in the non-selected state. In addition, the terminal may instruct the external display apparatus to display the second screen including the first application but not including the second application.

Optionally, the terminal may further instruct the external display apparatus to display the second screen including the first application in the selected state and the second application in the non-selected state. For a specific method for displaying, by the external display apparatus, the second screen including the first application in the selected state and the second application in the non-selected state, refer to the related descriptions of FIG. 25. Details are not repeated in this embodiment of the present disclosure.

In the display method provided in this embodiment of the present disclosure, the terminal may display, in response to the first input of the user on the first screen, the second screen including the first application and the second application on the terminal, and instruct to switch a displayed screen of the external display apparatus from the "first desktop including the first application but not including the second application" to the "second desktop including the first application and the second application". In other words, in this application, the terminal can display a displayed screen (the first screen) related to content of a desktop (the first desktop) displayed by the external display apparatus, and the terminal can correspondingly switch, in response to an input on the related displayed screen (the first screen), the content displayed on the desktop of the external display apparatus. For example, an application in the terminal is added to the desktop of the external display apparatus, so that the added application can also be used by using the external display apparatus.

Figure 31:
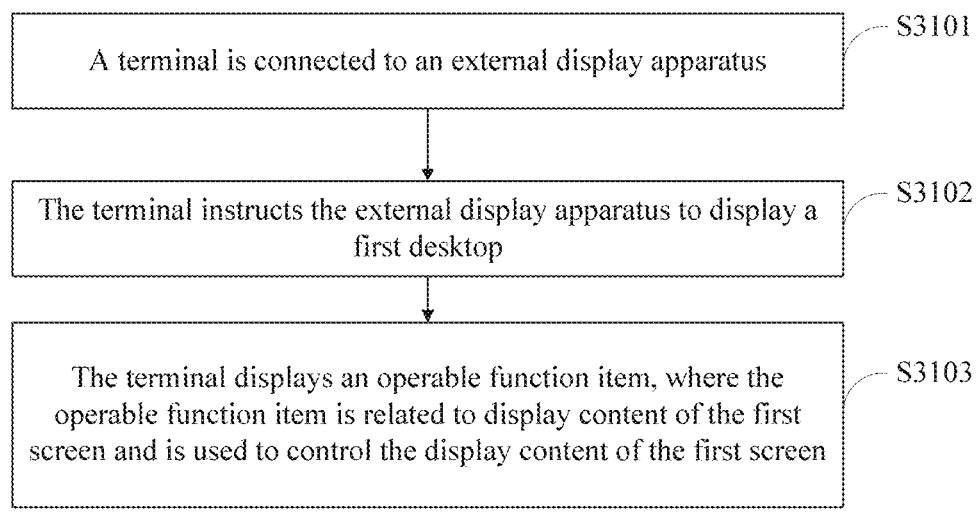
FIG. 31 is a flowchart 5 of a display method according to an embodiment of the present disclosure.

An embodiment of the present disclosure provides a display method. As shown in FIG. 31, the display method may include S3101 to S3103.

S3101: A terminal is connected to an external display apparatus.

For a manner in which the terminal is connected to the external display apparatus, refer to the connection manner described in the foregoing embodiments and the connection manner shown in any one of FIG. 1 to FIG. 5. Details are not repeated in this embodiment of the present disclosure. In addition, for welcome screens displayed by the terminal and the external display apparatus after the terminal is connected to the external display apparatus, refer to the detailed descriptions in the foregoing embodiments. Details are not repeated in this embodiment of the present disclosure.

S3102: The terminal instructs the external display apparatus to display a first screen.

S3103: The terminal displays an operable function item, where the operable function item is related to display content of the first screen and is used to control the display content of the first screen.

When displaying the first desktop on the external display apparatus, the terminal may display the operable function item related to the display content of the first desktop on a display screen of the terminal, so that a user can operate, by using the operable function item, the content displayed by the first desktop.

Figure 32:
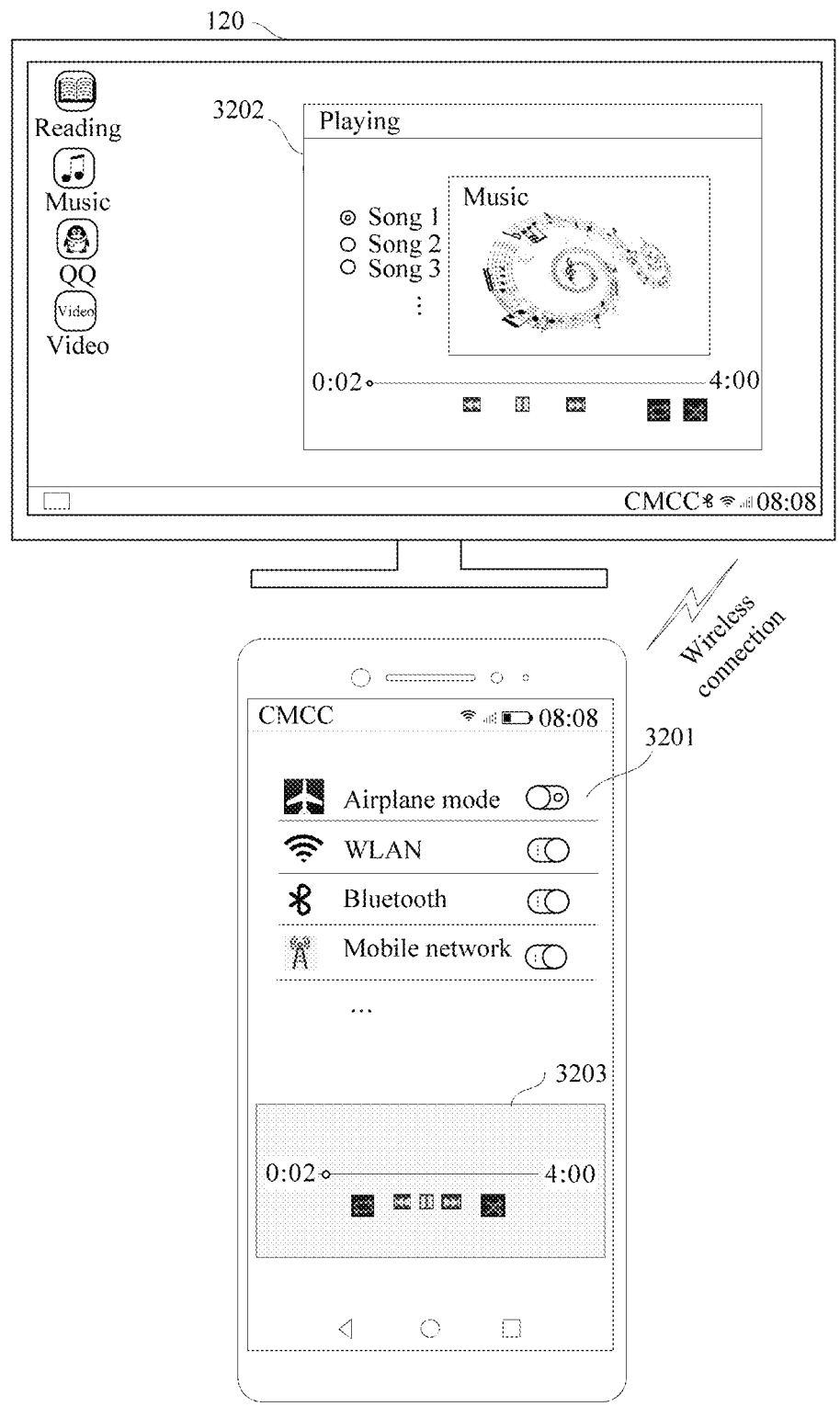
FIG. 32 is a schematic diagram 20 of an example of a displayed screen of a terminal and an external display apparatus according to an embodiment of the present disclosure.

For example, as shown in FIG. 32, it is assumed that the terminal is displaying a "settings screen" 3201 shown in FIG. 32. When the terminal 110 instructs the external display apparatus 120 to display a "music play screen" 3202 (namely, the first desktop), the terminal may display an "audio adjustment window" 3203 shown in FIG. 32. The user may perform operations such as "switching music being played on the "music play screen" 3202 displayed by the external display apparatus" and "adjusting volume" in the "audio adjustment window" 3203 displayed on the terminal.

According to the display method provided in this embodiment of the present disclosure, the terminal and the external display apparatus can be independent of each other and display different content, and the terminal can also display the operable function item related to the content displayed by the external display apparatus, so that the user can control, by using the operable function item, the content currently displayed by the external display apparatus.

In this solution, even if the display screen of the terminal is not used as a touchpad of the external display apparatus, the terminal can provide, in a manner of "displaying the operable function item related to the content displayed by the external display apparatus", the user with an interface (namely, the operable function item) for controlling the display content of the external display apparatus, so that the user can control, by using the operable function item, the content currently displayed by the external display apparatus.

It should be noted that in this embodiment of the present disclosure, the terminal may perform S3102 and S3103 based on the method shown in FIG. 7, FIG. 12, FIG. 17, or FIG. 28.

Further, when displaying the first desktop on the external display apparatus (that is, performing S3102), the terminal may also display a first screen on the display screen of the terminal. The method in this embodiment of the present disclosure may further include S3104, and S3103 may be replaced with S3103'.

S3104: The terminal displays the first screen on a display screen of the terminal, where the second screen includes a function item drop-down notification bar or a function item suspend window and first display content displayed by the terminal in response to a first input on the display screen of the terminal.

Figure 33:
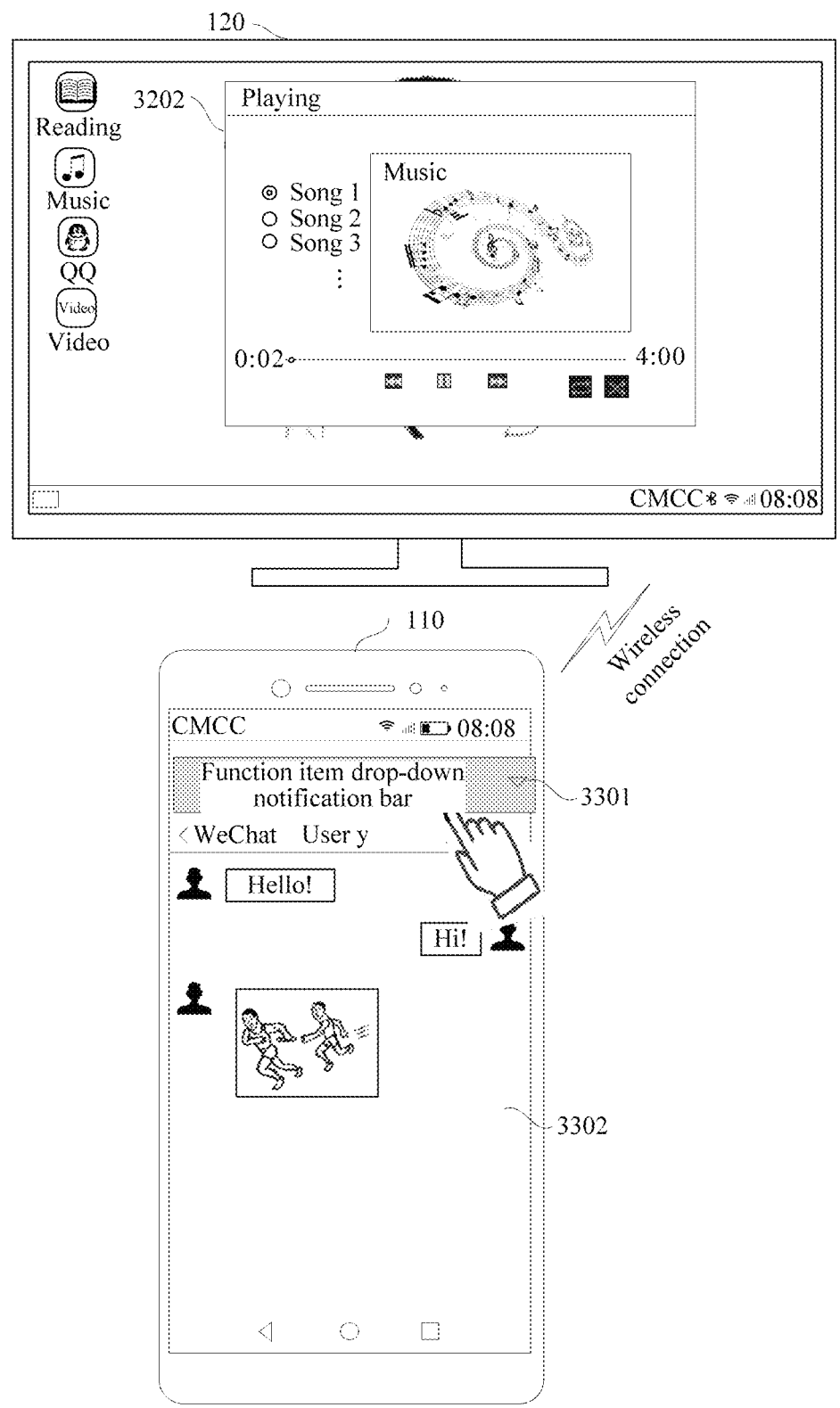
FIG. 33 is a schematic diagram 21 of an example of a displayed screen of a terminal and an external display apparatus according to an embodiment of the present disclosure.

For example, when the first screen includes the function item drop-down notification bar, if the external display apparatus is displaying the "music play screen" 3202 (namely, the first desktop) shown in FIG. 32, the terminal may display the first screen, shown in FIG. 33, including a "WeChat chat screen" 3302 and a "Function item drop-down notification bar" 3301.

S3103': The terminal displays an operable function item on a display screen of the terminal in response to a second input for a function item drop-down notification bar or a function item suspend window on the display screen of the terminal.

When the user taps the "Function item drop-down notification bar" 3301 shown in FIG. 33 by using a finger, the terminal may display the "audio adjustment window" on the terminal. The user may perform operations such as "switching music being played on the "music play screen" displayed by the external display apparatus" and "adjusting volume" in the "audio adjustment window" displayed on the terminal.

In this embodiment of the present disclosure, the terminal may display, on the drop-down notification bar (namely, the function item notification bar) of the terminal, the operable function item related to the content displayed by the external display apparatus. This can prevent the operable function item from covering the first screen displayed by the terminal. In addition, the terminal may receive a trigger operation performed by the user on the function item notification bar, and display the operable function item related to the content displayed by the external display apparatus, so that the user can control, by using the operable function item, the content currently displayed by the external display apparatus.

It should be noted that although a connection between the external display apparatus and the external device (the keyboard and/or the mouse) is not shown in FIG. 18 to FIG. 27, FIG. 29, FIG. 30, FIG. 32, and FIG. 33, this does not mean that the methods in FIG. 18 to FIG. 27, FIG. 29, FIG. 30, FIG. 32, and FIG. 33 are inapplicable to the application scenario in which the external display apparatus is connected to the external device. In other words, the methods in FIG. 18 to FIG. 27, FIG. 29, FIG. 30, FIG. 32, and FIG. 33 not only can be applied to the application scenario in which the external display apparatus is not connected to the external device, but also can be applied to the application scenario in which the external display apparatus is connected to the external device. This is not limited in this embodiment of the present disclosure.

Further, before S1702, S2802, S3103, or S3103', the method in this embodiment of the present disclosure may further include: determining, by the terminal, that the terminal is connected to an external device, where the external device includes a keyboard and/or a mouse.

Further, when the terminal is used as the touchpad of the external display apparatus, that is, the terminal displays a "touchpad screen", the terminal may also display the operable function item related to the display content of the external display apparatus.

In some embodiments, when the terminal is used as the touchpad of the external display apparatus, the operable function item may also be hidden in the function item drop-down notification bar on the display screen of the terminal. In other words, when the user taps the function item drop-down notification bar by using the finger, the terminal may display, on the "touchpad screen", the operable function item related to the display content of the external display apparatus, such as the "audio adjustment window".

In some embodiments, when the display screen of the terminal is used as the touchpad of the external display apparatus, the function item drop-down notification bar displayed on the display screen of the terminal may be replaced with the function item suspend window. For a detailed description of the function item suspend window, refer to the touch suspend button described in the foregoing embodiment of the present disclosure. Details are not repeated in this embodiment of the present disclosure.

Figure 34:
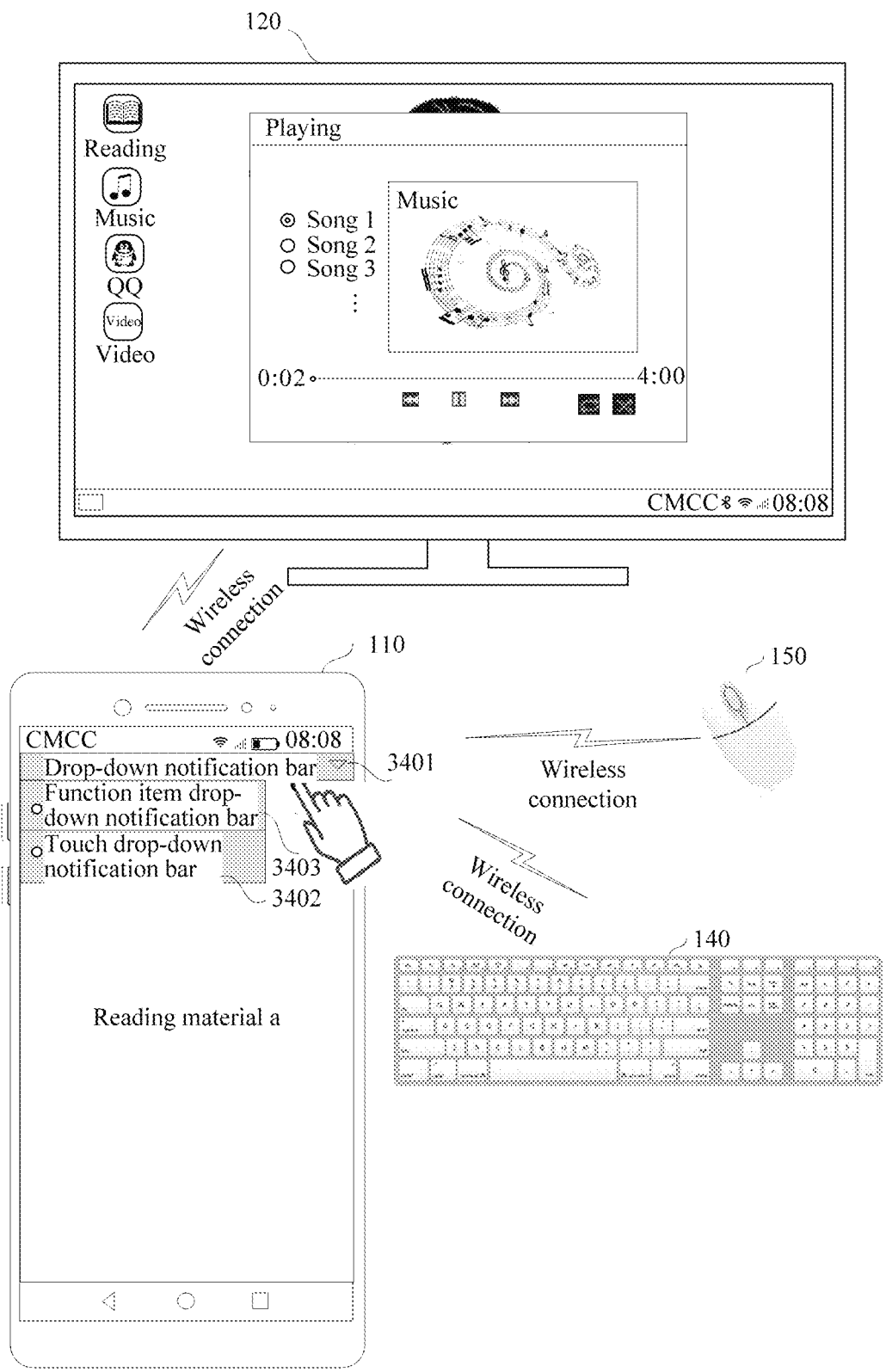
FIG. 34 is a schematic diagram 22 of an example of a displayed screen of a terminal and an external display apparatus according to an embodiment of the present disclosure.

In some embodiments, the terminal may display both the touch drop-down notification bar and the function item drop-down notification bar. For example, as shown in FIG. 34, the terminal may display a drop-down notification bar 3391. When the user taps the drop-down notification bar 3391 shown in FIG. 34 by using the finger, the drop-down notification bar 3391 may unfold to display a "Function item drop-down notification bar" 3392 and a "Touch drop-down notification bar" 3393.

Figure 35:
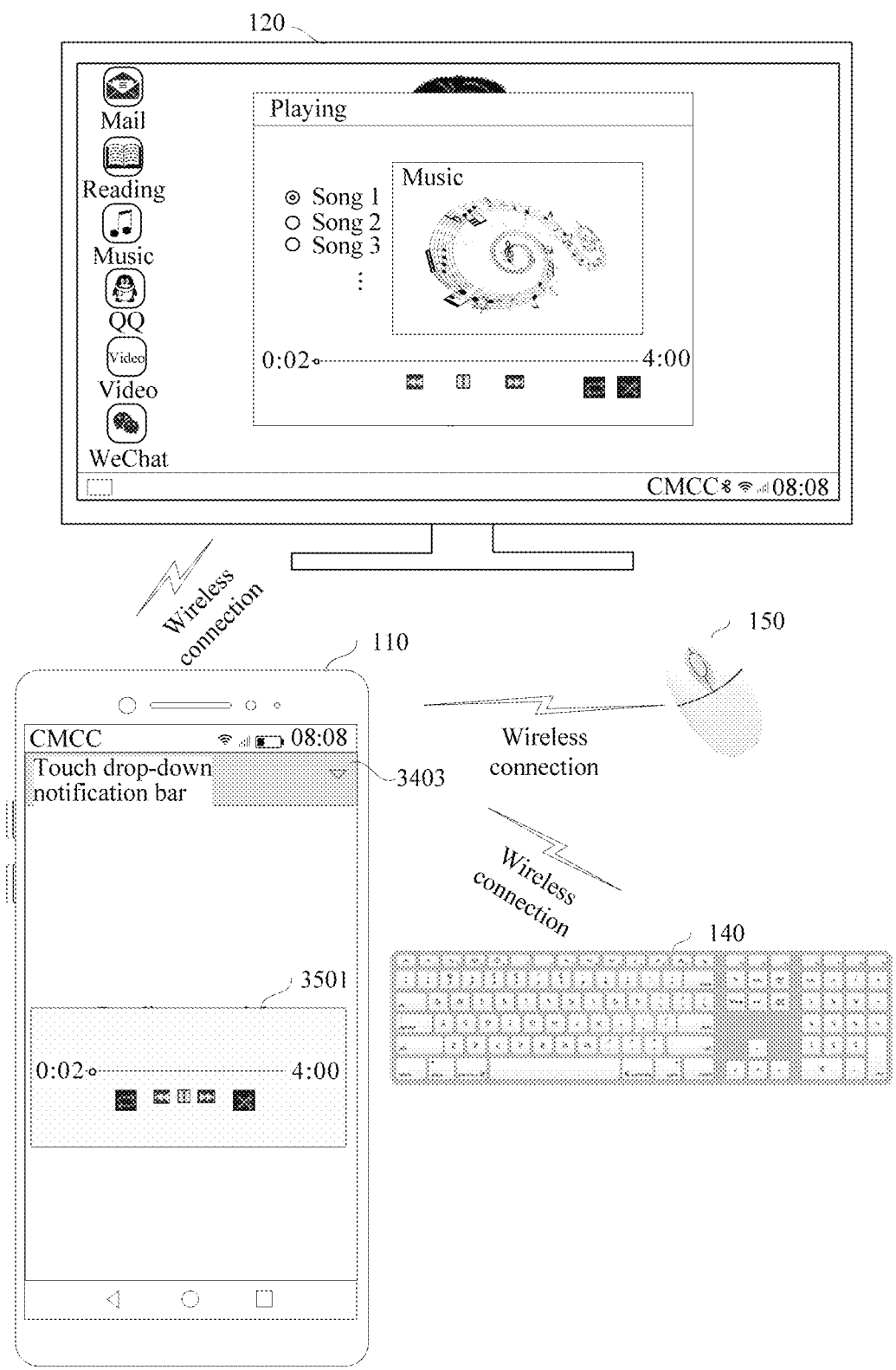
FIG. 35 is a schematic diagram 23 of an example of a displayed screen of a terminal and an external display apparatus according to an embodiment of the present disclosure.

When the user taps the "Function item drop-down notification bar" 3392 shown in FIG. 34 by using the finger, the terminal may display a terminal screen shown in FIG. 35 on the display screen of the terminal. The terminal screen shown in FIG. 34 includes an "audio adjustment window" 3391 (namely, the operable function item) and the "Touch drop-down notification bar" 3393.

Figure 36:
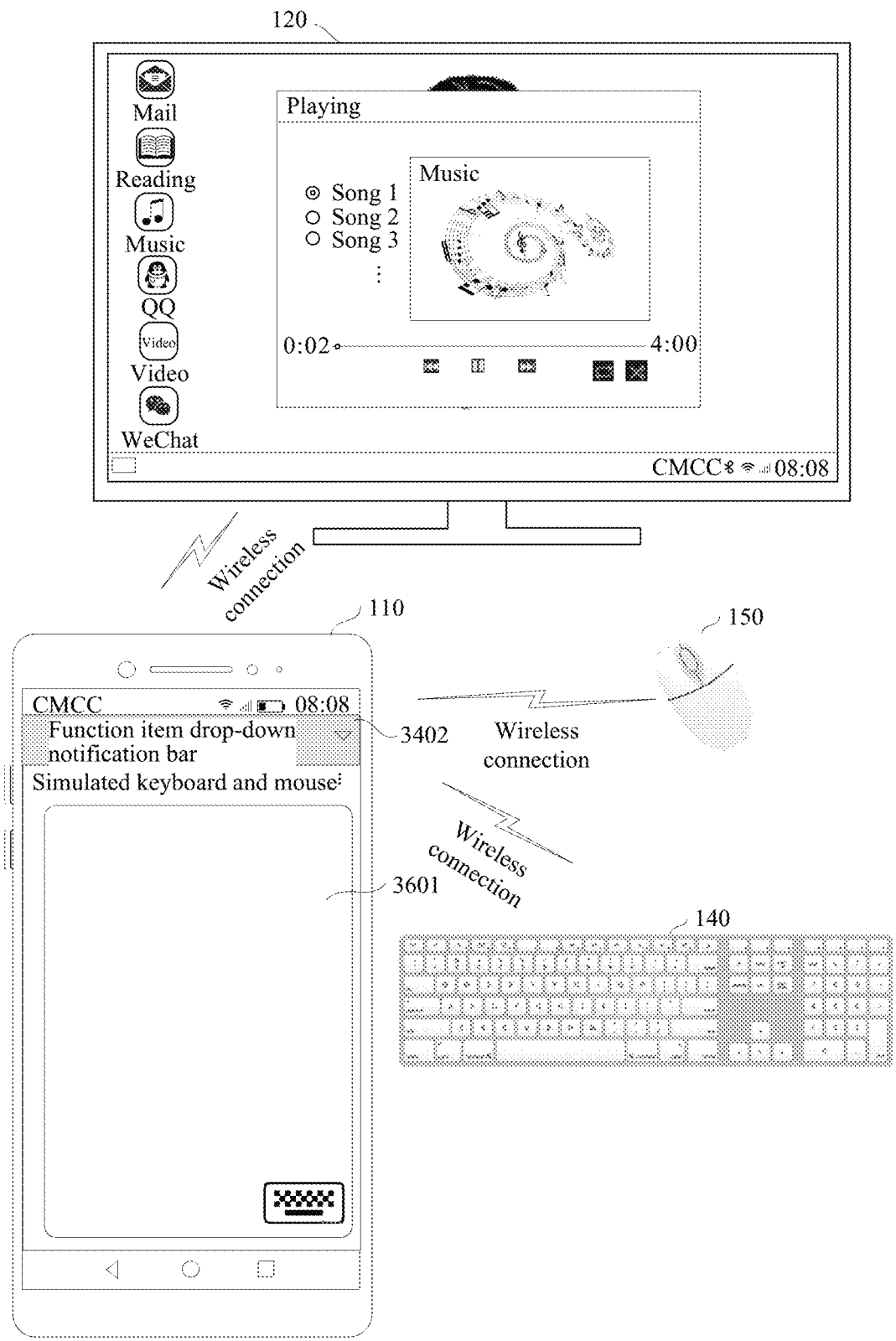
FIG. 36 is a schematic diagram 24 of an example of a displayed screen of a terminal and an external display apparatus according to an embodiment of the present disclosure.

When the user taps the "Touch drop-down notification bar" 3393 shown in FIG. 34 or FIG. 35 by using the finger, the terminal may display a terminal screen shown in FIG. 36 on the display screen of the terminal. The terminal screen shown in FIG. 36 includes a "touchpad screen" 3601 and the "Function item drop-down notification bar" 3392.

In addition, when the user taps the "Function item drop-down notification bar" 3392 shown in FIG. 36 by using the finger, the terminal may display a terminal screen shown in FIG. 35 on the display screen of the terminal. The terminal screen shown in FIG. 35 includes an "audio adjustment window" 3501 (namely, the operable function item) and the "Touch drop-down notification bar" 3503.

In some embodiments, when the terminal is connected to the external display apparatus, the terminal may display the first desktop on the external display apparatus in a preset default display mode (namely, a first display mode). The first display mode may be a display mode adapted to the external display apparatus, for example, the display mode in which the external display apparatus displays corresponding content and that is shown in any one of FIG. 1 to FIG. 5, FIG. 8 to FIG. 11, FIG. 13 to FIG. 16, FIG. 18 to FIG. 27, FIG. 29 and FIG. 30, and FIG. 31 to FIG. 36. Alternatively, the first display mode may be a display mode adapted to the display screen of the terminal, for example, a display mode in which the external display apparatus displays corresponding content and that is shown in FIG. 37.

Correspondingly, that "the terminal instructs the external display apparatus to display a first desktop" may be replaced with S3801.

S3801: The terminal instructs the external display apparatus to display the first desktop in a first display mode, where the first display mode is a preset default display mode.

Figure 37:
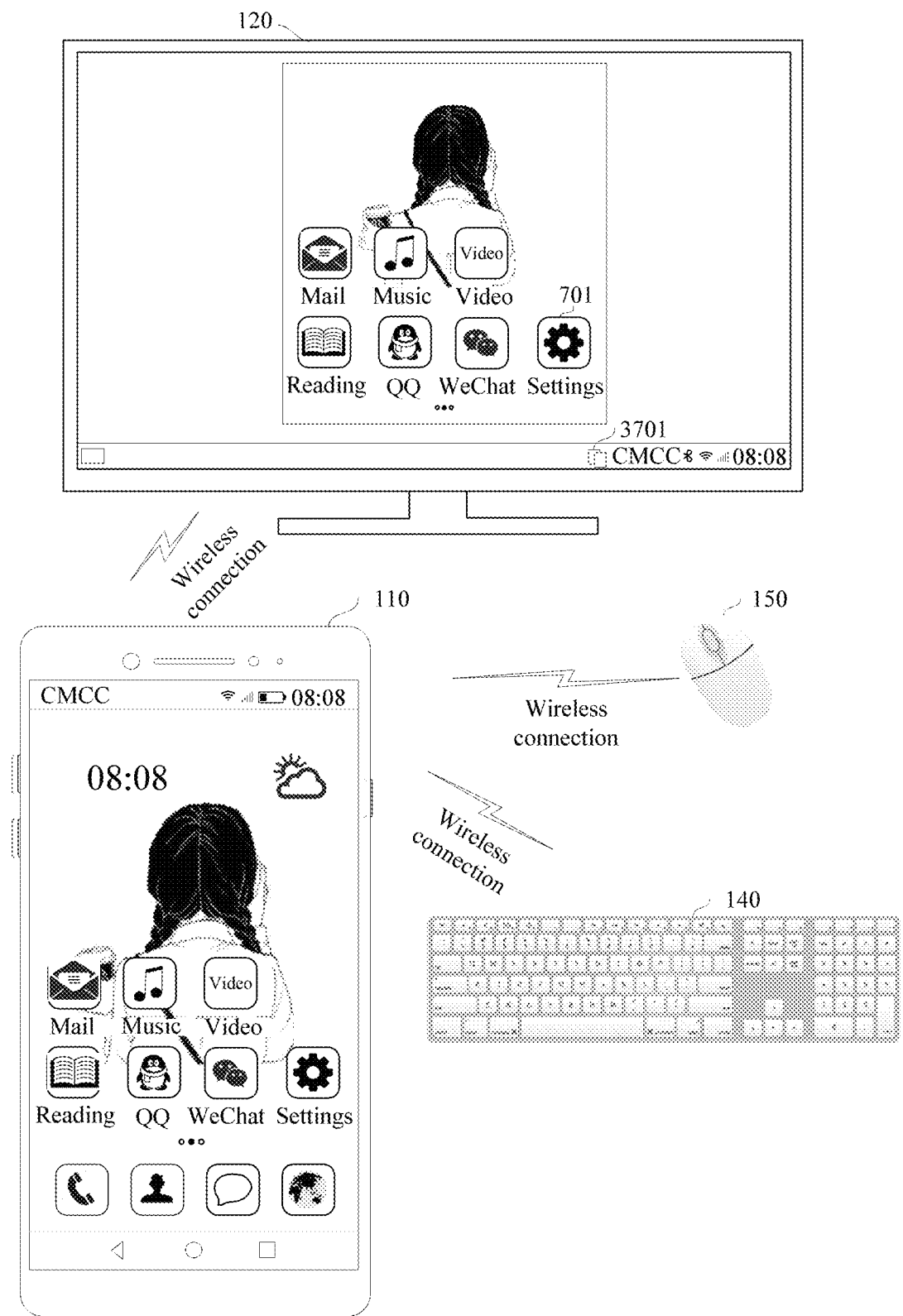
FIG. 37 is a schematic diagram 25 of an example of a displayed screen of a terminal and an external display apparatus according to an embodiment of the present disclosure.

For example, as shown in FIG. 37, a displayed screen of the external display apparatus may include a "mode switching option" 3701. When the user clicks the "mode switching option" 3701 by using a mouse cursor, the external display apparatus may be controlled to switch a display mode, that is, switch from the first display mode to a second display mode or from a second display mode to the first display mode.

In an implementation of this embodiment of the present disclosure, after S3801, the method in this embodiment of the present disclosure may further include S3802.

S3802: In response to a third input of the external device for a mode switching option on the first desktop, the terminal instructs the external display apparatus to display the first desktop in a second display mode.

In an implementation of this embodiment of the present disclosure, after S1702 or S2901, the method in this embodiment of the present disclosure may further include S3802'.

S3802': In response to a fourth input of a user on the terminal, the terminal instructs the external display apparatus to display the first desktop in a second display mode.

Figure 38:
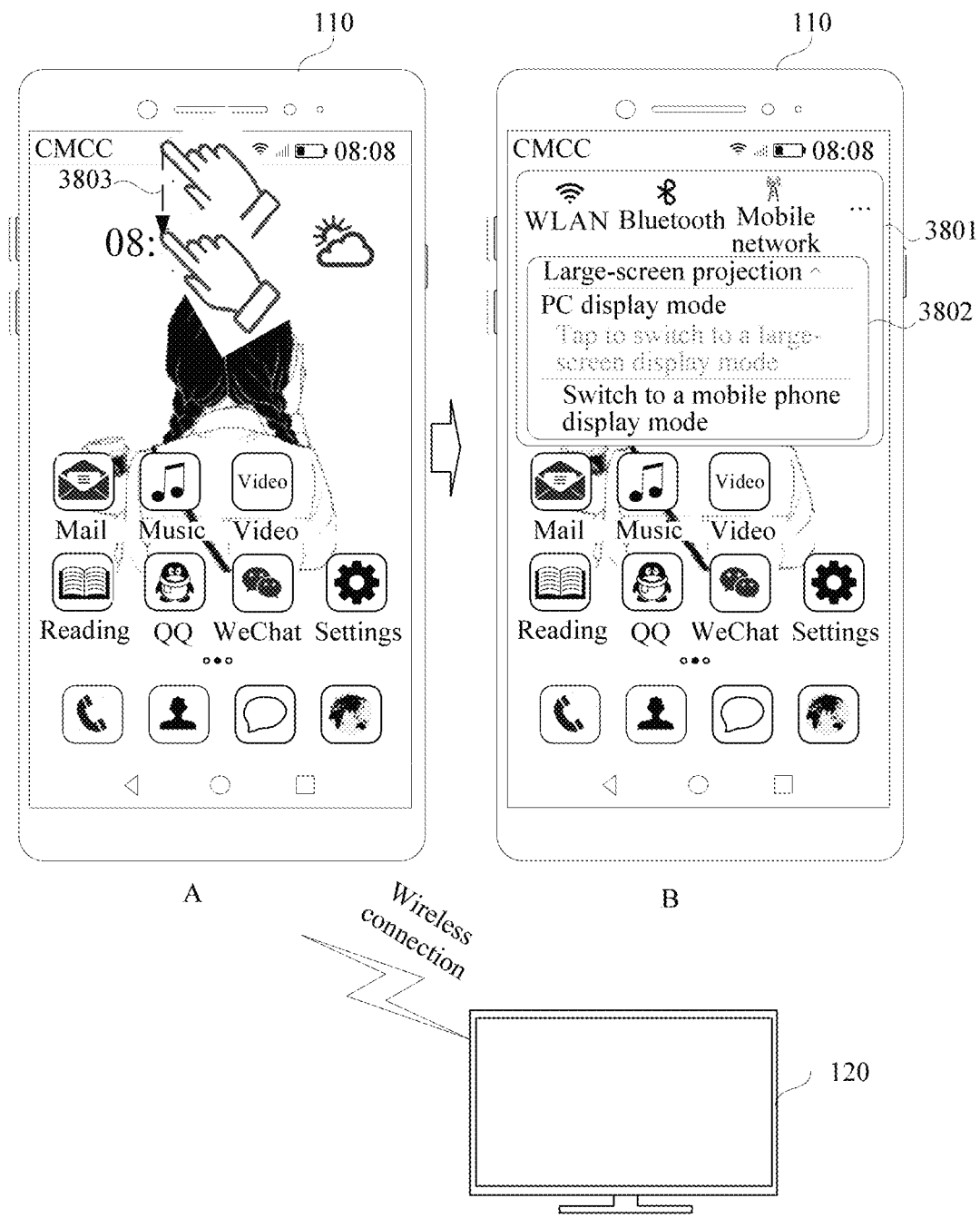
FIG. 38 is a schematic diagram 2 of an example of a displayed screen of a terminal according to an embodiment of the present disclosure.

For example, as shown in FIG. 38, a drop-down notification bar 3801 of the terminal may include a "mode switching option" 3802. When the "mode switching option" 3802 is tapped, the terminal may control the external display apparatus to switch a display mode, that is, switch from the first display mode to the second display mode or from the second display mode to the first display mode.

Optionally, the fourth input may be a tap operation of the user on a preset shortcut key, and the shortcut key is used to control the external display apparatus to switch the display mode.

When the first display mode is a display mode that is adapted to the external display apparatus and that is shown in any one of FIG. 1 to FIG. 5, FIG. 8 to FIG. 11, FIG. 13 to FIG. 16, FIG. 18 to FIG. 27, FIG. 29 and FIG. 30, and FIG. 31 to FIG. 36, the second display mode is a display mode that is adapted to the display screen of the terminal and that is shown in FIG. 37; or when the first display mode is a display mode that is adapted to the display screen of the terminal and that is shown in FIG. 37, the second display mode is a display mode that is adapted to the external display apparatus and that is shown in any one of FIG. 1 to FIG. 5, FIG. 8 to FIG. 11, FIG. 13 to FIG. 16, FIG. 18 to FIG. 27, FIG. 29 and FIG. 30, and FIG. 31 to FIG. 36.

Figure 39:
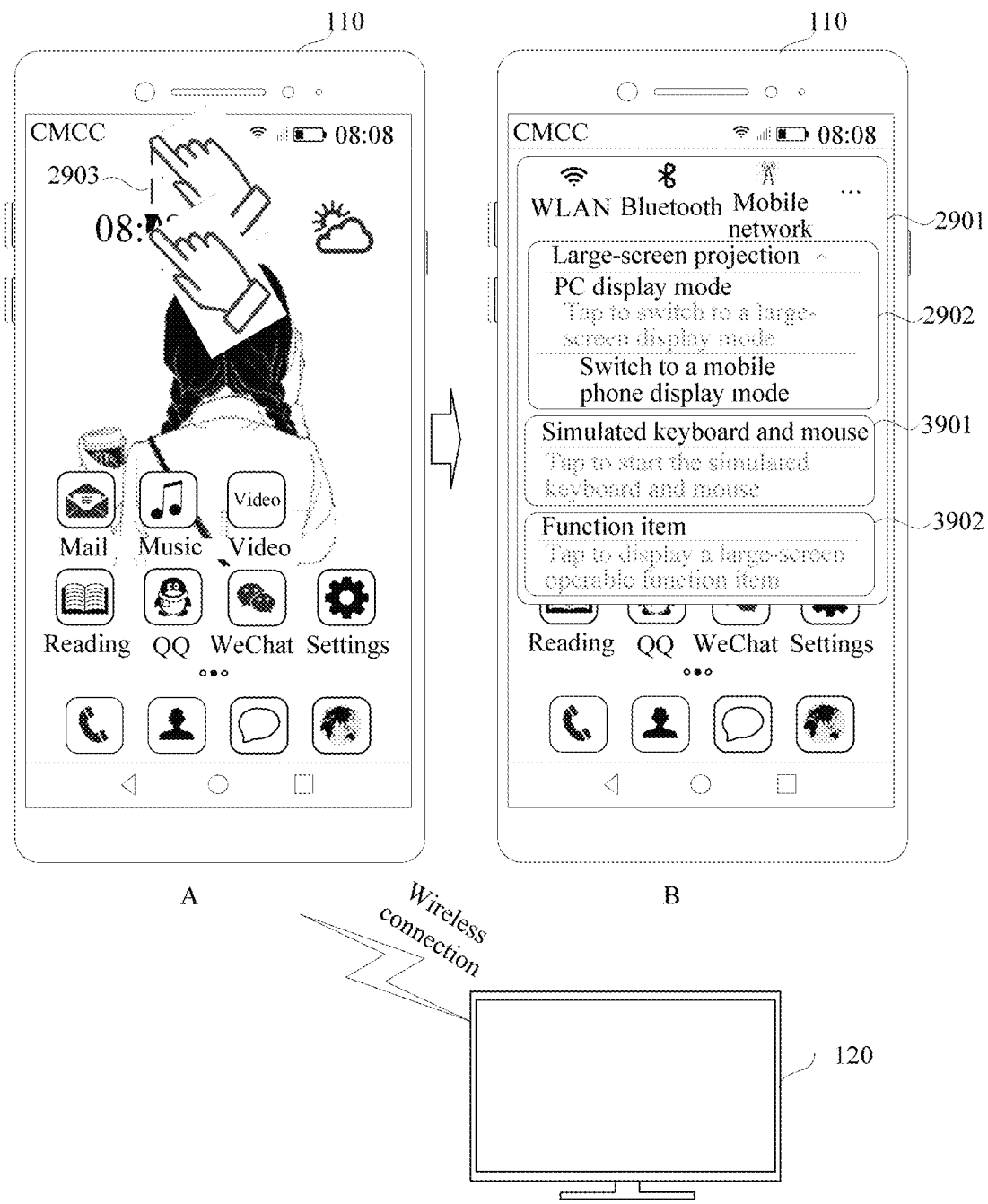
FIG. 39 is a schematic diagram 3 of an example of a displayed screen of a terminal according to an embodiment of the present disclosure.

Optionally, as shown in FIG. 39, a "Touch drop-down menu" 3901, a "Function item drop-down menu" 3902, and the "mode switching option" 2902 in this embodiment of the present disclosure may be integrated into a drop-down menu 2901 of the terminal for implementation. When the user slides down along the top of the display screen of the terminal by using the finger (that is, the finger slides along a sliding track 3803 shown in FIG. 38A), the terminal may display the drop-down menu 3801 shown in FIG. 38B. The drop-down menu 3801 not only can include options such as "WLAN", "Bluetooth", and "Mobile Network", but also can include the "Touch drop-down menu" 3901, the "Function item drop-down menu" 3902, or the "mode switching option" 3802.

For content displayed by the display screen of the terminal or the external display apparatus when the user taps the "Touch drop-down menu" 3901, the "Function item drop-down menu" 3902, or the "mode switching option" 3802 shown in FIG. 39 by using the finger, refer to the foregoing descriptions in this embodiment of the present disclosure. Details are not repeated in this embodiment of the present disclosure.

Further, to help the user understand a control/operation manner of the terminal or the external display apparatus when the terminal is connected to the external display apparatus and projects display content on the external display apparatus, the terminal may display a projection help screen when the terminal is connected to the external display apparatus. The method in this application may further include S3901.

S3901: When the terminal is connected to the external display apparatus, the display screen of the terminal displays a projection help screen, where the projection help screen includes projection help information, and the projection help information is used to indicate a control manner for enabling the terminal to display related content on the external display apparatus.

Figure 40:
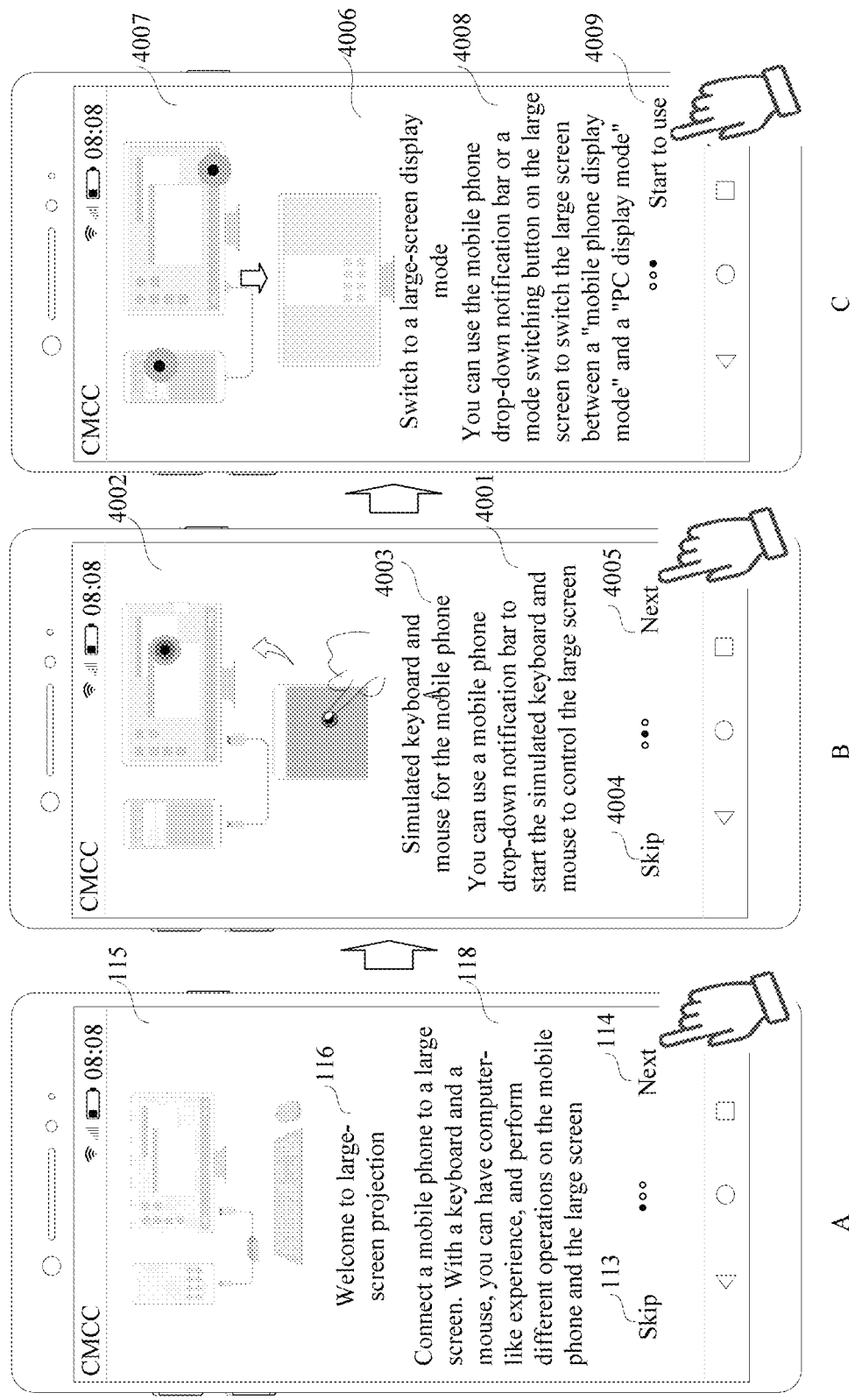
FIG. 40 is a schematic diagram 4 of an example of a displayed screen of a terminal according to an embodiment of the present disclosure.

Using FIG. 4 as an example, when the terminal is connected to the external display apparatus, the display screen of the terminal may display the terminal screen 118 shown in FIG. 4 or FIG. 40A. The terminal screen 118 shown in FIG. 4 or FIG. 40A may include an "illustration of a connection between the terminal and the external display apparatus" 115, a welcome and operation text 116, the "Skip" option 113, and a "Next" option 114.

When the user taps the "Skip" option 113 shown in FIG. 4 or FIG. 40A by using the finger, the display screen of the terminal may display the terminal screen shown in FIG. 8, and the external display apparatus may display the large-screen window shown in FIG. 8.

When the user taps the "Next" option 114 shown in FIG. 40A by using the finger, the display screen of the terminal may display a terminal screen 4001 shown in FIG. 40B. In this case, the external display apparatus may still display the large-screen window shown in FIG. 8, or the external display apparatus may display, in the first display mode or the second display mode, display content of the terminal screen 4001 shown in FIG. 40B. The terminal screen 4001 shown in FIG. 40B may include a "terminal simulated keyboard and mouse illustration" 4002, "simulated keyboard and mouse use instruction information" 4003, a "Skip" option 4004, and a "Next" option 4005.

When the user taps the "Skip" option 4004 shown in FIG. 40B by using the finger, the display screen of the terminal may display the terminal screen shown in FIG. 8, and the external display apparatus may display the large-screen window shown in FIG. 8.

When the user taps the "Next" option 4005 shown in FIG. 40B by using the finger, the display screen of the terminal may display a terminal screen 4006 shown in FIG. 40C. In this case, the external display apparatus may still display the large-screen window shown in FIG. 8, or the external display apparatus may display, in the first display mode or the second display mode, display content of the terminal screen 4006 shown in FIG. 40C. The terminal screen 4006 shown in FIG. 40C may include a "large-screen display mode switching illustration" 4007, "large-screen switching instruction information" 4008, and a "Start to use" option 4009.

When the user taps the "Start to use" option 4009 shown in FIG. 40C by using the finger, the display screen of the terminal may display the terminal screen shown in FIG. 8, and the external display apparatus may display the large-screen window shown in FIG. 8.

The foregoing describes the solutions provided in the embodiments of this application from a perspective that the terminal controls the display screen of the terminal and the external display apparatus to display same or different content. To implement the foregoing functions, the terminal includes corresponding function modules for performing the functions. A person skilled in the art should be easily aware that in this application, terminals and algorithm operations in examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The embodiments of this application provide the terminal to implement the foregoing method embodiments. The terminal may be divided based on the foregoing method examples. For example, various modules or units may be divided for corresponding functions, or two or more functions may be integrated into one processing module. The integrated module may be implemented in a form of hardware, or may be implemented in a form of a software module or a unit. The module or unit division in the embodiments of this application is an example, and is merely logical function division. There may be another division manner in actual implementation.

Figure 41:
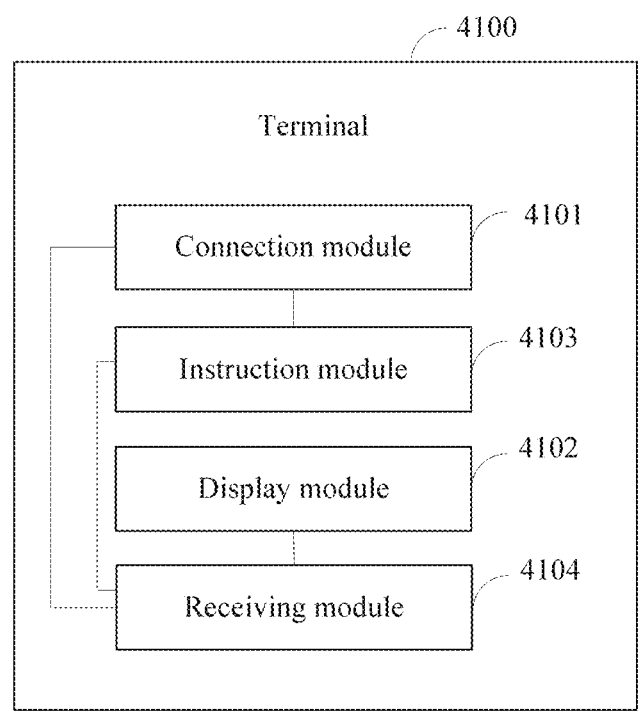
FIG. 41 is a schematic structural composition diagram 1 of a terminal according to an embodiment of the present disclosure.

FIG. 41 is a schematic structural diagram of a terminal in the foregoing embodiments. As shown in FIG. 41, the terminal 4100 may include a connection module 4101, a display module 4102, an instruction module 4103, and a receiving module 4104.

In an embodiment, the connection module 4101 is configured to support S1701 in the method embodiment and/or other processes used in the technology described in this specification. The display module 4102 is configured to support the operation that the terminal displays a first screen in S1702, the operation that the terminal displays a second screen in S1702*a*, S1702*b*, and S1703, and S3901 in the method embodiments, and/or other processes used in the technology described in this specification. The instruction module 4103 is configured to support the operation that the terminal instructs the external display apparatus to display a first desktop in S1702, the operation that the terminal instructs the external display apparatus to display a second desktop in S1703, and S3801 in the method embodiments, and/or other processes used in the technology described in this specification. The receiving module 4104 is configured to support the operation that the terminal receives a first input in S1703, the operation that the terminal receives a third input in S3802, and the operation that the terminal receives a fourth input in S3802' in the method embodiments, and/or other processes used in the technology described in this specification.

In another embodiment, the connection module 4101 is configured to support S2801 in the method embodiment and/or other processes used in the technology described in this specification. The display module 4102 is configured to support the operation that the terminal displays a first screen in S2802, the operation that the terminal displays a second screen in S2804*a* and S2804*b*, and S3901 in the method embodiments, and/or other processes used in the technology described in this specification. The instruction module 4103 is configured to support the operation that the terminal instructs the external display apparatus to display a first desktop in S2802, the operation that the terminal instructs the external display apparatus to display a second desktop in S2803, and S3801 in the method embodiments, and/or other processes used in the technology described in this specification. The receiving module 4104 is configured to support the operation that the terminal receives a first input in S2803, S2804*a*, and S2804*b*, the operation that the terminal receives a third input in S3802, and the operation that the terminal receives a fourth input in S3802' in the method embodiments, and/or other processes used in the technology described in this specification.

In another embodiment, the connection module 4101 is configured to support S3101 in the method embodiment and/or other processes used in the technology described in this specification. The display module 4102 is configured to support S3103, S3104, and S3901 in the method embodiments, and/or other processes used in the technology described in this specification. The instruction module 4103 is configured to support S3102 and S3801 in the method embodiments, and/or other processes used in the technology described in this specification. The receiving module 4104 is configured to support the operation that the terminal receives a second input in S3103', the operation that the terminal receives a third input in S3802, and the operation that the terminal receives a fourth input in S3802' in the method embodiments, and/or other processes used in the technology described in this specification.

Further, the terminal 4100 may further include a determining module. The determining module is configured to determine that the terminal is connected to an external device or that the terminal is not connected to an external device.

Further, the terminal 4100 may further include a storage module. The storage module is configured to store a preconfigured terminal screen or large-screen window, and the like, and/or perform other processes used in the technology described in this specification.

The terminal 4100 includes but is not limited the foregoing listed units and modules. For example, the terminal 4100 may further include a sending module configured to send data or a signal to another device and a receiving module configured to receive data or a signal sent by the another device. In addition, the functions that can be specifically implemented by the foregoing modules also include but are not limited to the functions corresponding to the operations of the methods in the foregoing embodiments. For other units in the terminal 4100 and detailed descriptions of the units in the terminal 4100, refer to the detailed descriptions of the operations of the corresponding methods. Details are not repeated in this embodiment of this application.

Figure 42:
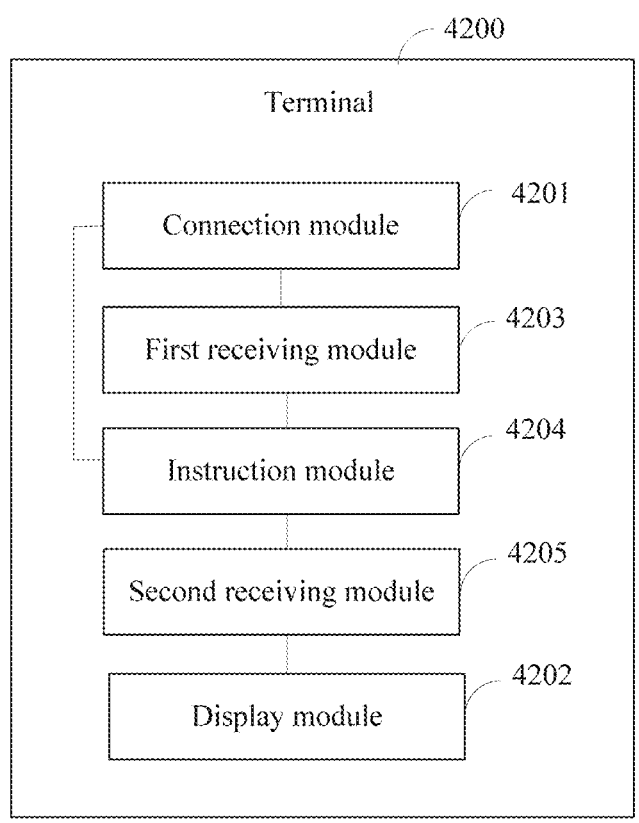
FIG. 42 is a schematic structural composition diagram 2 of a terminal according to an embodiment of the present disclosure.

FIG. 42 is a schematic structural diagram of a terminal in the foregoing embodiments. As shown in FIG. 42, the terminal 4200 may include a connection module 4201, a display module 4202, a first receiving module 4203, an instruction module 4204, and a second receiving module 4205.

The connection module 4201 is configured to support S701 in the method embodiment and/or other processes used in the technology described in this specification. The display module 4202 is configured to support the operation of displaying a second screen in S801 and S803 and the operation of displaying a touchpad screen in S901 and S804 in the method embodiments, and/or other processes used in the technology described in this specification. The first receiving module 4203 is configured to support the operation of "receiving a first input of the external device" in S802 in the method embodiment, and/or other processes used in the technology described in this specification. The instruction module 4204 is configured to support the operation of "in response to a first input, displaying a second screen on the external display apparatus" in S802, the operation of "in response to a fourth input, displaying a fourth screen on the external display apparatus" in S902, the operation of "in response to a fourth input, instructing the external display apparatus to display a third screen" in S804, and the operation of "in response to a fourth input on the touchpad screen, instructing the external display apparatus to display a fourth screen" in S805 in the method embodiments, and/or other processes used in the technology described in this specification. The second receiving module 4205 is configured to support the operation of "receiving a second input" in S803, the operation of "receiving a fourth input" in S902, the operation of "receiving a second input" in S803, the operation of "receiving a fourth input" in S804, and the operation of "receiving a second input" in S805 in the method embodiments, and/or other processes used in the technology described in this specification. Further, the terminal 4200 may further include a determining module. The determining module is configured to support S702 in the method embodiment and/or other processes used in the technology described in this specification.

When an integrated unit is used, the determining module and the instruction module in the terminal may be integrated into one processing unit. The processing unit may be a processor or a controller. For example, the processing unit may be a CPU, a graphics processing unit (GPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit may implement or execute various example logical blocks, modules, and circuits described with reference to the content disclosed in this application. Alternatively, the processing unit may be a combination implementing a computing function, such as a combination of one or more microprocessors, or a combination of a DSP and a microprocessor. The storage module may be a memory.

The receiving module 4104, the second receiving module 4205, and the display module 3205 may be a touchscreen of the terminal. The receiving module 4104 and the second receiving module 4205 may be a touch panel of the touchscreen of the terminal. The display module 3205 may be a display panel of the touchscreen of the terminal. The first receiving module 4203 may be a communications interface of the terminal, and is configured to receive an instruction sent by an external device.

Figure 43:
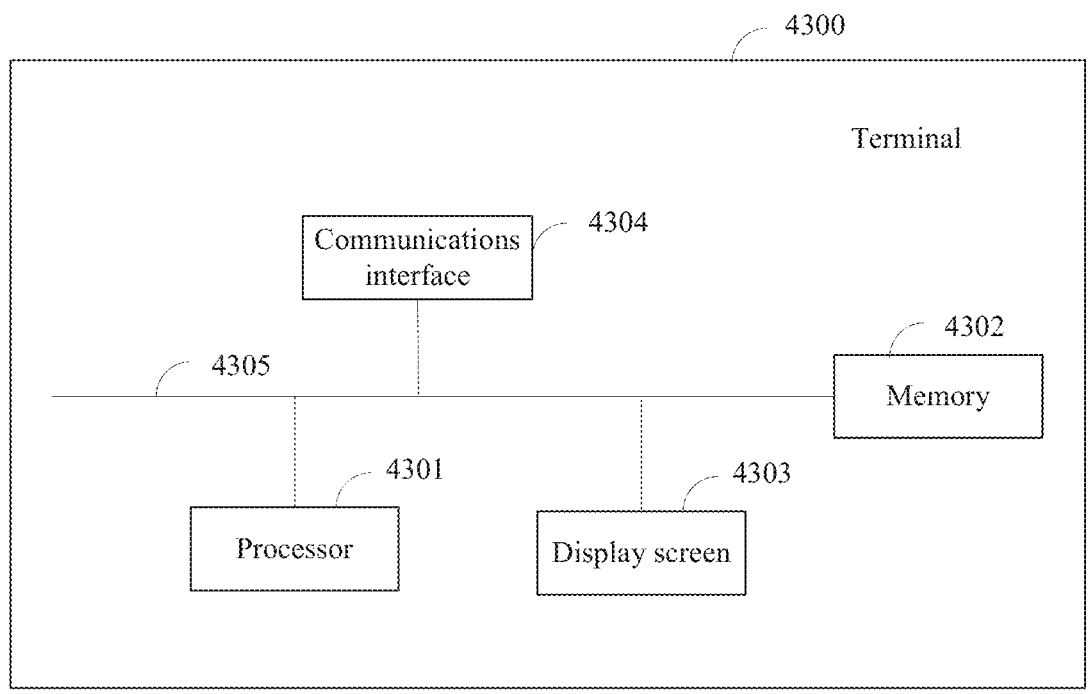
FIG. 43 is a schematic structural composition diagram 3 of a terminal according to an embodiment of the present disclosure.

When the processing unit is a processor and the storage module is a memory, the terminal 4100 or 4200 in the embodiments of this application may be a terminal 4300 shown in FIG. 43. As shown in FIG. 43, the terminal 4300 includes one or more processors 4301, a memory 4302, a display screen 4303, and a communications interface 4304. The one or more processors 4301, the memory 4302, the display screen 4303, and the communications interface 4304 are connected to each other through a bus 4305. The communications interface 4304 is configured to connect to an external display apparatus and an external device, and the communications interface 4304 may be a wireless interface or a wired interface. The display screen 4303 is configured to receive a touch input of a user.

The memory 4302 is configured to store computer program code, where the computer program code includes an instruction. When the one or more processors 4301 of the terminal 4300 execute the instruction, the terminal 4300 performs the operations of the related method in FIG. 7 or FIG. 12 to implement the display methods in the foregoing embodiments, so as to display corresponding content on the display screen 4303 or the external display apparatus. The display screen 4303 may be a touchscreen.

The bus 4305 may be a peripheral component interconnect (Peripheral Component Interconnect, PCI) bus, an extended industry standard architecture (Extended Industry Standard Architecture, EISA) bus, or the like. The bus 4305 may include an address bus, a data bus, a control bus, and the like. For ease of representation, only one thick line is used to represent the bus in FIG. 43, but this does not mean that there is only one bus or only one type of bus.

An embodiment of the present disclosure further provides a computer storage medium. The computer storage medium includes computer program code. When the one or more processors of the terminal 4300 execute the computer program code, the terminal 4300 performs the operations of the related method in any one of FIG. 7, FIG. 12, FIG. 17, and FIG. 20 to implement the display methods in the foregoing embodiments.

An embodiment of the present disclosure further provides a computer program product. When the computer program product runs on a computer, the computer performs the operations of the related method in any one of FIG. 7, FIG. 12, FIG. 17, and FIG. 20 to implement the display methods in the foregoing embodiments.

The terminal 4100, the terminal 4200, the terminal 4300, the computer storage medium, or the computer program product provided in the embodiments of the present disclosure is configured to perform the corresponding method provided above. Therefore, for beneficial effects that can be achieved, refer to the beneficial effects in the corresponding methods provided above. Details are not repeated herein.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, refer to a corresponding process in the foregoing method embodiments, and details are not repeated herein.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the operations of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely implementations of this application, but are not intended to limit the protection scope of this application. Any variation or replacement disclosed in this application shall fall within the protection scope of this application. Therefore, the protection scope of this application shall be subject to the protection scope of the claims.

What is claimed is:

1. A display method, applied to a terminal, wherein the terminal is connected to an external display apparatus, and the method comprises:
    displaying, by the terminal, a first screen, and instructing, by the terminal, the external display apparatus to display a first desktop comprising a first application but not comprising a second application, wherein the first screen is different from the first desktop, and wherein the first application and the second application are displayed on the first screen while the first application but not the second application is displayed on the first desktop;
    displaying, by the terminal, in response to a first input of a user on the first screen, a second screen comprising the first application and the second application on the terminal, and instructing the external display apparatus to display a second desktop comprising the first application and the second application;
    instructing, by the terminal, the external display apparatus to display a toolbar window, wherein the toolbar window comprises an icon of a target application; and
    instructing, by the terminal, in response to a specific operation performed by the user on the icon of the target application, the external display apparatus to display at least one display mode supported by the target application, wherein the at least one display mode comprises at least one of a full-screen display mode, a landscape display mode, and a portrait display mode.

2. The method according to claim 1, wherein after the terminal receives the first input on the first screen, the applications comprised in the second screen displayed by the terminal are the same as, or different from, the applications comprised in the second desktop.

3. The method according to claim 1, wherein the displaying, by the terminal, the first screen comprises:
    displaying, by the terminal, the first screen comprising the first application but not comprising the second application; or
    displaying, by the terminal, the first screen comprising the first application in a selected state and the second application in a non-selected state, wherein the first application and the second application on the second screen are in the selected state.

4. The method according to claim 1, wherein the instructing, by the terminal, the external display apparatus to display the first desktop comprising the first application but not comprising the second application comprises:
    instructing, by the terminal, the external display apparatus to display the first desktop in a first display mode, wherein the first display mode is a preset default display mode.

5. The method according to claim 4, wherein after the instructing, by the terminal, the external display apparatus to display the first desktop comprising the first application but not comprising the second application, the method further comprises:
    instructing, by the terminal in response to a second input of the external display apparatus for a mode switching option on the first desktop, the external display apparatus to display the first desktop in a second display mode; or
    instructing, by the terminal in response to a third input of the user on the terminal, the external display apparatus to display the first desktop in a second display mode, wherein
    the first display mode is a display mode adapted to a display screen of the terminal, and the second display mode is a display mode adapted to the external display apparatus; or the first display mode is a display mode adapted to the external display apparatus, and the second display mode is a display mode adapted to a display screen of the terminal.

6. The method according to claim 1, wherein the external display apparatus comprises at least one of a keyboard, a mouse, or a handwriting tablet.

7. The method according to claim 1, wherein the external display apparatus comprises at least a display, a television set, a tablet computer, or a projector.

8. The method according to claim 1, wherein the method further comprises:
    instructing, by the terminal, the external display apparatus to display a multi-window screen comprising a first application window and a second application window, wherein the first application window is a currently focused application window;
    determining, by the terminal in response to an operation of moving a cursor by the user to a first position on the multi-window screen, that an application window within which the first position falls is the second application window; and
    instructing, by the terminal, the external display apparatus to switch the currently focused application window from the first application window to the second application window.

9. The method according to claim 8, wherein after the instructing, by the terminal, the external display apparatus to switch the currently focused application window from the first application window to the second application window, the method further comprises:

receiving, by the terminal, a mouse operation or a keyboard operation triggered by the user in the second application window.

10. The method according to claim 1, wherein the method further comprises:

displaying, by the terminal, a third application window on the display screen of the terminal;

instructing, by the terminal, the external display apparatus to display a multi-window screen comprising a first application window and a second application window, wherein the first application window is a currently focused application window;

determining, by the terminal in response to an operation of moving a cursor by the user to the third application window, that the first position falls within the third application window; and switching, by the terminal, the currently focused application window from the first application window to the third application window.

11. The method according to claim 1, wherein after the instructing, by the terminal, the external display apparatus to display the at least one display mode supported by the target application, the method further comprises:

instructing, by the terminal in response to an operation of triggering the full-screen display mode by the user, the external display apparatus to load a full-screen display resource of the target application onto the display screen;

instructing, by the terminal in response to an operation of triggering the landscape display mode by the user, the external display apparatus to load a landscape display resource of the target application onto the display screen; or instructing, by the terminal in response to an operation of triggering the portrait display mode by the user, the external display apparatus to load a portrait display resource of the target application onto the display screen.

12. The method according to claim 11, wherein after the instructing, by the terminal, the external display apparatus to load the full-screen display resource onto the display screen, the method further comprises:

instructing, by the terminal, the external display apparatus to suspend at least one running application.

13. The method according to claim 1, wherein the at least one display mode further comprises a minimized display mode, and the method further comprises:

instructing, by the terminal in response to an operation of triggering the minimized display mode by the user, the external display apparatus to suspend the running target application.

14. A terminal, comprising one or more processors, a memory, a communications interface, and a display screen of the terminal, wherein the memory, the display screen of the terminal, and the communications interface are coupled to the one or more processors, the communications interface is configured to connect to an external display apparatus, and the display screen of the terminal is configured to receive a touch input of a user; and the memory is configured to store computer program code, wherein the computer program code comprises a computer instruction, and when the one or more processors execute the computer instruction, the terminal performs a method, the method comprising:

displaying a first screen, and instructing the external display apparatus connecting with the terminal to display a first desktop comprising a first application but not comprising a second application, wherein the first screen is different from the first desktop, and wherein the first application and the second application are displayed on the first screen while the first application but not the second application is displayed on the first desktop;

displaying, in response to a first input of a user on the first screen, a second screen comprising the first application and the second application on the terminal, and instructing the external display apparatus to display a second desktop comprising the first application and the second application;

instructing the external display apparatus to display a toolbar window, wherein the toolbar window comprises an icon of a target application; and instructing, in response to a specific operation performed by the user on the icon of the target application, the external display apparatus to display at least one display mode supported by the target application, wherein the at least one display mode comprises at least one of a full-screen display mode, a landscape display mode, and a portrait display mode.

15. The terminal according to claim 14, wherein after receiving the first input on the first screen, the applications comprised in the second screen displayed by the terminal are the same as, or different from, the applications comprised in the second desktop.

16. The terminal according to claim 14, wherein the displaying the first screen comprises:

displaying the first screen comprising the first application but not comprising the second application; or displaying the first screen comprising the first application in a selected state and the second application in a non-selected state, wherein the first application and the second application on the second screen are in the selected state.

17. The terminal according to claim 16, wherein after the instructing the external display apparatus to display the first desktop comprising the first application but not comprising the second application, the method further comprises:

instructing in response to a second input of the external display apparatus for a mode switching option on the first desktop, the external display apparatus to display the first desktop in a second display mode; or instructing in response to a third input of the user on the terminal, the external display apparatus to display the first desktop in a second display mode, wherein a first display mode is a display mode adapted to a display screen of the terminal, and the second display mode is a display mode adapted to the external display apparatus; or the first display mode is a display mode adapted to the external display apparatus, and the second display mode is a display mode adapted to a display screen of the terminal.

18. The terminal according to claim 14, wherein the method further comprises:

instructing the external display apparatus to display a multi-window screen comprising a first application window and a second application window, wherein the first application window is a currently focused application window;
determining in response to an operation of moving a cursor by the user to a first position on the multi-window screen, that an application window within which the first position falls is the second application window; and
instructing the external display apparatus to switch the currently focused application window from the first application window to the second application window.

19. A non-transitory computer storage medium, comprising a computer instruction, wherein when the computer instruction runs on a terminal, the terminal performs operations, the operations including
displaying a first screen, and instructing an external display apparatus to display a first desktop comprising a first application but not comprising a second application, wherein the first screen is different from the first desktop, and wherein the first application and the second application are displayed on the first screen while the first application but not the second application is displayed on the first desktop;
displaying, in response to a first input of a user on the first screen, a second screen comprising the first application and the second application on the terminal, and instructing the external display apparatus to display a second desktop comprising the first application and the second application;
instructing the external display apparatus to display a toolbar window, wherein the toolbar window comprises an icon of a target application; and
instructing, in response to a specific operation performed by the user on the icon of the target application, the external display apparatus to display at least one display mode supported by the target application, wherein the at least one display mode comprises at least one of a full-screen display mode, a landscape display mode, and a portrait display mode.

* * * * *